United States Patent
Sakai et al.

(10) Patent No.: US 9,065,139 B2
(45) Date of Patent: Jun. 23, 2015

(54) FIBER ELECTRODE FOR LITHIUM SECONDARY BATTERY, FABRICATION METHOD THEREFOR, AND LITHIUM SECONDARY BATTERY INCLUDING FIBER ELECTRODE

(75) Inventors: Tetsuo Sakai, Ikeda (JP); Jinhan Yao, Ikeda (JP); Takashi Mukai, Ikeda (JP); Tomoaki Takasaki, Akashi (JP); Kazuo Tsutsumi, Akashi (JP); Kazuya Nishimura, Akashi (JP)

(73) Assignees: NATIONAL INSTITUTE OF ADVANCED INDUSTRIAL SCIENCE AND TECHNOLOGY, Tokyo (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 891 days.

(21) Appl. No.: 13/147,769

(22) PCT Filed: Feb. 2, 2010

(86) PCT No.: PCT/JP2010/000600
§ 371 (c)(1),
(2), (4) Date: Oct. 19, 2011

(87) PCT Pub. No.: WO2010/089991
PCT Pub. Date: Aug. 12, 2010

(65) Prior Publication Data
US 2012/0040246 A1 Feb. 16, 2012

(30) Foreign Application Priority Data

Feb. 4, 2009 (JP) .................. 2009-023640
Apr. 17, 2009 (JP) .................. 2009-100482
Jul. 14, 2009 (JP) .................. 2009-165568

(51) Int. Cl.
*H01M 4/66* (2006.01)
*H01M 4/131* (2010.01)
*H01M 4/1391* (2010.01)
*H01M 4/62* (2006.01)

(52) U.S. Cl.
CPC .............. *H01M 4/663* (2013.01); *H01M 4/131* (2013.01); *H01M 4/1391* (2013.01); *H01M 4/623* (2013.01); *H01M 4/667* (2013.01); *Y02E 60/122* (2013.01)

(58) Field of Classification Search
USPC ........ 429/231.8, 221, 231.3, 231.5, 223, 220, 429/231.95
IPC .............. H01M 4/663,4/13, 4/00, 4/362, 4/387, H01M 4/48, 4/52
See application file for complete search history.

(56) References Cited

U.S. PATENT DOCUMENTS

| | | | |
|---|---|---|---|
| 3,162,549 A | 12/1964 | Jeannin | |
| 4,522,897 A | 6/1985 | Walsh | |
| 5,449,574 A | 9/1995 | Higley | |
| 5,518,836 A * | 5/1996 | McCullough | 429/94 |
| 6,986,877 B2 * | 1/2006 | Takikawa et al. | 423/447.3 |
| 2005/0025970 A1 * | 2/2005 | Stipanovic | 428/403 |
| 2007/0243456 A1 | 10/2007 | Ahn et al. | |

FOREIGN PATENT DOCUMENTS

| | | |
|---|---|---|
| EP | 0 149 763 A2 | 7/1985 |
| EP | 0 716 466 A1 | 6/1996 |
| JP | 53-104826 A | 9/1978 |
| JP | 53-104826 A | 9/1978 |
| JP | 59-215497 | 12/1984 |
| JP | 64-045858 | 3/1989 |
| JP | 03-206173 | 9/1991 |
| JP | 05-275077 | 10/1993 |
| JP | 05-275084 | 10/1993 |
| JP | 07-268771 | 10/1995 |
| JP | 08-227726 | 9/1996 |
| JP | 10-284053 | 10/1996 |
| JP | 08-264203 | 11/1996 |
| JP | 09-248810 | 9/1997 |
| JP | 11-021128 A | 1/1999 |
| JP | 11-104545 | 4/1999 |
| JP | 11-180717 A | 7/1999 |
| JP | 11-233151 | 8/1999 |

| | | |
|---|---|---|
| JP | 11-244009 | 9/1999 |
| JP | 2000-228213 A | 8/2000 |
| JP | 2000-340227 A | 12/2000 |
| JP | 2001-068094 A | 3/2001 |
| JP | 2001-110445 A | 4/2001 |
| JP | 2001-256968 A | 9/2001 |
| JP | 2001-313069 | 11/2001 |
| JP | 2002-053266 A | 2/2002 |
| JP | 2002-180372 A | 6/2002 |
| JP | 2003-157833 A | 5/2003 |
| JP | 2003-203626 A | 7/2003 |
| JP | 2003-317794 A | 11/2003 |
| JP | 2004-193062 A | 7/2004 |
| JP | 2007-042603 A | 2/2007 |
| JP | 2007-533098 A | 11/2007 |
| WO | WO-01/84654 A1 | 11/2001 |
| WO | WO-2005/098994 A1 | 10/2005 |
| WO | WO-2006/077192 A1 | 7/2006 |
| WO | WO-2010/058574 A1 | 5/2010 |

OTHER PUBLICATIONS

Derrien et al. "Nanostructured Sn—C Composite as an Advanced Anode Material in High-Performance Lithium-Ion Batteries", Advanced Materials, 2007, 19, 2336-2340.*
Gummow et al., "An Investigation of Spinel-Related and Orthorhombic $LiMnO_2$ Cathodes for Rechargeable Lithium Batteries," J. Electrochem. Soc., vol. 141, No. 5, May, 1994.
Tabuchi et al, "Electrochemical and magnetic properties of lithium manganese oxide spinels prepared by oxidation at low temperature of hydrothermally obtained $LiMnO_2$," Solid State Ionics 89, pp. 53-63, 1996.
Tamura et al., "Study on the anode behavior of Sn and Sn—Cu alloy thin-film electrodes," Journal of Power Sources 107, pp. 48-55, 2002.
International Search Report for PCT/JP2010/000600, mailed May 25, 2010.
Extended European Search Report for Application No. 10799612.6, dated Oct. 28, 2013.
Extended European Search Report for European Patent Application No. 10799613.4, dated Oct. 29, 2013.
International Search Report for PCT/JP2010/004526, mailed Oct. 5, 2010.
International Search Report for PCT/JP2010/004528, mailed Oct. 5, 2010.
Yao et al., Abstract No. 532, 216th ECS Meeting, The Electrochemical Society, 2009.
Extended European Search Report for European Patent Application No. 1073833.3, dated Oct. 17, 2013.

* cited by examiner

*Primary Examiner* — Patrick Ryan
*Assistant Examiner* — Julian Anthony
(74) *Attorney, Agent, or Firm* — Marshall, Gerstein & Borun LLP

(57) ABSTRACT

Provided is a method for mass manufacturing, at low cost, of a fiber positive electrode for a lithium secondary battery, which has excellent charge/discharge cycle characteristics, and which is capable of charging/discharging with high current density, and a main active material of which is a lithium-doped transition metal oxide. The method includes the steps of: (a) forming a tubular coating of either a transition metal oxide or a transition metal hydroxide on a carbon fiber current collector; and (b) performing, in a lithium ion containing solution in a sealed system under presence of an oxidant or a reductant, heat treatment at 100 to 250° C. on the carbon fiber current collector, on which the tubular coating of either the transition metal oxide or the transition metal hydroxide is formed, to obtain a coating of a lithium-doped transition metal oxide on the carbon fiber current collector. Further provided are: a fiber negative electrode for a lithium secondary battery, which has high current density, high energy density, and excellent charge/discharge cycle characteristics, and which can be fabricated in a relatively easy manner; and a method for fabricating the fiber negative electrode. The fiber negative electrode for a lithium secondary battery includes: (c) a carbon fiber current collector; (d) an outer layer which is a tubular composite layer of a Sn oxide and $M_xO_y$ formed on the carbon fiber current collector; and (e) an intermediate layer formed of a Sn alloy, which has a lithium occlusion capacity and which is present at an interface between the carbon fiber current collector and the outer layer. The method for fabricating the fiber negative electrode for a lithium secondary battery includes: forming a coating of one of Sn and a Sn alloy, and a coating of at least one kind of metal selected from the group consisting of Fe, Mo, Co, Ni, Cr, Cu, In, Sb, and Bi, on a carbon fiber current collector by an electroplating method; and then performing heat treatment on the carbon fiber current collector under a trace oxygen atmosphere at 350 to 650° C. Moreover, the lithium secondary battery includes: the fiber positive electrode and the fiber negative electrode fabricated in the above methods; and an electrolyte.

16 Claims, 18 Drawing Sheets

FIBER ELECTRODE FOR LITHIUM SECONDARY BATTERY, FABRICATION METHOD THEREFOR, AND LITHIUM SECONDARY BATTERY INCLUDING FIBER ELECTRODE

TECHNICAL FIELD

The present invention relates to an improved fiber electrode for a lithium secondary battery, in which a battery active material is adhered to the surface of an electron-conductive fibrous material, and relates to an improved method for fabricating such a fiber electrode. Further, the present invention relates to a high-power lithium secondary battery, the high-output characteristics of which are realized as a result of forming the battery by bundling the fiber electrodes together or by laminating the fiber electrodes in a fabric-like manner.

BACKGROUND ART

In recent years, portable electronic devices such as laptop PCs, mobile phones, and PDAs are in widespread use. Accordingly, there is a demand for a secondary battery used as a power source of these devices to be small-sized and to have high energy density, in order to allow these devices to be lighter and to become usable for longer hours. Conventionally, nickel-cadmium batteries, nickel-hydrogen batteries, or the like are used as major secondary batteries. However, due to the aforementioned demand for secondary batteries to be small-sized and to have high energy density, the use of lithium secondary batteries is increasing.

Currently, general lithium secondary batteries use lithium cobalt oxide as a positive electrode, a carbon electrode as a negative electrode, and a nonaqueous electrolyte solution as an electrolyte, which is obtained by dissolving lithium ions in an organic solvent such as propylene carbonate.

There is a well known general method for producing lithium cobalt oxide ($LiCoO_2$) which is used as a positive-electrode active material for general lithium secondary batteries. In this method, lithium carbonate ($Li_2CO_3$) and cobalt hydroxide ($Co(OH)_2$) are used as starting materials which are burned at a high temperature. However, in this method, the temperature needs to be as high as 700 to 900° C., resulting in a high production cost. Moreover, the recoverable reserves of cobalt are 8.4 million tons, which is an extremely small amount. Therefore, given a possible increase in the cobalt price in the future, a material alternative to $LiCoO_2$ is sought.

In view of the above, lithium manganese oxides are drawing attention as alternatives to $LiCoO_2$ since they are available at a relatively lower price and also favorable from the environmental point of view. Research and development have been actively conducted on lithium manganese oxides, such as spinel-type lithium manganese oxide ($LiMn_2O_4$) and tetragonal lithium manganese oxide ($LiMnO_2$), as next-generation, low-cost, positive electrode materials.

However, in a method for producing such a lithium manganese oxide, a heating temperature and a cooling speed in slow cooling are important factors. In general, a method for producing a lithium manganese oxide requires a burning process which is performed at a high temperature of 700 to 800° C. (see Non-Patent Literature 1).

Accordingly, a sintered body obtained in this method tends to be one in which sintering having occurred among particles is uneven, and also, a resultant particle diameter is large, which is unfavorable. Moreover, the reactivity of a mixture of a manganese compound and a lithium compound is poor even if a burning process is performed thereon at a high temperature. Accordingly, a resultant composition tends to have lithium deficiency or oxygen deficiency. In order to avoid these problems, it is necessary to repeatedly perform the burning process and mechanical crushing, which results in an increase in the production cost. Since the burning process performed at a high temperature contributes to the increase in the production cost, research and development have been conducted to develop a method for producing a material at a lower temperature, aiming at lowering the cost. For example, one of the existing low-temperature synthesis methods is a hydrothermal synthesis method (see Non-Patent Literature 2 and Patent Literatures 1 and 2).

It is expected that the use of a hydrothermal synthesis method makes it possible to mass-manufacture positive-electrode active materials at a low temperature and at low cost.

Among such hydrothermal synthesis methods, Patent Literature 2 discloses a method for producing a lithium manganese oxide, the method including the steps of: causing a reaction between a manganese compound and an alkali to obtain a manganese hydroxide; causing the manganese hydroxide to be oxidized in an aqueous solvent or in a gas phase to obtain a manganese oxide; causing a reaction between the manganese oxide and a lithium compound in an aqueous solvent to obtain a lithium manganese oxide precursor; and heating and burning the precursor.

In the lithium manganese oxide obtained in this manner, each particle has a cubic shape and has a gap therein. Patent Literature 2 found out that if a lithium secondary battery is formed by incorporating therein the lithium manganese oxide as a positive-electrode active material, then the initial charge/discharge capacity of the battery is high, and also, the charge/discharge cycle characteristics of the battery are excellent.

Lithium-doped transition metal oxides obtained by methods disclosed in Non-Patent Literatures 1, 2 and Patent Literatures 1, 2 are each obtained in the form of powder. Therefore, in order to fabricate a positive electrode, it is necessary to mix the powder with a conductive agent and a binder to form a positive electrode slurry, and to apply the slurry onto a current collector such as an aluminum foil by means of a doctor blade or the like, thereby obtaining a current collecting ability.

However, in the fields of electric automobiles, trains, airplanes, etc., which involve heavy-duty industrial drive source applications, it is necessary to realize charging/discharging with very high current density. Therefore, it is preferred that a positive electrode has a wide surface area and that a composite material layer on the positive electrode is as thin as possible.

For example, one of such batteries, in which the surface area of an electrode is wide and an active material layer on the electrode is thin, is a battery using a fiber electrode (see Patent Literature 3).

In such a battery, the surface area of the electrode is significantly large. This realizes charging/discharging with high current density. However, it is difficult to evenly form a thin composite material layer on a positive electrode with a conventional coating method.

Moreover, if a lithium-doped transition metal oxide that is in the form of powder is used and a conventional coating method is used, then a resultant electrode is a flat, plate-shaped electrode. Such an electrode has a structure in which the surface area of the electrode is insufficient, and which does not allow an electrolyte solution to easily permeate, and which cannot mitigate a stress that occurs due to expansion/contraction in the volume of the active material.

If a carbon electrode is used as a negative electrode of a lithium secondary battery, then lithium ions are captured between carbon layers at the time of charging. Accordingly, apparent changes in the volume of the electrode in charge-discharge reactions are small. However, in the case of a carbon electrode, the available current density is low, and the theoretical value of capacity density is 372 mAh/g, which is also low. Moreover, in the case of a carbon electrode, the fabrication process is complex and the fabrication yield is low. Thus, there is a drawback of a high fabrication cost.

In terms of capacity density, metal lithium is the greatest. The theoretical value of the capacity density of metal lithium is 3860 mAh/g, which is high. The charge/discharge capacity of metal lithium is 10 times or more greater than that of a carbon electrode. However, if metal lithium is used as a negative electrode of a lithium secondary battery, a lithium dendrite is formed due to repeating charge-discharge reactions. This causes short-circuiting between electrodes and destruction of a separator, resulting in a sudden decrease in the charge/discharge cycle efficiency of the lithium secondary battery, and also resulting in a decrease in the safety of the battery.

In view of the above, Sn is drawing attention as a next-generation negative electrode material since Sn is inexpensive, has a relatively low effect on the environment, and has a theoretical capacity which is twice or more greater than that of a conventional carbon material (energy density of 994 mAh/g). However, the volume of Sn increases up to 3 to 4 times greater than its initial volume due to lithium occlusion and release which occur at the time of charging and discharging. Accordingly, the capacity is reduced to approximately 100 mAh/g after approximately 20 cycles. Thus, in the case of using Sn, the cycle life characteristics are very poor. Moreover, since Sn acts as a catalyst, there is a problem in that an electrolyte solution is decomposed.

In view of the above, attempts have been made to form a thin film of Sn or an alloy containing Sn, which is alloyed with Li, on a current collector formed of a material that is not alloyed with Li, and to use the thin film as a negative electrode material, thereby solving the above-described problems (see Patent Literature 4 and Patent Literature 5, for example). Patent Literature 4 discloses forming a Sn thin film on a copper plate current collector by an electrolytic plating method. Patent Literature 5 discloses forming a thin film, which is made of Sn, Zn, Sb, or an alloy containing these, on a copper foil by an electrolytic plating method.

Non-Patent Literature 3 discloses that by performing heat treatment on a Sn thin film previously formed by an electrolytic plating method on a Cu foil, it is possible to obtain a thin film having a gradient structure in which Cu atoms and Sn atoms interdiffuse at the Cu—Sn interface. To be specific, when a Sn thin film formed by plating a Cu foil with Sn is subjected to heat treatment at a temperature near the melting point of Sn, atomic interdiffusion occurs at the Cu—Sn interface. Eventually, a Cu—Sn alloy of Cu/$Cu_3Sn$/$Cu_6Sn_5$/Sn or having a crystal structure of a similar composition is formed. The $Cu_6Sn_5$ alloy formed here is capable of reversible Li occlusion and desorption. Moreover, the volume of $Cu_6Sn_5$ changes less than the volume of Sn, and also, $Cu_6Sn_5$ does not act as a catalyst. Therefore, $Cu_6Sn_5$ is expected as a negative electrode material that solves the above-described problems unique to a Sn thin film.

In order to obtain a more favorable cycle life, Patent Literatures 6 and 7 disclose inventions in relation to a negative electrode. In these inventions, a Sn (or Sn alloy) plated coating is formed on a copper foil current collector, and then heat treatment is performed thereon. As a result, a copper-Sn intermetallic compound is formed as an intermediate layer between the copper current collector and the Sn (or Sn alloy) plated coating. However, if a charge/discharge test is performed with a cutoff voltage of 0-1V (Li potential), a capacity reduction to approximately 300 mAh/g is observed after approximately 50 cycles and the capacity is not constant. If the heat treatment is performed at a temperature higher than 190° C., delamination occurs at the interface between a copper plate current collector and a layer of which $Cu_3Sn$ is a main component. This results in a reduced cycle life.

CITATION LIST

Patent Literature

PTL 1: Japanese Laid-Open Patent Application Publication No. 11-21128
PTL 2: Japanese Laid-Open Patent Application Publication No. 11-180717
PTL 3: U.S. Pat. No. 5,449,574
PTL 4: Japanese Laid-Open Patent Application Publication No. 2001-68094
PTL 5: Japanese Laid-Open Patent Application Publication No. 2001-256968
PTL 6: Japanese Laid-Open Patent Application Publication No. 2003-157833
PTL 7: International Publication WO 01/84654

Non-Patent Literature

NPL 1: R. J. Gummow and M. M. Thackeray, J. Electrochem. Soc., 141[5] (1994) 1178.
NPL 2: M. Tabuchi, K. Ado, C. Masquelier, H. Sakaebe, H. Kobayashi, R. Kanno and O. nakamura, Solid State Ionics, 89, (1996) 53.
NPL 3: Journal of Power Sources, 107 (2002), p. 48-55

SUMMARY OF INVENTION

Technical Problem

Generally speaking, if a material is made into powder, the surface area of the material is increased significantly. This greatly contributes to an improvement in chemical reactivity. In this case, however, if a battery active material is used as an electrode, it is very difficult to connect a terminal to each active material powder particle for current collection. Therefore, in general, the powder is mixed with a conductive assistant or binder and made into slurry. The slurry is applied onto a metal foil or impregnated into a porous metal, and then dried and press-formed. In this manner, the active material and current collector are adhered to each other for current collection. An electrode fabricated in this manner is a thick flat-plate electrode having a two-dimensional structure. Accordingly, a large surface area of the powder cannot be taken advantage of, and diffusion where ions and electrons move within the active material is a rate-limiting factor. For this reason, it is difficult to realize high output of the electrode.

In view of the above, a fiber electrode may be formed, in which a fibrous material having electron conductivity is used as a current collector acting as a movement path for electrons and the like, and a battery active material layer which is a thin layer is formed on the surface of the current collector. The fiber electrode fabricated in this manner has a large electrode surface area, as similar to the case of powder.

In conventional batteries using an aqueous electrolyte solution such as nickel-hydrogen batteries or nickel-iron batteries, the proton diffusion rate in the electrolyte solution is relatively high. Therefore, by using a fiber electrode having a large electrode surface area, improved reactivity and high output can be realized.

In the case of a lithium ion battery, the electrode surface area is increased by replacing its foil electrode with a fiber electrode. This also improves high output characteristics. However, lithium ions are much larger than protons, and the diffusion rate of lithium ions in an electrolyte solution is low. Therefore, the improvement in high output characteristics is not as great as in the case of a nickel-hydrogen battery. In order for the lithium ions to move in a short time, a laminated body including an electrode and a separator is formed, in which a thin separator layer is formed on a fiber electrode. In this manner, a large electrode surface area and a large separator surface area are obtained; a distance between electrodes is made short; and a distance for lithium ions to move is made short. This makes it possible to realize high output.

Accordingly, in view of the aforementioned problems of positive and negative electrodes of a lithium secondary battery, the present invention employs a fiber electrode having the above-described advantages as an electrode of a lithium ion secondary battery, thereby solving problems as described below.

Firstly, the present invention relates to a fiber positive electrode which is suitable for use in a lithium secondary battery and of which a main active material is a lithium-doped transition metal oxide, and also relates to a method for fabricating the fiber positive electrode. An object of the present invention is to provide a method for mass-manufacturing, at low cost, of a fiber positive electrode for a lithium secondary battery, which is capable of suppressing a reduction in active area of active material particles, and which has excellent charge/discharge cycle characteristics, and which is capable of charging/discharging with high current density, and a main active material of which is a lithium-doped transition metal oxide.

Another object of the present invention is to provide an improved fiber negative electrode for a lithium secondary battery and to provide an improved method for fabricating such a fiber negative electrode. To be specific, as disclosed in prior art documents, a Cu foil current collector is plated with Sn by electrolytic plating, and then heat treatment is performed thereon. As a result, a CuSn alloy phase is formed near the interface between Cu and Sn, which provides high adhesion. Accordingly, for example, even if micronization of an active material occurs due to charge/discharge cycles, the active material does not easily drop from the current collecting foil. This provides an advantage of improved charge/discharge cycle characteristics. However, if the adhesion between the current collecting foil and the active material is high, then changes in the volume of the active material thin film due to Li insertion and desorption cause a stress to be applied to the current collecting foil. Therefore, wrinkles tend to be formed on the current collecting foil. As a result, the current collecting foil loses its flatness, and the apparent thickness of the thin film electrode expands to a degree exceeding its theoretical value. Such a change in the thickness due to the wrinkles is irreversible. The expansion of the thickness of the thin film electrode due to Li insertion and desorption is a combination of: a theoretical thickness change caused by a change in the volume of the active material thin film; and an apparent thickness change caused by the wrinkles of the current collecting foil. If such expansion of the electrode thickness occurs, the electron conductivity of the electrode is reduced, causing a reduction in charge/discharge cycle characteristics.

Therefore, an object of the present invention is to provide a fiber negative electrode for a lithium secondary battery, which has high current density, high energy density, and excellent charge/discharge cycle characteristics, and which can be fabricated in a relatively easy manner, and also to provide a method for fabricating the fiber negative electrode.

Another further object of the present invention is to provide a lithium secondary battery which is obtained by: forming a separator layer on the above-described fiber positive electrode and/or the fiber negative electrode; and combining the fiber positive electrode and the fiber negative electrode.

Solution to Problem

The inventors of the present invention addressed the above-described problems. As a result of intensive research on the above-described problems, they succeeded in obtaining a fiber positive electrode for a lithium secondary battery, of which a main active material is a lithium-doped transition metal oxide, by forming a tubular coating of a transition metal oxide on a carbon fiber current collector and then subjecting the current collector, on which the tubular coating of the transition metal oxide is formed, to heat treatment in a lithium ion containing solution in a sealed system at 100 to 250° C. under the presence of an oxidant or reductant.

Further, as a result of the intensive research on the above-described problems, the inventors of the present invention found out in relation to a negative electrode that a high capacity and a greatly extended cycle life of a lithium secondary battery can be realized by using a negative electrode that is obtained by: coating a carbon fiber current collector with a metal such as copper; then laminating a tubular Sn plated coating, or tubular Sn alloy plated coating, on the current collector; and thereafter subjecting the current collector, on which the plated coating is laminated, to heat treatment under a trace oxygen atmosphere. Thus, the inventors arrived at an invention of a fiber negative electrode for a lithium secondary battery.

If the current collector is formed of thin columnar electrically conductive fibers, a tubular active material layer is formed on each fiber. In this case, since the active material layer forms a fully tubular shape, its volume change due to charging and discharging is suppressed. Accordingly, even in a case where expansion and contraction repeatedly occur, detachment and dropping of the active material layer are less likely to occur as compared to a plate electrode. Further, by bundling these fibers together, the fibers are pressure bonded to each other. This effectively prevents the dropping of the active material.

Specifically, the present invention provides a fiber positive electrode for a lithium secondary battery and a method for fabricating the fiber positive electrode, a fiber negative electrode for a lithium secondary battery and a method for fabricating the fiber negative electrode, and a lithium secondary battery including the fiber positive electrode and the fiber negative electrode. These will be described below.

1. Fiber Positive Electrode for Lithium Secondary Battery, Method for Fabricating the Fiber Positive Electrode, and lithium Secondary Battery Including the Fiber Positive Electrode

[Method for Fabricating Fiber Positive Electrode for Lithium Secondary Battery]

(1) A method for fabricating a fiber positive electrode for a lithium secondary battery includes the steps of:

(a) forming a tubular coating of either a transition metal oxide or a transition metal hydroxide on a carbon fiber current collector; and (b) performing, in a lithium ion containing solution in a sealed system under presence of an oxidant or a reductant, heat treatment at 100 to 250° C. on the carbon fiber current collector, on which the tubular coating of either the transition metal oxide or the transition metal hydroxide is formed, to obtain a coating of a lithium-doped transition metal oxide on the carbon fiber current collector.

(2) Preferably, the step (a) is a step of forming the tubular coating of either the transition metal oxide or the transition metal hydroxide on the carbon fiber current collector by an electrodeposition method.

(3) Preferably, the step (a) is a step of forming the coating of the transition metal oxide, by forming a tubular coating of a transition metal on the carbon fiber current collector by an electroplating method and thereafter performing high-temperature oxidation treatment under an oxidizing atmosphere at 500 to 1000° C. on the carbon fiber current collector on which the tubular coating of the transition metal is formed.

(4) Preferably, the step (a) is a step of dispersing a conductive assistant in an electrodeposition bath and causing a deposited coating to contain the conductive assistant, by a conductive assistant deposition method.

(5) Preferably, the step (a) is a step of dispersing a conductive assistant in an electroplating bath and causing a deposited coating to contain the conductive assistant, by a conductive assistant deposition method.

(6) Preferably, the heat treatment performed in the sealed system in the step (b) is solvothermal treatment.

(7) Preferably, an Al coating is formed on the carbon fiber current collector.

(8) Preferably, the Al coating has a thickness of 0.1 to 1 µm.

(9) Preferably, the carbon fiber current collector has a diameter of 1 to 100 µm.

(10) Preferably, the transition metal oxide is represented by the following formula (1): $M_aO_b$ (wherein: M is at least one kind of transition metal selected from the group consisting of Ti, V, Cr, Mn, Fe, Co, and Ni; $1 \leq a \leq 3$; and $1 \leq b \leq 5$), and the lithium-doped transition metal oxide is represented by the following formula (2): $Li_dM_eO_c$ (wherein: $2 \leq c \leq 5$; $0 < d \leq 2$; $1 \leq e \leq 5$; and M is the same as in formula (1)).

(11) Preferably, the transition metal oxide is $Mn_3O_4$, and the lithium-doped transition metal oxide is represented by the following formula (2-1): $Li_{d1}Mn_{e1}O_{c1}$ (wherein: the valence of Mn is in a range of 3 to 4; $2 \leq c1 \leq 4$; $0 < d1 \leq 2$; and $1 \leq e1 \leq 2$).

(12) Preferably, the transition metal oxide is represented by the following formula (1-2): $(Mn_{1-x}A_x)_3O_4$ (wherein: A is at least one element selected from the group consisting of Al, Ti, Cr, Fe, Co, Ni, Cu, Sr, Y, Zr, and a rare earth element; and $0.05 \leq x \leq 0.25$), and the lithium-doped transition metal oxide is represented by the following formula (2-2): $Li_{d2}(Mn_{1-y}A_y)_{e2}O_{c2}$ (wherein: the valence of Mn is in a range of 3 to 4; $2 \leq c2 \leq 4$; $0 < d2 \leq 2$; $1 \leq e2 \leq 2$; $0.05 \leq y \leq 0.25$; and A is the same as in the formula (I-2)).

[Fiber Positive Electrode for Lithium Secondary Battery]
(13) Preferably, a fiber positive electrode for a lithium secondary battery is fabricated by any of the above methods.

(14) Preferably, in the fiber positive electrode for a lithium secondary battery that is fabricated by any of the above methods, the lithium-doped transition metal oxide is a porous material which is flake-shaped and formed perpendicularly to a surface of the carbon fiber current collector.

(15) Preferably, the lithium-doped transition metal oxide, which is a flake-shaped porous material, has a thickness of 5 to 600 nm, a width of 0.1 to 10 µm, and a length of 0.1 to 10 µm.

(16) Preferably, a laminated body including a fiber positive electrode and a separator is obtained by forming a separator layer on the coating of the lithium-doped transition metal oxide, which is a tubular coating formed on the carbon fiber current collector by any of the above methods for fabricating a fiber positive electrode for a lithium secondary battery.

[Lithium Secondary Battery]
(17) Preferably, a lithium secondary battery includes: the above-described fiber positive electrode for a lithium secondary battery; an electrolyte; and a negative electrode.

2. Fiber Negative Electrode for Lithium Secondary Battery, Method for Fabricating the Fiber Negative Electrode, and Lithium Secondary Battery including the Fiber Negative Electrode.

[Fiber Negative Electrode for Lithium Secondary Battery]
(18) A fiber negative electrode for a lithium secondary battery includes:

(c) a carbon fiber current collector;

(d) an outer layer which is a tubular composite layer of a Sn oxide and $M_xO_y$ formed on the carbon fiber current collector; and (e) an intermediate layer formed of a Sn alloy, which has a lithium occlusion capacity and which is present at an interface between the carbon fiber current collector and the outer layer (M of $M_xO_y$ in (d) is at least one kind of metal atom selected from the group consisting of Fe, Mo, Co, Ni, Cr, Cu, In, Sb, and Bi; x is $0 < x < 3$; and the number y of oxygen atoms O is $0 \leq y \leq w$ if the number of oxygen atoms O in a chemical bond with metal atoms M is w based on the stoichiometry).

(19) Preferably, the intermediate layer formed of the Sn alloy is a Sn alloy plating layer which contains, as an alloy component other than Sn, at least one kind of metal component selected from the group consisting of Fe, Mo, Co, Ni, Cr, Cu, In, Sb, and Bi.

(20) Preferably, the intermediate layer is a CuSn alloy layer and the outer layer is a composite layer of a Sn oxide and a Cu oxide.

(21) Preferably, the intermediate layer is a $Cu_3Sn$ layer and the outer layer is a composite layer of $SnO_2$ and $Cu_2O$.

(22) Preferably, the total thickness of the intermediate layer and the outer layer is 1 to 10 µm.

(23) Preferably, the carbon fiber has a single fiber diameter of 1 to 100 µm.

(24) Preferably, the carbon fiber is formed of a bundle of 100 to 5000 single fibers.

(25) Preferably, the carbon fiber is formed of 50 to 1000 twisted single fibers.

(26) Preferably, each of the intermediate layer and the outer layer contains a conductant agent and/or a binder.

(27) Preferably, the conductant agent is a carbon black.

(28) Preferably, the binder is polytetrafluoroethylene.

(29) Preferably, a laminated body including a fiber negative electrode and a separator is obtained by forming a separator layer on any of the above outer layers.

(30) A fiber negative electrode for a lithium secondary battery, after charging of the lithium secondary battery, includes:

(c) a carbon fiber current collector;

(f) an outer layer which is a tubular layer formed on the carbon fiber current collector and in which $Li_{4.4}Sn$ and at least one kind of metal selected from the group consisting of Fe, Mo, Co, Ni, Cr, Cu, In, Sb, and Bi are dispersed within an $Li_2O$ matrix; and (g) an intermediate layer having a lithium release capacity, which is present at an interface between the carbon fiber current collector and the outer layer.

(31) A fiber negative electrode for a lithium secondary battery, after discharging of the lithium secondary battery, includes:
(c) a carbon fiber current collector;
(h) an outer layer which is a tubular layer formed on the carbon fiber current collector and in which one of Sn and a Sn alloy, and at least one kind of metal selected from the group consisting of Fe, Mo, Co, Ni, Cr, Cu, In, Sb, and Bi, are dispersed within an $Li_2O$ matrix; and
(i) an intermediate layer having a lithium occlusion capacity, which is present at an interface between the carbon fiber current collector and the outer layer.

[Method for Fabricating Fiber Negative Electrode for Lithium Secondary Battery]

(32) A method for fabricating a fiber negative electrode for a lithium secondary battery includes: forming a coating of one of Sn and a Sn alloy, and a coating of at least one kind of metal selected from the group consisting of Fe, Mo, Co, Ni, Cr, Cu, In, Sb, and Bi, on a carbon fiber current collector by an electroplating method; and then performing heat treatment under a trace oxygen atmosphere at 350 to 650° C. on the carbon fiber current collector on which the coatings are formed.

(33) Preferably, a conductant agent and/or a binder are dispersed in an electroplating bath, and co-deposition plating with the conductant agent and/or the binder is performed on the carbon fiber current collector.

(34) Preferably, a negative electrode that is fabricated by the method for fabricating a fiber negative electrode for a lithium secondary battery is predoped with lithium.

[Lithium Secondary Battery]

(35) Preferably, a lithium secondary battery includes: the above fiber negative electrode for a lithium secondary battery; an electrolyte; and a positive electrode.

(36) Preferably, the lithium secondary battery includes: the above fiber negative electrode for a lithium secondary battery; the above fiber positive electrode for a lithium secondary battery; and an electrolyte.

Hereinafter, the present invention will be described in detail.

1. Fiber Positive Electrode for Lithium Secondary Battery and Method for Fabricating Fiber Positive Electrode.

A method for fabricating a fiber positive electrode for a lithium secondary battery, according to the present invention, includes the steps of:
(a) forming a tubular coating of either a transition metal oxide or a transition metal hydroxide on a carbon fiber current collector; and
(b) performing, in a lithium ion containing solution in a sealed system under presence of an oxidant or a reductant, heat treatment at 100 to 250° C. on the carbon fiber current collector, on which the tubular coating of either the transition metal oxide or the transition metal hydroxide is formed, to obtain a coating of a lithium-doped transition metal oxide on the carbon fiber current collector.

[Step (a)]

The step (a) is a step of forming a tubular coating of either a transition metal oxide or a transition metal hydroxide on a carbon fiber current collector.

[Carbon Fiber Current Collector]

If the current collector is formed of thin columnar electrically conductive fibers, instead of being formed as, for example, a plate current collector or a foil current collector, then a tubular active material layer is formed on each fiber in the step (b). In this case, since the active material layer forms a fully tubular shape, its volume change due to charging and discharging is suppressed. Accordingly, even in a case where expansion and contraction repeatedly occur, detachment and dropping of the active material layer are less likely to occur as compared to a plate electrode. This brings advantages such as an improved charge/discharge cycle life and improved output characteristics. Further, by bundling these fibers together, the fibers are pressure bonded to each other. This effectively prevents the dropping of the active material.

If the diameter of the carbon fiber current collector is small, its mechanical strength is insufficient. Therefore, it is highly likely that the fibers are cut due to a clamping force if the fibers are bundled by means of a solderless terminal, or that the fibers are cut due to the weight of an active material adhered thereto. Further, if the diameter of the carbon fiber current collector is small, its electrical conductivity is low. This results in a difficulty in realizing uniform deposition of the active material. On the other hand, if the diameter of the carbon fiber current collector is large, then the active material layer tends to easily detach from the current collector. Accordingly, there is a fear that the charge/discharge cycle life is reduced. This problem is related to the curvature of the side of the fibers. For example, if the single fiber diameter of the carbon fiber current collector is not very large, then the curvature of the active material layer formed thereon is large in the circumferential direction. In this case, distortion of the active material layer does not easily occur. Specifically, the deposited active material layer, which has a continuous shape, forms a tube. Accordingly, elasticity of the tube, which is formed by the continuous active material layer, is exerted. Therefore, even if the active material layer expands or contracts, detachment of the active material layer does not easily occur. However, if the single fiber diameter is large, then the curvature is small. In such a case, the shape of the fiber, in the circumferential direction, is closer to a flat shape than in the case of a small single fiber diameter. In this case, the shape of the active material layer coating is also closer to a flat shape. This increases the probability of the occurrence of distortion of the active material layer. As a result, detachment and dropping of the active material layer occur more easily. Further, if fibers having a large diameter are bundled together to form an electrode, then the size of the electrode is increased, which results in a decreased active material filling amount per volume of the electrode.

In view of the above, it is preferred that the carbon fiber current collector used in the present invention is a thin columnar electrically conductive fiber having a diameter of 1 to 100 μm. More preferably, the fiber diameter is 5 to 10 μm. The fiber used herein may be either a single fiber or a multifilament that is formed of a collection of a plurality of single fibers. The length and aspect ratio of the carbon fiber current collector are not particularly limited. However, it is preferred that the length is approximately 10 to 1000 mm, and the aspect ratio is approximately 2000 to 200000. In a case where a multifilament is formed by collecting a plurality of single fibers, if the number of collected fibers is small, then its function as an active material retainer, that is, of the fibers preventing the active material from dropping by being pressure-bonded to each other, may decrease. On the other hand, if the number of collected fibers is large, it becomes difficult to uniformly form a tubular active material layer on each fiber. For these reasons, it is preferred that 100 to 5000 single fibers are made into one bundle. More preferably, 1000 to 4000 single fibers are made into one bundle. A single electrode is formed by fixing one end of the bundle of fibers by means of a solderless terminal or the like.

Alternatively, a fiber that is formed by twisting 2 to 10 single fibers together may be used. It is more preferred if 50 to 1000 such twisted threads of fibers are bundled together to form an electrode.

The composition of the current collector is C (carbon). Alternatively, the composition of the current collector may be, for example, the following: a metal selected from among Al (aluminum), Ti (titanium), Cr (chrome), Zr (zirconium), Hf (hafnium), Ta (tantalum), and W (tungsten); an alloy formed of these metals; or stainless steel. However, it is preferred to use C since C is best in terms of the degree of adhesion to the active material, and C is favorable in terms of cost.

It is possible to directly use a carbon fiber as a current collector. Although carbon is easily oxidized at high voltages, this problem can be solved by coating the carbon fiber current collector with Al. Moreover, by coating the carbon fiber current collector with Al, the electrical conductivity of the carbon fiber is improved. Thus, coating a carbon fiber current collector with Al is a desirable method for fabricating a current collector for use in high-output applications.

Examples of methods applicable for coating a carbon fiber current collector with Al to form an Al coating include a physical thin film formation method and an electrolytic plating method. However, it is preferred to employ an electrolytic plating method, considering that the surface of a carbon fiber has small projections and recesses, and that it is necessary to uniformly coat each of a few thousand fibers in a carbon fiber bundle with Al.

However, since Al has a great affinity for oxygen and the oxidation-reduction potential of Al is lower than that of hydrogen, it is difficult to perform electrolytic plating with Al in a plating bath of an aqueous solution type. Therefore, it is desired that electrolytic plating with Al is performed in a plating bath that is not of an aqueous solution type (e.g., an organic solvent type or an ionic liquid type). According to an electrolytic plating method of a non-aqueous solution type, so long as a carbon fiber current collector is in contact with a plating bath, a uniform Al coating can be formed even on a carbon fiber bundle that has a complex and intricate shape.

As described above, the surface of a carbon fiber has small projections and recesses (a groove forming such a recess has a width of approximately 5 to 1000 nm, and the height of the groove is approximately 5 to 1000 nm). If the thickness of the Al coating is too large, then it is difficult to form an Al coating that reflects these projections and recesses. On the other hand, if the thickness of the Al coating is too small, there is a fear that carbon comes into contact with an electrolyte solution and is thereby oxidized. Also, such an Al coating does not have sufficient electrical conductivity. For these reasons, it is preferred that the thickness of the Al coating is 0.1 µm to 1 µm.

Examples of a plating bath of a non-aqueous solution type for forming an Al coating on the carbon fiber current collector include: aluminum chloride-1-ethyl-3-methylimidazolium chloride ($AlCl_3$-EMIC) room temperature molten salt; aluminum chloride-1-butylpyridinium chloride ($AlCl_3$-BPC) room temperature molten salt; and other room temperature molten salts each consisting of aluminum chloride and a quaternary ammonium salt that is represented by the following general formula: $[(R^1)_3N+R^2]X^-$ (wherein $R^1$ is an alkyl group containing 1 to 12 carbon atoms, $R^2$ is an alkyl group containing 1 to 12 carbon atoms, and X is halogen atom). Thus, an existing plating bath can be used.

[Transition Metal Oxide or Transition Metal Hydroxide]

A transition metal oxide or a transition metal hydroxide herein is not particularly limited, so long as the transition metal oxide or the transition metal hydroxide can be used to form a coating on the carbon fiber current collector. Examples of the transition metal oxide or the transition metal hydroxide include $TiO$, $Ti_2O_3$, $TiO_2$, $V_2O_3$, $V_2O_5$, $CrO$, $Cr_2O_3$, $CrO_2$, $MnO$, $Mn_3O_4$, $Mn_2O_3$, $MnO_2$, $MnO_3$, $FeO$, $Fe_3O_4$, $Fe_2O_3$, $CoO$, $Co_2O_3$, $Co_3O_4$, $CoO_2$, $NiO$, $Ni_3O_4$, $Ni_2O_3$, $NiO_2$, $Cu_2O$, $CuO$, and $ZnO$. Any of these hydrous oxides and hydroxides can be used as the transition metal oxide or the transition metal hydroxide.

Considering the capacity of the positive electrode to be fabricated, $V_2O_3$, $V_2O_5$, $MnO$, $Mn_3O_4$, $Mn_2O_3$, $MnO_2$, $MnO_3$, $FeO$, $Fe_3O_4$, $Fe_2O_3$, $CoO$, $Co_2O_3$, $Co_3O_4$, $CoO_2$, $NiO$, $Ni_3O_4$, $Ni_2O_3$, $NiO_2$, and the like, are preferred. In terms of cost, $V_2O_3$, $V_2O_5$, $MnO$, $Mn_3O_4$, $Mn_2O_3$, $MnO_2$, $MnO_3$, $FeO$, $Fe_3O_4$, $Fe_2O_3$, $NiO$, $Ni_3O_4$, $Ni_2O_3$, $NiO_2$, and the like, are preferred. Considering the positive electrode voltage, $MnO$, $Mn_3O_4$, $Mn_2O_3$, $MnO_2$, $MnO_3$, $NiO$, $Ni_3O_4$, $Ni_2O_3$, $NiO_2$, and the like, are preferred.

It is not essential to obtain an oxide in the step (a) since a hydroxide coating is oxidized in the following step (b). However, by performing oxidation in the air, a dense oxide coating can be obtained, and detachment of the coating from the current collector in the step (b) is suppressed. For this reason, in the case of obtaining a hydroxide coating in the step (a), it is preferred to oxidize the coating in the air.

[Formation of Tubular Coating]

The method for forming, on the carbon fiber current collector, a tubular coating of either a transition metal oxide or a transition metal hydroxide may be, but not limited to, a slurry method, physical thin film formation method, aerosol deposition method, electroplating method, or an electrodeposition method. Hereinafter, each of these coating formation methods will be described.

In the slurry method, for example, a slurry that is obtained by dispersing transition metal oxide particles, or transition metal oxide particles and organic matter, in a solvent, is applied onto the carbon fiber current collector. Then, the solvent is vaporized and thereby an electrode is formed. This is one of the most popular fabrication methods. In the slurry method, however, a thickener, binder, or the like remains in the electrode. This causes decreased electrical conductivity, and also, it is extremely difficult with this method to uniformly apply the slurry onto the current collector of the present invention, which is a very thin fibrous current collector.

Examples of the physical thin film formation method include a vapor deposition method and a sputtering method. Among these methods, if a sputtering method is used, a highly dense transition metal oxide coating or transition metal hydroxide coating can be formed. However, transition metal oxides and transition metal hydroxides both have poor electrical conductivity. Therefore, using a sputtering method to laminate a transition metal oxide or a transition metal hydroxide onto the carbon fiber current collector is inefficient. Even with a vapor deposition method, vapor deposition of an oxide or hydroxide is time consuming, and therefore, not suitable for mass manufacturing.

The aerosol deposition method is a method for jetting, at once, transition metal oxide powder or transition metal hydroxide powder that exists in a positive pressure atmosphere to the carbon fiber current collector that exists in a negative pressure atmosphere, thereby forming a thin film. It should be noted that the positive pressure atmosphere herein refers to a state where the pressure in the atmosphere is higher than that of the surroundings, and the negative pressure atmosphere herein refers to a state where the pressure in the atmosphere is lower than that of the surroundings. However, transition metal oxides and transition metal hydroxides have almost no ductility. Accordingly, even if a transition metal oxide or a transition metal hydroxide is jetted to the carbon fiber current collector with a high pressure, it is difficult for a layer of the transition metal oxide or the transition metal hydroxide to form. In particular, there is a problem in that when a transition metal oxide or a transition metal hydroxide collides with the carbon fiber, the carbon fiber is destroyed.

The electroplating method is a method for electrochemically forming a metal coating on the carbon fiber current collector. However, with the electroplating method, a transition metal oxide cannot be directly laminated onto the carbon fiber current collector. Therefore, it is necessary that the carbon fiber current collector is first plated with a transition metal, and then the transition metal is oxidized by means of high-temperature oxidation treatment such as heat treatment. The high-temperature oxidation treatment performed here may be, for example, to increase the temperature to 500 to 1000° C. under an oxidizing atmosphere.

Conditions for performing the electroplating method are not limited to particular conditions. Although depending on a metal to be plated, the concentration of a transition metal salt to be plated may be adjusted to be within the range of 0.05 to 1 mol/liter, and the electroplating may be performed with a current density of 1 mA/cm$^2$ to 0.1 A/cm$^2$. In this manner, the carbon fiber current collector is plated with the transition metal.

In the electrodeposition method, the carbon fiber current collector on which a coating is to be formed, and an electrode for acting as a counter electrode, are immersed in a solution that contains the compositions of the coating to be formed, and then a current is applied. As a result, the coating is formed on the carbon fiber current collector. If the ions of the compositions of the coating to be formed are cations, a current is applied while the carbon fiber current collector is used as a cathode. In this manner, a metal oxide coating or a hydroxide coating can be formed on the surface of the carbon fiber current collector. Alternatively, a current may be applied while using the carbon fiber current collector as an anode to perform anodic oxidation and also to cause the carbon fiber current collector to capture the composition ions present in a bath. Also in this manner, a coating can be formed on the surface of the carbon fiber current collector. It should be noted that in the case of having obtained not a metal oxide coating but a hydroxide coating, an oxide coating can be obtained by drying the hydroxide coating under an air atmosphere at a temperature of 100° C. or higher.

If the electrodeposition method is used, a transition metal oxide or a transition metal hydroxide can be directly formed on the carbon fiber current collector. Conditions for performing the electrodeposition method are not limited to particular conditions. Although depending on a metal to be deposited, the concentration of a metal salt to be deposited may be adjusted to be within the range of 0.05 to 1 mol/liter, and the electrodeposition may be performed with a current density of 1 mA/cm$^2$ to 0.1 A/cm$^2$.

As described above, in the present invention where the current collector is a carbon fiber, if among the above coating formation methods the aerosol deposition method is used to coat the carbon fiber current collector with a transition metal oxide or a fiber metal hydroxide, then the current collector is destroyed. Thus, performing the coating with the aerosol deposition method is very difficult. It is also very difficult with the slurry method or the physical thin film formation method to uniformly form a transition metal oxide coating or a transition metal hydroxide coating. Therefore, it is preferred to use other methods including the electroplating method and the electrodeposition method for forming a transition metal oxide coating or a fiber metal hydroxide coating on the carbon fiber current collector. According to the electroplating method, electrodeposition method, or the like, a transition metal oxide coating or a transition metal hydroxide coating can be formed on the surface of the carbon fiber current collector, so long as the carbon fiber current collector is in contact with an electroplating bath or an electrodeposition bath. Moreover, these methods realize favorable adhesion and improved smoothness of the coating surface, and allow uniform lamination to be readily performed on a large area at low cost. In particular, the electrodeposition method is the most preferable method since it allows a transition metal oxide or a transition metal hydroxide to be directly formed on the current collector.

In the case of forming a transition metal coating, transition metal oxide coating, or transition metal hydroxide coating with the electroplating method or electrodeposition method, it is preferred that a conductive assistant is dispersed in a treatment bath (an electroplating bath or electrodeposition bath), and at the time of performing electroplating or electrodeposition, the conductive assistant is co-deposited with a transition metal, transition metal oxide, or transition metal hydroxide. As a result, the conductive assistant is contained in the deposited coating. In this manner, a positive electrode with improved electrical conductivity and reduced internal resistance can be obtained. However, if the co-deposition is performed with the electroplating method, there is a fear that the conductive assistant is oxidized in the oxidation treatment at the latter stage. Therefore, it is preferred to employ the electrodeposition method, which includes no oxidation treatment step, as a co-deposition method for forming a transition metal coating, transition metal oxide coating, or transition metal hydroxide coating.

The conductive assistant to be added into the electroplating bath or the electrodeposition bath may be any material, so long as it has electrical conductivity and stably exists with a positive electrode potential. Specifically, preferred examples of the conductive assistant include a carbon black and aluminum fine powder. Approximately 1 to 20 wt % of the conductive assistant may be added to the electroplating bath or the electrodeposition bath. Here, the conductive assistant is easily dispersed in the electrodeposition bath if approximately 1 wt % of a surfactant is added. The surfactant used here may be, but not limited to, a cationic surfactant, anionic surfactant, amphoteric surfactant, or a non-ionic surfactant. Examples of suitable surfactants include: TAMOL (registered trademark) SN and TAMOL (registered trademark) LG commercially available from Rhom and Haas Company; TRITON (registered trademark) series also commercially available from Rhom and Haas Company; MARASPERSE (registered trademark) series and IGEPAL (registered trademark) series commercially available from GAF; TERGITOL (registered trademark) series and STRODEX (registered trademark) PK-90 also commercially available from GAF; PLURONIC (registered trademark) F-68 commercially available from BASF; and KARASPERSE TU (registered trademark) commercially available from Marasperse.

Preferably, the amount of lamination of a transition metal oxide coating or a transition metal hydroxide coating on the carbon fiber current collector is 1 to 30 mg/cm$^2$. By setting the amount of lamination within this range, a necessary capacity for the battery can be obtained, and also, delamination between the transition metal oxide layer and the current collector becomes less likely to occur.

Although the average thickness of the transition metal oxide coating or the transition metal hydroxide coating is not limited to a particular thickness, the average thickness is usually in the range of approximately 0.5 μm to 30 μm, and is preferably in the range of approximately 1 μm to 10 μm.

[Step (b)]

The next step (b) is a step of performing, in a lithium ion containing solution in a sealed system under presence of an oxidant or a reductant, heat treatment at 100 to 250° C. on the carbon fiber current collector, on which the tubular coating of either the transition metal oxide or the transition metal hydroxide is formed, to obtain a coating of a lithium-doped transition metal oxide on the carbon fiber current collector.

For example, a transition metal oxide coating is formed on the carbon fiber current collector, which transition metal oxide coating is represented by the following formula (1): $M_aO_b$ (wherein: M is at least one kind of transition metal selected from the group consisting of Ti, V, Cr, Mn, Fe, Co, and Ni; 1≤a≤3; and 1≤b≤5). Then, the current collector, on which the transition metal oxide coating is formed, is subjected to heat treatment in a lithium ion containing solution under the presence of an oxidant or a reductant at 100 to 250° C. As a result, lithium modification occurs to the transition metal oxide formed on the carbon fiber current collector, and the transition metal oxide becomes a lithium-doped transition metal oxide represented by the following formula (2): $Li_dM_eO_c$ (wherein: 2≤c≤5; 0<d≤2; 1≤e≤5; and M is the same as in formula (1)).

Here, considering the capacity of the positive electrode, preferred examples of M include V, Mn, Fe, Co, and Ni. Among these, Mn, Fe, and Ni are preferred in terms of cost.

Specifically, if $Mn_3O_4$ is used as the transition metal oxide, the resultant lithium-doped transition metal oxide is represented by the following formula (2-1): $Li_{d1}Mn_{e1}O_{c1}$ (wherein: the valence of Mn is in the range of 3 to 4; 2≤c1≤4; 0<d1≤2; and 1≤e1≤2).

In relation to the formula (1), a×α=b×2 represents a relationship among the number of atoms "a" of the transition metal M, the number of atoms "b" of oxygen O, and the valence α of the transition metal M. In relation to the formula (2), d×1+e×β=c×2 represents a relationship among the number of atoms d of lithium Li, the number of atoms e of the transition metal M, the number of atoms c of oxygen O, and the valence β of the transition metal M. Similarly, in relation to the formula (2-1), d1×1+e1×β1=c1×2 represents a relationship among the number of atoms d1 of lithium Li, the number of atoms e1 of manganese Mn, the number of atoms c1 of oxygen O, and the valence β1 of manganese Mn. Thus, the number of atoms of each element is specified in accordance with its valence.

However, if a lithium manganese oxide such as $Li_{1+x}Mn_2O_4$ or $Li_xMn_2O_4$ is used as a positive-electrode active material in a lithium secondary battery, Mn is eluted at high temperatures. This results in significant capacity deterioration.

In order to suppress such elution of manganese, it is preferred to use a material in which a part of manganese is replaced with, for example, Al, P, Ti, Cr, Fe, Co, Ni, Cu, Sr, Y, Zr, In, Sn, or an rare earth element. Moreover, considering the structural stability and the voltage of the positive electrode, it is preferred to use a material in which a part of manganese is replaced with, for example, Al, Cr, Co, or Ni. Furthermore, in terms of cost, it is more preferred to use a material in which a part of manganese is replaced with, Al or Ni, for example.

To be specific, a transition metal oxide coating is formed on the carbon fiber current collector, which transition metal oxide coating is represented by the following formula (I-2): $(Mn_{1-x}A_x)_3O_4$ (wherein: A is at least one element selected from the group consisting of Al, Ti, Cr, Fe, Co, Ni, Cu, Sr, Y, Zr, and a rare earth element; and 0.05≤x≤0.25).

Thereafter, the transition metal oxide coating is doped with lithium. In this manner, a lithium-doped transition metal oxide coating is formed, which is represented by the following formula (2-2): $Li_{d2}(Mn_{1-y}A_y)_{e2}O_{c2}$ (wherein: the valence of Mn is in the range of 3 to 4; 2≤c2≤4; 0<d2≤2; 1≤e2≤2; 0.05≤y≤0.25; and A is the same as in the formula (1-2)).

Also in this case, similar to the above, in relation to the formula (2-2), d2×1+e2×=2=c2×2 represents a relationship among the number of atoms d2 of lithium Li, the number of atoms e2 of $(Mn_{1-y}A_y)$, the number of atoms c2 of oxygen O, and the valence β2 of the transition metal M.

It should be noted that in the case of forming a transition metal oxide coating on the carbon fiber current collector, a coating of two or more types of metal oxides, for example, a nickel oxide and a manganese oxide, may be formed on the carbon fiber current collector, and then the carbon fiber current collector, on which the coating of the nickel oxide and the manganese oxide is formed, is subjected to heat treatment in a lithium ion containing solution under the presence of an oxidant or a reductant. In this manner, a positive electrode of which an active material is a lithium nickel manganese oxide can be obtained. As an alternative manner, a transition metal oxide coating formed of two or more types of metal oxides may be obtained on the carbon fiber current collector by dispersing transition metal oxide fine particles in an electrodeposition bath and co-depositing them on the carbon fiber current collector. The obtained transition metal oxide coating may be subjected to heat treatment in the above-described manner.

[Oxidant and Reductant]

The oxidant may be of any type, so long as it is oxidative. Examples of the oxidant include air, oxygen, ozone, chlorine, bromine, a chlorate, peroxodisulfuric acid, a hypochlorite, and hydrogen peroxide solution. A hypochlorite is particularly preferred as the oxidant. More preferably, sodium hypochlorite is used as the oxidant.

The reductant may be of any type, so long as it has reduction ability. Examples of the reductant include hydrogen, formaldehyde, and sodium ascorbate. Preferably, the reductant is sodium isoascorbate.

Further, the oxidant or the reductant may be a suitable gas. That is, a lithium-doped transition metal oxide coating can be obtained under the presence of an oxidant or a reductant by a method utilizing gaseous contact. The gaseous contact can be realized by injecting a gas into a lithium ion solution. Examples of the gas injected here include air, dilution air mixed with an inert gas, an oxidation gas (e.g., $O_2$, $O_3$, or $N_2O$), and a reducing gas (e.g., $H_2$, $H_2S$, $SO_2$, or HCHO). It should be noted that if the present invention is implemented in the atmosphere, oxygen in the air acts as an oxidant. For this reason, it is preferred to implement the present invention in an inert gas.

In the step (b), a lithium ion amount and an oxidant amount or a reductant amount vary depending on the amount, the form oxidation, etc., of the transition metal oxide. That is, a lithium ion amount and an oxidation equivalent or a reducing equivalent necessary for a starting material to be a target product, may be estimated.

In the case of producing $Li_dM_eO_c$ from the above $M_aO_b$, (β−α) or more oxidation equivalents of an oxidant may be used per equivalent of the transition metal oxide $M_aO_b$ if the valence of the transition metal M in the formula (1) is α and the valence of the transition metal M in the formula (2) is β. However, if the value of β−α is a negative real number, then (α−β) reducing equivalents of a reductant are used.

Described below is a specific example of the amount of usage of the oxidant or the reductant in the case of assuming that an ideal reaction occurs.

If the usage amount is 0.4 oxidation equivalent or more per equivalent of a starting material $Mn_3O_4$ (the valence a of Mn is 2.6+), then a target product $LiMnO_2$ (the valence β of Mn is 3+) is obtained. If the usage amount is 0.9 oxidation equivalent or more per equivalent of the starting material $Mn_3O_4$ (the valence a of Mn is 2.6+), then a target product $LiMn_2O_4$ (the valence of Mn is 3.5+) is obtained.

If the usage amount is one oxidation equivalent or more per equivalent of a starting material MnO (the valence of Mn is 2+), then a target product $LiMnO_2$ (the valence of Mn is 3+) is obtained. If the usage amount is 1.5 oxidation equivalents or more per equivalent of the starting material MnO (the valence of Mn is 2+), then a target product $LiMn_2O_4$ (the valence of Mn is 3.5+) is obtained.

If the usage amount is 0.5 reducing equivalent or more per equivalent of a starting material $MnO_2$ (the valence of Mn is 4+), then a target product $LiMn_2O_4$ (the valence of Mn is 3.5+) is obtained. If the usage amount is one reducing equivalent or more per equivalent of the starting material $MnO_2$ (the valence of Mn is 4+), then a target product $LiMnO_2$ (the valence of Mn is 3+) is obtained.

If the usage amount is one oxidation equivalent or more per equivalent of a starting material NiO (the valence of Ni is 2+), then a target product $LiNiO_2$ (the valence of Ni is 3+) is obtained.

If the usage amount is 0.5 reducing equivalent or more per equivalent of a starting material $V_2O_5$ (the valence of V is 5+), then a target product $LiV_2O_5$ (the valence of V is 4.5+) is obtained. If the usage amount is one reducing equivalent or more per equivalent of the starting material $V_2O_5$ (the valence of V is 5+), then a target product $Li_2V_2O_5$ (the valence of V is 4+) is obtained. If the usage amount is two reducing equivalents or more per equivalent of the starting material $V_2O_5$ (the valence of V is 5+), then a target product $Li_4V_2O_5$ (the valence of V is 3+) is obtained.

If the usage amount is one oxidation equivalent or more per equivalent of a starting material $V_2O_3$ (the valence of V is 3+), then a target product $Li_2V_2O_5$ (the valence of V is 4+) is obtained.

In reality, however, it is difficult to cause an ideal reaction. Therefore, it is preferable to add the oxidant or the reductant by an amount that is one to eight times more than the theoretical equivalent. It is more preferable to add the oxidant or the reductant by an amount that is 1.5 to 4 times more than the theoretical equivalent.

[Heat Treatment]

At the time of performing heat treatment in the step (b), if the lithium ion containing solution that contains an oxidant or a reductant is under alkaline conditions, then the solution may be heated as it is. However, if the lithium ion containing solution is under acidic conditions, in particular, if the pH value (hydrogen ion concentration index) is small, then the solution may be heated with a substance for increasing the pH value added thereto. Examples of the added substance include: an alkali hydroxide such as sodium hydroxide, potassium hydroxide, or lithium hydroxide; an ammonia compound such as ammonia gas or ammonia water; and an alkaline carbonate compound such as sodium carbonate, potassium carbonate, lithium carbonate, or ammonium carbonate.

The lithium ion containing solution used in the heat treatment may be of any type, so long as lithium ions are dissolved therein. For example, in the case of performing hydrothermal synthesis, the lithium ion containing solution may be prepared by dissolving a water-soluble lithium compound in water. Specifically, a lithium chloride solution, lithium nitrate solution, lithium hydroxide solution, or the like may be suitably used as the lithium ion containing solution. A single or a mixture of two or more types of water-soluble lithium compounds may be used to prepare the lithium ion containing solution. The water-soluble lithium compounds used here may be either anhydrous compounds or hydrated compounds.

It should be noted that a lithium ion containing solution, to which 5 to 20 mol % of sodium (Na) ion or potassium (K) ion is added, may be used as a treatment field. This makes it possible to obtain a lithium-doped transition metal oxide, the lithium sites of which are partially replaced with Na or K. For example, if 50% or more lithium ions are released from $LiCoO_2$ or the like which has a layered structure ($Li_{0.5}CoO_2$), then its crystal structure is deformed. Accordingly, the reversibility of lithium occlusion and release decreases, resulting in a poor charge/discharge cycle life. For this reason, it is necessary to confine the obtained discharge capacity to a level of approximately 150 mAh/g. Thus, if the Li sites of a positive electrode material that allows the use of a theoretical capacity only by approximately 50% are partially replaced with Na or K, then the use of the theoretical capacity is enabled up to approximately 80%. Similar to the source of lithium, the source of Na or K may be dissolved in the treatment field (i.e., the lithium ion containing solution). For example, a water-soluble sodium compound or potassium compound may be dissolved in water. Specifically, a sodium chloride solution, sodium nitrate solution, sodium hydroxide solution, or the like may be suitably used. A single or a mixture of two or more types of such water-soluble sodium compounds, or a single or a mixture of two or more types of such water-soluble potassium compounds, may be used. The water-soluble compounds used here may be either anhydrous compounds or hydrated compounds.

The usage amount of the water-soluble lithium compound may be determined such that lithium is added to the solution by a theoretical amount for obtaining a target product, or more, in terms of the elemental molar ratio of lithium to the number of moles of the transition metal in the target transition metal oxide. It is preferable to add lithium by an amount that is one to five times more than the theoretical amount. It is more preferable to add lithium by an amount within the range of one to three times more than the theoretical amount. Preferably, the concentration of the water-soluble lithium compound is in the range of 0.05 to 10 mol/liter. More preferably, the concentration of the water-soluble lithium compound is in the range of 1 to 6 mol/liter. In the case of using a sodium compound or a potassium compound, the usage amount thereof may be determined such that Na or K is added to the treatment field (i.e., the lithium ion containing solution) by approximately 5 to 20 mol % relative to the lithium concentration.

The temperature at which to perform in the lithium ion containing solution the heat treatment on the carbon fiber current collector, on which a tubular coating of either a transition metal oxide or a transition metal hydroxide is formed, is set to 100 to 250° C. Preferably, the temperature of the heat treatment is set to 100 to 200° C. Even if the temperature of the heat treatment is less than 100° C., the reaction still occurs. In this case, however, the reaction rate is slow. Therefore, it is preferred that the temperature of the heat treatment is 100° C. or higher. Moreover, if the heat treatment is to be performed at a temperature higher than 250° C., then a large-scale device is necessary for the heat treatment, resulting in a high cost. It is preferred that the heat treatment is performed under the presence of an oxidant or a reductant in the following manner: the carbon fiber current collector on which a transition metal oxide coating or a transition metal hydroxide coating is formed is placed in the lithium ion containing solution; the solution in which the carbon fiber current collector is placed is contained in a pressure-resistant and corrosion-resistant container and the container is sealed; and the heat treatment is performed under pressure or under saturated vapor pressure.

The heat treatment performed here may be, but not limited to, a solvothermal method. The solvothermal method is a method for performing a chemical reaction (e.g., dissolution, deposition, oxidation, reduction, ion exchange, or crystallization) in a high-temperature and high-pressure liquid reaction field by using a high-temperature and high-pressure sealed container such as an autoclave. Examples of a liquid used in this method include: water, an alcohol, acetone, ethylene glycol, an organic solvent such as one produced by combining these, and an ionic liquid such as imidazole salt ionic liquid, pyridinium salt ionic liquid, or onium salt ionic liquid. In particular, a substance that is solid at ordinary temperatures but transforms into liquid at high temperatures, such as choline chloride, may be used as a reaction field. It should be noted if water is used as a liquid for a synthesis treatment, then the synthesis treatment is called hydrothermal synthesis. In the present invention, performing hydrothermal synthesis is preferred from the environmental point of view as well as in terms of workability, cost, etc.

Examples of a material preferably used for the pressure-resistant and corrosion-resistant container include alloy materials such as Hastelloy alloys, Inconel alloys, and stainless steel. Among these, Hastelloy alloys and Inconel alloys are more preferred.

The hydrothermal treatment may be performed under a pressure of 0.05 to 40 MPa. Setting the pressure within this range allows the transition metal to be sufficiently lithium-doped, and eliminates the necessity of using a large-scale pressure-resistant and corrosion-resistant container. Accordingly, setting the pressure within this range is preferable from the economic point of view. In view of the above, it is preferred that the hydrothermal treatment is performed under a pressure of 0.1 to 10 MPa.

Although depending on the temperature at which to perform the heat treatment, the heat treatment time may be five hours or longer if the temperature is in the range of 100 to 200° C., or may be three hours or longer if the temperature is in the range of 200 to 400° C. Preferably, the heat treatment time is suitably set so as not to cause the active material adhered to the carbon fiber current collector to drop therefrom. To be specific, it is suitable if the heat treatment time is within the range of 5 to 50 hours. Preferably, the heat treatment time is within the range of 10 to 30 hours.

In the manner as described above, a fiber positive electrode of which the carbon fiber current collector is coated with the lithium-doped transition metal oxide can be obtained. It should be noted that if moisture is removed from the fiber positive electrode by drying the fiber positive electrode under a reduced pressure at a temperature of approximately 80 to 150° C., then the fiber positive electrode can be used as a more favorable electrode.

On the fiber positive electrode of the present invention obtained in the above-described manner, an active material layer having a tubular shape is directly formed on the carbon fiber current collector. Accordingly, a step where an active material is made into an electrode, which is necessary in the conventional art, is no longer necessary. That is, the production of the active material and the fabrication of the fiber positive electrode can be performed at the same time.

In the present invention, the lithium-doped transition metal oxide is flake-shaped and is formed perpendicularly to the surface of the carbon fiber current collector. The lithium-doped transition metal oxide has a thickness of 5 to 500 nm, a width of 0.1 to 10 μm, and a length of 0.1 to 10 μm. The term flake-shaped in the present invention refers to shapes of thin pieces, the thickness of which is less than its length.

Among shapes of such thin pieces, the term flake-shaped refers to even a roundish shape and a shape of which the corners, apexes, or sides are partially chipped. It should be noted that it is not necessary for all of the individual particles of the active material to have the same shape. The particles may include those which have irregular shapes as indicated in a conceptual diagram shown in FIG. 1.

The wording "perpendicularly formed" herein refers to the formation of the lithium-doped transition metal oxide perpendicularly to the surface of the carbon fiber current collector 1 as shown in FIG. 1. In FIG. 1, the reference numeral 2 indicates the lithium-doped transition metal oxide.

As described above, in the fiber positive electrode of the present invention, an agglomerate of the flake-shaped positive-electrode active material is formed into a mass, and the mass is perpendicularly adhered to the carbon fiber current collector. In this manner, a porous positive-electrode active material layer is formed. Accordingly, the electrode has a significantly large surface area and a structure that allows an electrolyte solution to easily permeate, and is capable of mitigating a stress that occurs due to expansion/contraction in the volume of the active material. In addition, since the current collector is formed of a thin columnar electrically conductive fiber, a tubular active material layer is formed on the fiber. As a result, a significantly large electrode surface area is obtained. Here, since the active material layer forms a fully tubular shape, its volume change due to charging and discharging is suppressed. Accordingly, even in a case where expansion and contraction repeatedly occur, detachment and dropping of the active material layer are less likely to occur as compared to a plate electrode. Furthermore, if fibers of this type are bundled together, the fibers are pressure-bonded to each other and thus effectively prevent the dropping of the active material. Such a super three-dimensional structure realizes a long-lived fiber positive electrode having excellent electrode characteristics.

A negative electrode to be used in the lithium secondary battery that uses the fiber positive electrode of the present invention is not particularly limited. A publicly known negative electrode may be used in the lithium secondary battery. Examples of such a publicly known negative electrode include a carbon electrode using graphite or the like, an alloy electrode using $Cu_3Sn$ or the like, an oxide electrode using SnO, SiO, or the like, and a nitride electrode using LiN or the like. Moreover, a fiber negative electrode of the present invention may be used as a counter electrode.

2. Fiber Negative Electrode for Lithium Secondary Battery and Method for Fabricating Fiber Negative Electrode According to a lithium secondary battery that uses a fiber negative electrode of the present invention for use in a lithium secondary battery has a great charge/discharge capacity owing to the presence of Sn (tin).

A fiber negative electrode for a lithium secondary battery, according to the present invention, is obtained by: forming a coating of one of Sn and a Sn alloy, and a coating of at least one kind of metal selected from the group consisting of Fe (iron), Mo (molybdenum), Co (cobalt), Ni (nickel), Cr (chrome), Cu (copper), In (indium), Sb (antimony), and Bi (bismuth), on a carbon fiber current collector by an electroplating method; and then performing heat treatment under a trace oxygen atmosphere at 350 to 650° C. on the carbon fiber current collector on which the coatings are formed.

[Carbon Fiber Current Collector]

Preferably, the carbon fiber current collector used in the present invention is a carbon fiber having a diameter of 1 to 100 μm. As described in Patent Literature 3, in cases of well-known foil current collectors, a plating layer formed thereon is detached at temperatures higher than 190° C. It is more preferable if the carbon fiber has a diameter of 5 to 10 μm. The reason for this is the same as in the case of the above-described fiber positive electrode. If the diameter of the carbon fiber is as small as less than 1 μm, then its mechanical strength and electrical conductivity are low, which makes electrode fabrication difficult. If the diameter of the carbon fiber exceeds 100 μm, then its low curvature tends to cause distortion of an active material layer, resulting in that detachment and dropping of the active material layer easily occur. Moreover, in this case, the increased electrode size causes a problem of decreased active material filling amount per volume of the electrode. Also in the case of fabricating a fiber negative electrode, a carbon fiber used for fabricating the negative electrode may be either a single fiber or a collection of a plurality of single fibers.

As described below, in the case of plating a carbon fiber with a metal M, a binder may be co-deposited by plating. In this case, if the cross section diameter of the fiber is large, then the binding capacity of the binder is reduced. Accordingly, advantages to be obtained from the addition of the binder are reduced. For example, if the diameter of the carbon fiber is 100 μm or less, then the binder molecules connect to each other within an alloy. Accordingly, strong elasticity of a tubular active material layer is exerted. Therefore, even if the alloy expands or contracts, detachment of the active material layer does not easily occur. However, if the diameter of the carbon fiber exceeds 100 μm, then the circumference of the fiber becomes large relative to the size of the binder molecules, causing a problem of reduced connection between the binder molecules in addition to the aforementioned distortion problem caused by a low curvature. Accordingly, advantages to be obtained from the addition of the binder are reduced.

In the case of bundling a plurality of single fibers together, it is preferred that 100 to 5000 single fibers are made into one bundle. More preferably, 1000 to 4000 single fibers are made into one bundle. A single electrode is formed by fixing one end of the bundle of fibers by means of a solderless terminal or the like.

Alternatively, a carbon fiber that is formed by twisting 2 to 10 single fibers together may be used. It is more preferred if 50 to 1000 such twisted threads of carbon fibers are bundled together to form an electrode.

If the number of fibers forming one carbon fiber is less than 10, then its function as an active material retainer, that is, of the fibers preventing the active material from dropping by being pressure-bonded to each other, may decrease. On the other hand, if the number of fibers forming one carbon fiber is more than 5000, it becomes difficult to uniformly form a tubular active material layer on each fiber.

[Intermediate Layer Made of Sn Alloy, and Outer Layer Formed as Composite Layer of Sn Oxide and $M_xO_y$]

In the method for fabricating a fiber negative electrode for a lithium secondary battery of the present invention, a metal plating layer of at least one kind of metal selected from the group consisting of Fe, Mo, Co, Ni, Cr, Cu, In, Sb, and Bi (hereinafter, the at least one kind of selected metal may be referred to as a metal M), and a Sn plating layer or a Sn alloy plating layer, are formed on a carbon fiber current collector by an electroplating method, and then heat treatment is performed thereon. As a result, the metal M plating layer and the Sn plating layer or Sn alloy plating layer, with which the carbon fiber surface is coated, are alloyed with each other. Here, the temperature is increased under a trace oxygen atmosphere. As a result, the alloyed coating (i.e., plating layer) is gradually oxidized from its outer periphery, and is then transformed into a composite layer of a Sn oxide and $M_xO_y$. Here, the number x of metal atoms M is 0<x<3. The number y of oxygen atoms O is 0≤y≤w if the number of oxygen atoms O in a chemical bond with metal atoms M is w based on the stoichiometry. Cu are Ni are preferred as the metal atoms M.

Although the fiber negative electrode for a lithium secondary battery of the present invention has a slightly less charge/discharge capacity than metal lithium, the fiber negative electrode for a lithium secondary battery of the present invention suppresses the formation of a lithium dendrite at the time of charging/discharging, thereby improving the safety of the battery. In a case where a coating of Sn alone is laminated on the surface of the carbon fiber current collector, there is a fear that a whisker is formed from the Sn coating and causes short-circuiting between electrodes. However, the negative electrode for a lithium secondary battery of the present invention prevents the formation of a whisker owing to the presence of the alloy of the metal M and Sn.

Moreover, at the time of forming the metal M coating and the Sn coating or Sn alloy coating, a conductant agent and/or a binder may be dispersed in a plating bath and co-deposition plating may be performed. In this manner, dropping of the active material from the carbon fiber current collector due to changes in the volume of the active material that are caused by charge-discharge reactions, can be prevented, and the electrical conductivity can be improved. In the present invention, an electroplating method is employed for laminating a coating onto the surface of the carbon fiber current collector. This realizes favorable adhesion of the metal M coating and the Sn coating or Sn alloy coating to the carbon fiber current collector, and allows the lamination to be readily performed on a large area at low cost. Although conditions for performing the electroplating method are not limited to particular conditions, the concentration of a metal salt to be deposited may be adjusted to be within the range of 0.1 to 2 mol/liter, and the electroplating may be performed with a low current.

Regarding the Sn alloy, the advantageous effects of the present invention can be obtained, so long as the alloy contains Sn as a main component. Specific examples of the remaining alloy component(s) other than Sn include at least one kind of metal M selected from the group consisting of Fe, Mo, Co, Ni, Cr, Cu, In, Sb, and Bi. Among these metals, Cu and Ni are preferred. An electroplating method is a suitable method for laminating a Sn alloy coating onto the surface of the carbon fiber current collector. The electroplating method realizes favorable adhesion of the Sn alloy coating to the surface of the carbon fiber current collector and improved smoothness of the Sn alloy coating surface, and allows the lamination to be readily performed on a large area at low cost.

[Heat Treatment]

If heat treatment is performed at 300° C. or lower after the metal M coating and the Sn coating or Sn alloy coating are formed, then Sn and the metal M are alloyed with each other. For example, if the metal M is Cu, then Sn and Cu are alloyed with each other. As a result, $Cu_6Sn_5$ and/or $Cu_3Sn$ are obtained. However, a negative electrode obtained at this time is merely alloyed and its surface is not oxidized yet. If the negative electrode is subjected to heat treatment at a temperature higher than 300° C. under a trace oxygen atmosphere, then Sn, the metal M, and the 5 nM alloy are oxidized. For example, if the metal M is Cu, then Sn, Cu, $Cu_6Sn_5$, $Cu_3Sn$, and the like, are oxidized. As a result, $SnO_2$ and $Cu_2O$ are formed.

As described above, a negative electrode formed of $SnO_2$, $M_xO_y$, and the 5 nM alloy can be obtained by properly adjusting the temperature at which to perform the heat treatment, the amount of oxygen in the atmosphere, and the heat treatment time. Here, the temperature at which to perform the heat treatment is 350 to 650° C. Preferably, the temperature is 400 to 500° C. If the temperature is less than 350° C., there is a fear that a Sn oxide or $M_xO_y$ is not formed. On the other hand, if the temperature is higher than 650° C., the carbon fiber is oxidized, which is unfavorable.

The term trace oxygen atmosphere herein refers to an atmosphere in which the oxygen concentration is in the range of 0.05 to 5 vol %. Preferably, the oxygen concentration is in the range of 0.1 to 3 vol %. If the oxygen concentration is higher than 5 vol %, then the laminated material is entirely or almost entirely oxidized, causing a decrease in electrical conductivity, resulting in unfavorable battery characteristics. Accordingly, the advantageous effects of the present invention cannot be obtained. If the oxygen concentration is less than 0.05 vol %, then the laminated material is not oxidized speedily, resulting in an elongated heat treatment time. This is unfavorable also from the economic point of view. If the oxygen concentration is in the range of 0.05 to 5 vol %, then one hour is sufficient as the heat treatment time. Even if the heat treatment time exceeds five hours, it does not affect the result of the heat treatment significantly. However, if the oxidation treatment is performed for an excessively long period of time, then the entire coating is oxidized. Accordingly, the advantageous effects of the present invention cannot be obtained. Gas components in the atmosphere other than oxygen include an inert gas such as Ar. The trace oxygen atmosphere can be realized by reducing the air pressure to the range of 0.01 to 30 Pa, preferably, to the range of 1 to 20 Pa, more preferably, to the range of 1 to 10 Pa. Also in this manner, the same advantageous effects can be obtained.

It is preferred that 1 to 10 μm is the total thickness of: the outer layer, which is a tubular composite layer of the Sn oxide and $M_xO_y$ formed on the carbon fiber current collector; and the intermediate layer.

It should be noted that at the time of performing plating with the metal M and Sn or Sn alloy, a binder or a conductant agent may be dispersed in a plating bath to perform co-deposition plating on the carbon fiber current collector with the binder or the conductant agent. In this manner, the electrical conductivity and cycle life of the formed active material layer can be further improved.

A generally used material can be used as the binder, such as, polytetrafluoroethylene (PTFE), styrene-butylene rubber (SBR), polyvinyl alcohol (PVA), polyethylene (PE), a styrene copolymer, or a cellulose ester. However, those having a water-repellent property, such as PTFE, are not dispersed uniformly. Those having a water-repellent property can be dispersed uniformly in a plating liquid by emulsifying them by means of a surfactant. In such a case, a saponin, a phospholipid, a peptide, or a Triton series surfactant may be effectively used as the surfactant. Approximately 0.1 to 3 wt % of the surfactant may be added to the plating liquid. Among the aforementioned binders, with the use of PTFE, the best battery characteristics and a favorable battery cycle life can be obtained. The amount of the binder contained in the plated coating is preferably 0.5 to 10 wt %, and more preferably, 1 to 5 wt % relative to the plated coating. If the binder is contained by an excessive amount, the internal resistance of the negative electrode becomes great, causing deterioration in high rate discharge characteristics. If the amount of the contained binder is too small, the cycle characteristics are deteriorated.

Examples of the conductant agent include a metal, a carbon black, and a conductive polymer. Among these, a carbon black is preferred. To be specific, acetylene black (AB), KetjenBlack (KB), or the like is preferred. It is preferred that the conductant agent is contained in the plated coating by 0.1 to 10 wt %, and more preferably, 1 to 5 wt % relative to the plated coating. If the amount of the contained conductant agent is less than 0.1 wt %, then advantages brought by containing the conductant agent cannot be obtained, which results in a reduction in high rate discharge characteristics, and is thus not suitable for high-output applications. If the amount of the contained conductant agent exceeds 10 wt %, then dropping of the plated coating easily occurs. This causes a reduction in the capacity of the alloy negative electrode. If the conductant agent is contained by 1 to 10 wt %, then sufficient improvement in electrical conductivity can be obtained, and a reduction in the capacity of the alloy negative electrode can be minimized. If a conductant agent having a water-repellent property such as a carbon black is used, an agitator or ultrasonic waves may be used to disperse the conductant agent. However, even if an agitator or ultrasonic waves are used, it is still difficult to disperse such a conductant agent uniformly. Therefore, a surfactant may be added to the plating liquid. Also in this case, a saponin, a phospholipid, a peptide, and a Triton series surfactant may be effectively used as the surfactant. Here, it is particularly effective if an emulsified binder is added at the same time.

A positive electrode to be used in the lithium secondary battery that uses the fiber negative electrode of the present invention is not particularly limited. A publicly known positive electrode may be used in the lithium secondary battery, for example, a positive electrode using lithium cobalt oxide, lithium nickel oxide, lithium manganese oxide, or lithium iron phosphate. Furthermore, the fiber positive electrode of the present invention may be used as a counter electrode.

3. Lithium Secondary Battery Including Fiber Positive Electrode and Fiber Negative Electrode In order to obtain a lithium secondary battery that uses the fiber positive electrode and/or the fiber negative electrode of the present invention, a lithium ion containing electrolyte is necessary. Here, a lithium salt is suitable as an electrolytic salt. Specifically, the lithium salt may be, but not limited to, lithium hexafluorophosphate, lithium perchlorate, lithium tetrafluoroborate, lithium trifluoromethanesulfonate, or lithium trifluoromethanesulfonimide. One of, or two or more of, these lithium salts may be used. Since the above lithium salts have a high electronegativity and are easily ionizable, the use of these lithium salts makes it possible to realize excellent charge/discharge cycle characteristics and improve the charge/discharge capacity of the secondary battery.

Examples of a solvent for the electrolyte include propylene carbonate, ethylene carbonate, dimethyl carbonate, diethyl carbonate, and γ-butyrolactone. One of, or two or more of, these solvents may be used. In particular, propylene carbonate alone, a mixture of ethylene carbonate and diethyl carbonate, or γ-butyrolactone alone is suitably used as a solvent. Here, in the mixture of ethylene carbonate and diethyl carbonate, the mixture ratio between ethylene carbonate and diethyl carbonate may be adjusted to any ratio, so long as the proportion of ethylene carbonate in the mixture and the proportion of diethyl carbonate in the mixture are both in the range of 10% to 90%.

The separator may be formed of any material, so long as the material has a favorable electron insulating property and favorable ion permeability, and does not react with an electrolyte solution or electrode materials, and stably exists in the battery operating voltage range. Specifically, a conventional polypropylene or polyethylene porous membrane having a large number of fine holes (hereinafter, referred to as a fine porous membrane) may be used. The suitable inner diameter of the holes is approximately 100 nm. The suitable thickness of the membrane is 20 to 60 μm. Examples of suitable separators include: Celgard (registered trademark) series commercially available from Celanese Corporation; E002 and E003 commercially available from Sumitomo 3M Limited; BX-100 commercially available from Mitsubishi Chemical Corporation; LBS-2015 commercial available from NITTO DENKO CORPORATION; and HIPORE 4030U2 commercially available from Asahi Kasei Corporation.

The separator may be formed of a generally used material that is different from polypropylene and polyethylene. Examples of such a generally used material include styrene-ethylene-butylene-styrene copolymer (SEBS), polytetrafluoroethylene (PTFE), styrene-butylene rubber (SBR), polyvinyl alcohol (PVA), a styrene copolymer, and a cellulose ester.

Similar to the case of a plate electrode using a conventional foil current collector, the shape of the separator may be formed in the following manner: a microporous membrane separator sheet is interposed between the fiber positive or negative electrode and a counter electrode. After an injection of an electrolyte solution, sealing is performed. In this manner, a battery is formed.

The separator may be formed in an alternative method as follows: the fiber positive electrode and/or the fiber negative electrode are impregnated with a polymer solution such as a polyethylene solution in which oxide powder such as $SiO_2$ is added and dispersed; then dry treatment is performed to remove a solvent; thereafter, the fiber positive electrode and/or the fiber negative electrode are immersed in a caustic alkali solution heated at 100° C.; and the oxide is dissolved in the caustic alkali solution to form a porous membrane. The oxide used here may be of any type, so long as it is soluble in the caustic alkali solution. Examples of the oxide that may be used here include $SiO_2$ and $Al_2O_3$. Preferably, the particle diameter of the oxide is 10 nm to 10 μm. If the particle diameter is less than 10 nm, then the oxide particles are separated by polyethylene molecules. Accordingly, holes formed as a result of the oxide being dissolved in the caustic alkali solution are less likely to connect to each other, resulting in insufficient ion permeability. If the particle diameter is greater than 10 μm, then the holes formed as a result of the oxide being dissolved in the caustic alkali solution become large, which is likely to cause the electrode surface to be exposed. This tends to become a cause of short-circuiting when the battery is formed. Therefore, the oxide may be added by 10 to 50 wt % relative to the amount of the polymer. More preferably, the oxide may be added by 10 to 30 wt % relative to the amount of the polymer. If the oxide is added by less than 10 wt % relative to the polymer amount, sufficient porosity cannot be obtained. If the oxide is added by more than 50 wt % relative to the polymer amount, porosity is sufficiently obtained, but the strength of the membrane becomes low. This may cause short-circuiting when the battery is formed. The length of time in which the electrode(s) is immersed in the caustic alkali solution is preferably 10 minutes to 50 hours although it depends on the amount of the added oxide. If the length of time in which the electrode(s) is immersed in the caustic alkali solution is shorter than 10 minutes, $SiO_2$ is not sufficiently dissolved, which makes it difficult for a porous membrane to form. If the length of time in which the electrode(s) is immersed in the caustic alkali solution is longer than 50 hours, the membrane strength is reduced, and moisture and the amount of alkaline components accumulated in the fiber increase. As a result, the following washing and drying treatment need to be performed for a long period of time. If $SiO_2$ or $Al_2O_3$ is added by 10 to 50 wt % relative to the polymer amount, then the porosity falls within the range of 30 to 70%. Accordingly, a separator membrane having favorable ion permeability and electron insulating property can be formed on the fiber positive electrode and/or the fiber negative electrode.

LiOH, NaOH, or KOH may be used as the caustic alkali. Alternatively, a mixture of these may be used as the caustic alkali. The concentration of the caustic alkali solution used here is not particularly limited. Typically, a caustic alkali solution of which the concentration is 10 to 30 wt % is used. In a case where the concentration of the caustic alkali solution is lower than 10 wt %, it is necessary to immerse the electrode(s) in the solution for a long period of time in order for the oxide to be dissolved. In a case where the concentration of the caustic alkali solution exceeds 30 wt %, alkaline components tend to remain after the alkali treatment. Therefore, it is necessary to repeat washing treatment many times.

In a lithium ion battery, its electrode surface area is increased when a conventional foil electrode is replaced with a fiber electrode. This improves high output characteristics of the lithium ion battery. However, lithium ions are much larger than protons. Accordingly, the diffusion rate of lithium ions is low, and therefore, the improvement in high output characteristics are not as great as in the case of a nickel-hydrogen battery.

In order to realize significant improvement in high current density charge/discharge characteristics, increasing the surface area of the separator is as important as increasing the surface area of the electrode. In order to do so, a method as described in the present invention may be employed where the positive and negative electrodes are both made of a fiber, and the fiber is impregnated with a polymer solution. In this manner, a thin separator layer is formed on the fiber surface. If such fiber positive and negative electrodes are alternately laminated to form a battery, then the surface area of the separator is greatly increased as compared to a case where a counter electrode is plate-shaped. Also, a distance between electrodes is reduced. This allows lithium ions to move between the electrodes within a short period of time. Thus, a significant improvement in high current density charge/discharge characteristics can be expected.

As compared to conventional plate electrodes, the fiber positive electrode and the fiber negative electrode indicate favorable charge/discharge cycle life characteristics. Accordingly, if a battery is formed by combining the fiber positive electrode or fiber negative electrode with such a plate electrode, the plate electrode becomes degraded before the fiber electrode. As a result, the battery capacity is reduced even if the performance of the fiber electrode is not degraded. On the other hand, if the fiber positive electrode and the fiber negative electrode are combined, electrode degradation is suppressed as compared to the above case. Thus, it can be expected that the charge/discharge cycle characteristics become more long-lived.

The capacity density per volume and the capacity density per weight of the fiber positive electrode and the fiber negative electrode are greater than those of conventional plate electrodes. Therefore, if a battery of a conventional size is formed, the capacity of the battery can be increased and the weight of the battery can be reduced with the use of the fiber electrodes. In this case, however, if a plate electrode is used as a counter electrode, an increase in the battery capacity and a reduction in the battery weight are limited since the volume and weight of the counter electrode are the same as in the conventional art. For example, assume a battery in which the capacity ratio (N/P) between a negative electrode (N) and a positive electrode (P) is 2. In this case, it can be considered that if a flat-plate positive electrode is replaced with a fiber positive electrode, then the volume density of the positive electrode is approximately doubled at the most. Accordingly, space occupied by the positive electrode becomes ½ as compared to space previously occupied by the positive electrode. In order to increase the capacity while maintaining N/P=2, not only a fiber positive electrode but also a flat-plate negative electrode have to be incorporated in the newly available ½ space. Thus, there is a limitation in increasing the capacity. However, if both positive and negative electrodes are replaced with fiber electrodes, then both the positive electrode space and the negative electrode space can be reduced by ½. Here, fiber positive and negative electrodes may be incorporated into the newly available space. Accordingly, the battery capacity can be doubled while maintaining N/P=2.

At the time of charging, Li desorbs from the positive electrode, causing an Li occlusion reaction at the negative electrode. Although lithium that is inserted into the negative electrode desorbs from the negative electrode at the time of discharging, a part of the inserted lithium does not desorb from and remains at the negative electrode. This is called initial irreversible capacity. In the case of a test-use half-cell where metal Li is used for a counter electrode, a great capacity of 3860 mAh/g is achieved. Therefore, even if the irreversible capacity occurs, the battery capacity does not decrease. On the other hand, the above-described Li-doped oxide positive electrode has a capacity of 200 mAh/g. Therefore, an occurrence of the irreversible capacity causes a decrease in the amount of Li re-occlusion by the positive electrode at the time of discharging. This results in a decrease in the capacity of the entire battery. This can be effectively prevented by taking the following measures in advance: form a half-cell with a negative electrode and metal Li, and charge the half cell to predope the negative electrode with Li of an amount that corresponds to the irreversible capacity. This provides an advantage that even if the entire battery is formed by combining the half cell with a positive electrode, a decrease in the battery capacity does not easily occur since the irreversible capacity that exceeds the above amount does not occur.

Advantageous Effects of Invention

The present invention makes it possible to fabricate a fiber positive electrode on which an active material layer is directly formed on a carbon fiber current collector. Therefore, a step where an active material is produced and made into an electrode, which is necessary in the conventional art, is no longer necessary. That is, the production of the active material and the fabrication of the fiber positive electrode can be performed at the same time.

Accordingly, basically, the fiber positive electrode obtained in the present invention does not require the addition of a conductive assistant or a binder, a process of slurrying an active material, a rolling process, etc.

Therefore, according to the present invention, mass manufacturing is readily achievable at low cost. In addition, since the lithium element is contained in the positive-electrode active material of the present invention, it is not necessary to perform lithium doping in advance. This improves the safety in the fabrication steps as well as the safety of the battery.

Further, according to the present invention, the lithium-doped transition metal oxide is flake-shaped and formed perpendicularly to the surface of the carbon fiber current collector. Accordingly, a porous positive-electrode active material layer is formed on the fiber positive electrode, and the fiber positive electrode is long-lived and has excellent electrode characteristics.

In addition, the carbon fiber current collector is formed of a thin columnar electrically conductive fiber. Accordingly, when a tubular active material layer is formed on the fiber, the active material layer has a fully tubular shape. As a result, its volume change due to charging and discharging is suppressed. Accordingly, even in a case where expansion and contraction repeatedly occur, detachment and dropping of the active material layer are less likely to occur as compared to a plate electrode. Furthermore, if fibers of this type are bundled together, the fibers are pressure-bonded to each other and thus effectively prevent the dropping of the active material. This realizes a long-lived fiber positive electrode with excellent electrode characteristics.

A lithium secondary battery using the fiber positive electrode as described above has high current density, high energy density, and excellent charge/discharge cycle characteristics.

The fiber negative electrode for a lithium secondary battery of the present invention is long-lived, has a high charge/discharge capacity, and is easy to fabricate.

A lithium secondary battery that uses such a negative electrode has high current density, high energy density, and excellent charge/discharge cycle characteristics.

Moreover, a lithium secondary battery obtained by combining the fiber positive electrode and the fiber negative electrode of the present invention makes it possible to increase the surface area of a separator significantly and to reduce a distance between electrodes. Accordingly, internal resistance can be reduced significantly, and high current density charge/discharge characteristics can be greatly improved. Furthermore, long life cycle characteristics and a high battery capacity can be obtained.

DESCRIPTION OF EMBODIMENTS

Hereinafter, an embodiment of the present invention will be described. It will be understood that the present invention should not be interpreted in any limited way based on the descriptions in the following Fabrication Examples, Examples, and Test Examples.

1. Fabrication Examples, Examples, and Test Examples in Relation to Fiber Positive Electrode Fabrication Example 1

Electrodeposition Method $Mn_3O_4$/Carbon Fiber

Figure 2:
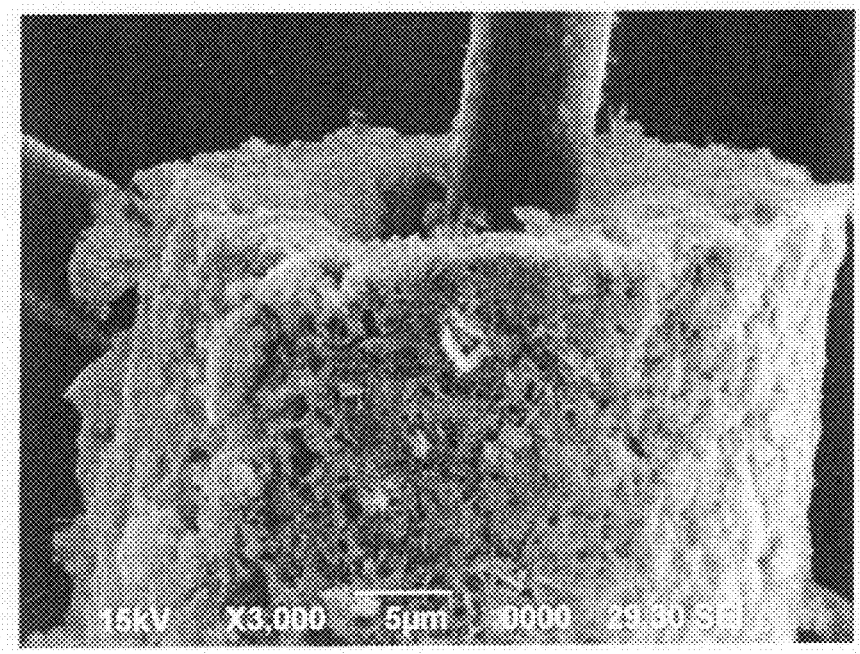
FIG. 2 is an SEM photograph (scanning electron microscope photograph, 3000 magnifications) of a fiber positive electrode in Fabrication Example 1.

Here, an $Mn(NO_3)_2$ solution (0.3 mol/liter) was used for an electrodeposition bath; a carbon fiber (having a diameter of 6 μm) was used for an electrode acting as a working electrode; and a platinum foil was used for its counter electrode. Electrodeposition was performed under the condition of a constant current density of 50 mA/cm$^2$ for 10 minutes. Thereafter, the electrode was washed with water and then dried under an air atmosphere at a temperature of 100° C. for 24 hours or longer. In this manner, the electrode of which the carbon fiber is coated with $Mn_3O_4$ was obtained. It should be noted that only being coated with $Mn_3O_4$ does not allow the electrode to function as a positive electrode. FIG. 2 shows an SEM photograph of the electrode in Fabrication Example 1.

Fabrication Example 2

Electrodeposition Method

NiO/Carbon Fiber

Here, an $Ni(NO_3)_2$ solution (0.3 mol/liter) was used for an electrodeposition bath; a carbon fiber (having a diameter of 6 μm) was used for an electrode acting as a working electrode; and a platinum foil was used for its counter electrode. Electrodeposition was performed under the condition of a constant current density of 50 mA/cm$^2$ for 30 minutes. Thereafter, the electrode was washed with water and then dried under an air atmosphere at a temperature of 130° C. for 24 hours or longer. In this manner, the electrode of which the carbon fiber is coated with NiO was obtained. It should be noted that only being coated with NiO does not allow the electrode to function as a positive electrode.

Fabrication Example 3

Electrodeposition Method $Mn_3O_4$+NiO/Carbon Fiber

In order to perform coating with $Mn_3O_4$ and NiO in an electrodeposition method, a mixture of $Mn(NO_3)_2$ solution (0.3 mol/liter) and $Ni(NO_3)_2$ solution (0.03 mol/liter) was used for an electrodeposition bath; a carbon fiber (having a diameter of 6 μm) was used for an electrode acting as a working electrode, and a platinum foil was used for its counter electrode. Electrodeposition was performed with a constant current density of 50 mA/cm$^2$ for 30 minutes. Thereafter, the electrode was washed with water and then dried under an air atmosphere at a temperature of 130° C. for 24 hours or longer. In this manner, the electrode of which the carbon fiber is coated with $Mn_3O_4$ and NiO was obtained. It should be noted that only being coated with $Mn_3O_4$ and NiO does not allow the electrode to function as a positive electrode.

Fabrication Example 4

Electroplating Method

NiO/Carbon Fiber

Here, a nickel sulfate solution (0.3 mol/liter) was used for an electroplating bath; a carbon fiber (having a diameter of 6

μm) was used for an electrode acting as a working electrode; and a platinum foil was used for its counter electrode. Electroplating was performed under an electroplating condition of a constant current density of 50 mA/cm² for 30 minutes. Thereafter, the electrode was washed with water and oxidized under an oxygen atmosphere at a temperature of 650° C. for 24 hours or longer. In this manner, the electrode of which the carbon fiber is coated with NiO was obtained. It should be noted that only being coated with NiO does not allow the electrode to function as a positive electrode.

Fabrication Example 5

Electrodeposition Method $Mn_3O_4$+NiO/Al-Coated Carbon Fiber

First, 1-Ethyl-3-methylimidazolium chloride and aluminum chloride were mixed in a 1 to 2 molar ratio and thereby a room temperature molten salt was produced, which was used for an Al plating bath. A carbon fiber (having a diameter of 6 μm) was used for an electrode acting as a working electrode, and an aluminum foil was used for its counter electrode. The surface of the carbon fiber was coated with aluminum of approximately 0.1 μm. Plating was performed under the condition of a constant current density of 10 mA/cm² for 10 minutes.

Subsequently, a mixture of $Mn(NO_3)_2$ solution (0.3 mol/liter) and $Ni(NO_3)_2$ solution (0.03 mol/liter) was used for an electrodeposition bath; the Al-coated carbon fiber previously prepared was used for an electrode acting as a working electrode; and a platinum foil was used for its counter electrode. Electrodeposition was performed under the condition of a constant current density of 50 mA/cm² for 30 minutes. Thereafter, the electrode was washed with water and dried under an air atmosphere at a temperature of 100° C. for 24 hours or longer. In this manner, the electrode of which the Al-coated carbon fiber is coated with $Mn_3O_4$ and NiO was obtained. It should be noted that only being coated with $Mn_3O_4$ and NiO does not allow the electrode to function as a positive electrode.

Fabrication Example 6

Electrodeposition Method $Mn_3O_4$+$Al_2O_3$/Carbon Fiber

In order to perform coating with $Mn_3O_4$ and $Al_2O_3$ in an electrodeposition method, a mixture of $Mn(NO_3)_2$ solution (0.3 mol/liter) and $Al(NO_3)_3$ solution (0.03 mol/liter) was used for an electrodeposition bath; a carbon fiber (having a diameter of 6 μm) was used for an electrode acting as a working electrode; and a platinum foil was used for its counter electrode. Electrodeposition was performed with a constant current density of 50 mA/cm² for 10 minutes. Thereafter, the electrode was washed with water and dried under an air atmosphere at a temperature of 70° C. for 24 hours or longer. In this manner, the electrode of which the carbon fiber is coated with $Mn_3O_4$ and $Al_2O_3$ was obtained. It should be noted that only being coated with $Mn_3O_4$ and $Al_2O_3$ does not allow the electrode to function as a positive electrode.

Fabrication Example 7

Electrodeposition Method $Mn_3O_4$+$Al_2O_3$+KB/Carbon Fiber

In order to perform coating with $Mn_3O_4$ and $Al_2O_3$ in an electrodeposition method, a mixture of $Mn(NO_3)_2$ solution (0.3 mol/liter) and $Al(NO_3)_3$ solution (0.03 mol/liter), to which 1 wt % of KetjenBlack (KB) is added and 0.5 wt % of a Triton surfactant is added, was used for an electrodeposition bath; a carbon fiber (having a diameter of 6 μm) was used for an electrode acting as a working electrode; and a platinum foil was used for its counter electrode. Electrodeposition was performed with a constant current density of 50 mA/cm² for 10 minutes during which the electrodeposition bath was stirred by a stirrer. Thereafter, the electrode was washed with water, and dried under an air atmosphere at a temperature of 70° C. for 24 hours or longer. In this manner, the electrode of which the carbon fiber is coated with $Mn_3O_4$ and $Al_2O_3$ and onto which KB is co-deposited was obtained. It should be noted that only being coated with $Mn_3O_4$ and $Al_2O_3$ does not allow the electrode to function as a positive electrode.

Reference Fabrication Example 8

Electrodeposition Method $Mn_3O_4$/Al Foil (Plate-Shaped Current Collector)

Here, an $Mn(NO_3)_2$ solution (0.3 mol/liter) was used for an electrodeposition bath; an Al foil (having a thickness of 20 μm) that is a plate-shaped current collector was used for an electrode acting as a working electrode; and a platinum foil was used for its counter electrode. Electrodeposition was performed under the condition of a constant current density of 50 mA/cm² for 10 minutes. Thereafter, the electrode was washed with water and dried under an air atmosphere at 100° C. for 24 hours or longer. In this manner, the electrode of which the Al foil is coated with $Mn_3O_4$ was obtained. It should be noted that only being coated with $Mn_3O_4$ does not allow the electrode to function as a positive electrode.

Example 1

Hydrothermal Synthesis Method $LiMnO_2$+$Mn(OH)_2$/Carbon Fiber

The electrode obtained in Fabrication Example 1 was immersed in a lithium hydroxide solution, to which 0.5 oxidation equivalent of oxygen gas was added (8 mg/liter) per equivalent of $Mn_3O_4$ previously formed on the carbon fiber current collector in Fabrication Example 1. Then, hydrothermal synthesis was performed under the condition of 110° C. for 20 hours. Thereafter, the electrode was washed with water and dried under a reduced pressure at 100° C. for 24 hours or longer. In this manner, a fiber positive electrode of Example 1 was obtained.

Example 2

Hydrothermal Synthesis Method

LiMnO$_2$/Carbon Fiber

The electrode obtained in Fabrication Example 1 was immersed in a lithium hydroxide solution, to which one oxidation equivalent of sodium hypochlorite was added (the concentration of sodium hypochlorite: 0.01 mol/liter) per equivalent of Mn$_3$O$_4$ previously formed on the carbon fiber current collector in Fabrication Example 1. Then, hydrothermal synthesis was performed under the condition of 130° C. for 20 hours. Thereafter, the electrode was washed with water and dried under a reduced pressure at 110° C. for 24 hours or longer. In this manner, a fiber positive electrode of Example 2 was obtained.

Example 3

Hydrothermal Synthesis Method

LiMn$_2$O$_4$/Carbon Fiber

In each of Examples 3-1 to 3-5 shown below, a fiber positive electrode of which a carbon fiber current collector is coated with LiMn$_2$O$_4$ was obtained with a varied oxidation equivalent.

Example 3-1

1.5 Oxidation Equivalents

The electrode obtained in Fabrication Example 1 was immersed in a lithium hydroxide solution, to which 1.5 oxidation equivalents of sodium hypochlorite were added (the concentration of sodium hypochlorite: 0.02 mol/liter) per equivalent of Mn$_3$O$_4$ previously formed on the carbon fiber current collector in Fabrication Example 1. Then, hydrothermal synthesis was performed under the condition of 110° C. for 20 hours. Thereafter, the electrode was washed with water and dried under a reduced pressure at 110° C. for 24 hours or longer. In this manner, a fiber positive electrode of Example 3-1 was obtained.

Example 3-2

Two Oxidation Equivalents

The electrode obtained in Fabrication Example 1 was immersed in a lithium hydroxide solution, to which two oxidation equivalents of sodium hypochlorite were added (the concentration of sodium hypochlorite: 0.04 mol/liter) per equivalent of Mn$_3$O$_4$ previously formed on the carbon fiber current collector in Fabrication Example 1. Then, hydrothermal synthesis was performed under the condition of 110° C. for 20 hours. Thereafter, the electrode was washed with water and dried under a reduced pressure at 110° C. for 24 hours or longer. In this manner, a fiber positive electrode of Example 3-2 was obtained.

Example 3-3

2.5 Oxidation Equivalents

The electrode obtained in Fabrication Example 1 was immersed in a lithium hydroxide solution, to which 2.5 oxidation equivalents of sodium hypochlorite were added (the concentration of sodium hypochlorite: 0.06 mol/liter) per equivalent of Mn$_3$O$_4$ previously formed on the carbon fiber current collector in Fabrication Example 1. Then, hydrothermal synthesis was performed under the condition of 110° C. for 20 hours. Thereafter, the electrode was washed with water and dried under a reduced pressure at 110° C. for 24 hours or longer. In this manner, a fiber positive electrode of Example 3-3 was obtained.

Example 3-4

Three Oxidation Equivalents

The electrode obtained in Fabrication Example 1 was immersed in a lithium hydroxide solution, to which three oxidation equivalents of sodium hypochlorite were added (the concentration of sodium hypochlorite: 0.08 mol/liter) per equivalent of Mn$_3$O$_4$ previously formed on the carbon fiber current collector in Fabrication Example 1. Then, hydrothermal synthesis was performed under the condition of 110° C. for 20 hours. Thereafter, the electrode was washed with water and dried under a reduced pressure at 110° C. for 24 hours or longer. In this manner, a fiber positive electrode of Example 3-4 was obtained.

Example 3-5

3.5 Oxidation Equivalents

The electrode obtained in Fabrication Example 1 was immersed in a lithium hydroxide solution, to which 3.5 oxidation equivalents of sodium hypochlorite were added (the concentration of sodium hypochlorite: 0.1 mol/liter) per equivalent of Mn$_3$O$_4$ previously formed on the carbon fiber current collector in Fabrication Example 1. Then, hydrothermal synthesis was performed under the condition of 125° C. for 20 hours. Thereafter, the electrode was washed with water and dried under a reduced pressure at 110° C. for 24 hours or longer. In this manner, a fiber positive electrode of Example 3-5 was obtained.

Example 4

Hydrothermal Synthesis Method

LiNiO$_2$+Ni(OH)$_2$/Carbon Fiber

The electrode obtained in Fabrication Example 2 was immersed in a lithium hydroxide solution, to which one oxidation equivalent of hydrogen peroxide solution was added (the concentration of hydrogen peroxide: 0.005 mol/liter) per equivalent of NiO previously formed on the carbon fiber current collector in Fabrication Example 2. Then, hydrothermal synthesis was performed under the condition of 120° C. for 20 hours. Thereafter, the electrode was washed with water and dried under a reduced pressure at 100° C. for 24 hours or longer. In this manner, a fiber positive electrode of Example 4 was obtained.

Example 5

Hydrothermal Synthesis Method

LiNiO$_2$/Carbon Fiber

The electrode obtained in Fabrication Example 2 was immersed in a lithium hydroxide solution, to which two oxidation equivalents of sodium hypochlorite were added (the concentration of sodium hypochlorite: 0.04 mol/liter) per equivalent of NiO previously formed on the carbon fiber current collector in Fabrication Example 2. Then, hydrothermal synthesis was performed under the condition of 120° C. for 20 hours. Thereafter, the electrode was washed with water and dried under a reduced pressure at 100° C. for 24 hours or longer. In this manner, a fiber positive electrode of Example 5 was obtained.

Example 6

Hydrothermal Synthesis Method $LiMn_{1.9}Ni_{0.1}O_4$/Carbon Fiber

The electrode obtained in Fabrication Example 3 was immersed in a lithium hydroxide solution, to which 1.5 oxidation equivalents of sodium hypochlorite were added (the concentration of sodium hypochlorite: 0.02 mol/liter) per equivalent of combined $Mn_3O_4$ and NiO previously formed on the carbon fiber current collector in Fabrication Example 3. Then, hydrothermal synthesis was performed under the condition of 120° C. for 20 hours. Thereafter, the electrode was washed with water and dried under a reduced pressure at 110° C. for 24 hours or longer. In this manner, a fiber positive electrode of Example 6 was obtained.

Example 7

Hydrothermal Synthesis Method $LiNiO_2+Ni(OH)_2$/Carbon Fiber

The electrode obtained in Fabrication Example 4 was immersed in a lithium hydroxide solution, to which one oxidation equivalent of sodium hypochlorite was added (the concentration of sodium hypochlorite: 0.01 mol/liter) per equivalent of NiO previously formed on the carbon fiber current collector in Fabrication Example 4. Then, hydrothermal synthesis was performed under the condition of 120° C. for 20 hours. Thereafter, the electrode was washed with water and dried under a reduced pressure at 100° C. for 24 hours or longer. In this manner, a fiber positive electrode of Example 7 was obtained.

Example 8

Hydrothermal Synthesis Method $LiMn_{1.9}Ni_{0.1}O_4$/Al-Coated Carbon Fiber

The electrode obtained in Fabrication Example 5 was immersed in a lithium hydroxide solution, to which 1.5 oxidation equivalents of sodium hypochlorite were added (0.02 mol/liter) per equivalent of combined $Mn_3O_4$ and NiO previously formed on the Al-coated carbon fiber current collector in Fabrication Example 5. Then, hydrothermal synthesis was performed under the condition of 130° C. for 20 hours. Thereafter, the electrode was washed with water and dried under a reduced pressure at 110° C. for 24 hours or longer. In this manner, a fiber positive electrode of Example 8 was obtained.

Example 9

Hydrothermal Synthesis Method $LiMn_{1.9}Al_{0.1}O_4$/Carbon Fiber

The electrode obtained in Fabrication Example 6 was immersed in a lithium hydroxide solution, to which 1.5 oxidation equivalents of sodium hypochlorite were added (0.02 mol/liter) per equivalent of combined $Mn_3O_4$ and $Al_2O_3$ previously formed on the carbon fiber current collector in Fabrication Example 6. Then, hydrothermal synthesis was performed under the condition of 130° C. for 20 hours. Thereafter, the electrode was washed with water and dried under a reduced pressure at 110° C. for 24 hours or longer. In this manner, a fiber positive electrode of Example 9 was obtained.

Example 10

Hydrothermal Synthesis Method $LiMn_{1.9}Al_{0.1}O_4$+KB/Carbon Fiber

The electrode obtained in Fabrication Example 7 was immersed in a lithium hydroxide solution, to which 1.5 oxidation equivalents of sodium hypochlorite were added (0.02 mol/liter) per equivalent of combined $Mn_3O_4$ and $Al_2O_3$ previously formed on the carbon fiber current collector in Fabrication Example 7. Then, hydrothermal synthesis was performed under the condition of 130° C. for 20 hours. Thereafter, the electrode was washed with water and dried under a reduced pressure at 110° C. for 24 hours or longer. In this manner, a fiber positive electrode of Example 10 was obtained.

Example 11

Solvothermal Method $LiMnO_2$/Carbon Fiber

The electrode obtained in Fabrication Example 1, the carbon fiber current collector of which is coated with $Mn_3O_4$, was buried in a powder mixture of choline chloride, urea, and lithium hydroxide under an air atmosphere, and subjected to solvothermal treatment under the condition of 150° C. for 20 hours. Thereafter, the electrode was washed with water and dried under a reduced pressure at 100° C. for 24 hours or longer. In this manner, a fiber positive electrode of Example 11 was obtained.

Comparative Example 1

Hydrothermal Synthesis Method $LiMnO_2$/Al Foil

The electrode obtained in Reference Fabrication Example 8 was immersed in a lithium hydroxide solution, to which one oxidation equivalent of sodium hypochlorite was added (the concentration of sodium hypochlorite: 0.01 mol/liter) per equivalent of $Mn_3O_4$ previously formed on the Al foil current collector in Reference Fabrication Example 8. Then, hydrothermal synthesis was performed under the condition of 130° C. for 20 hours. Thereafter, the electrode was washed with water and dried under a reduced pressure at 110° C. for 24 hours or longer. In this manner, a plate-shaped positive electrode of Comparative Example 1 was obtained.

It should be noted that each lithium source in Examples 1 to 11 and Comparative Example 1 is adjusted such that the elemental molar ratio of lithium to the number of moles of a transition metal is 2.5 or higher (2 mol/liter or higher).

The carbon fiber used in the above Examples is a commercially available carbon fiber (available from TOHO TENAX Co., Ltd.), which is obtained by carbonizing a polyacrylonitrile fiber at 1200° C. The average diameter of fibers forming the carbon fiber current collector is approximately 6 µm. The fibers are each cut into 5 cm, and three thousand of them are bundled together to form the current collector.

Test Example 1

Observation of Fiber Positive Electrode

[X-Ray Diffraction]

Figure 3:
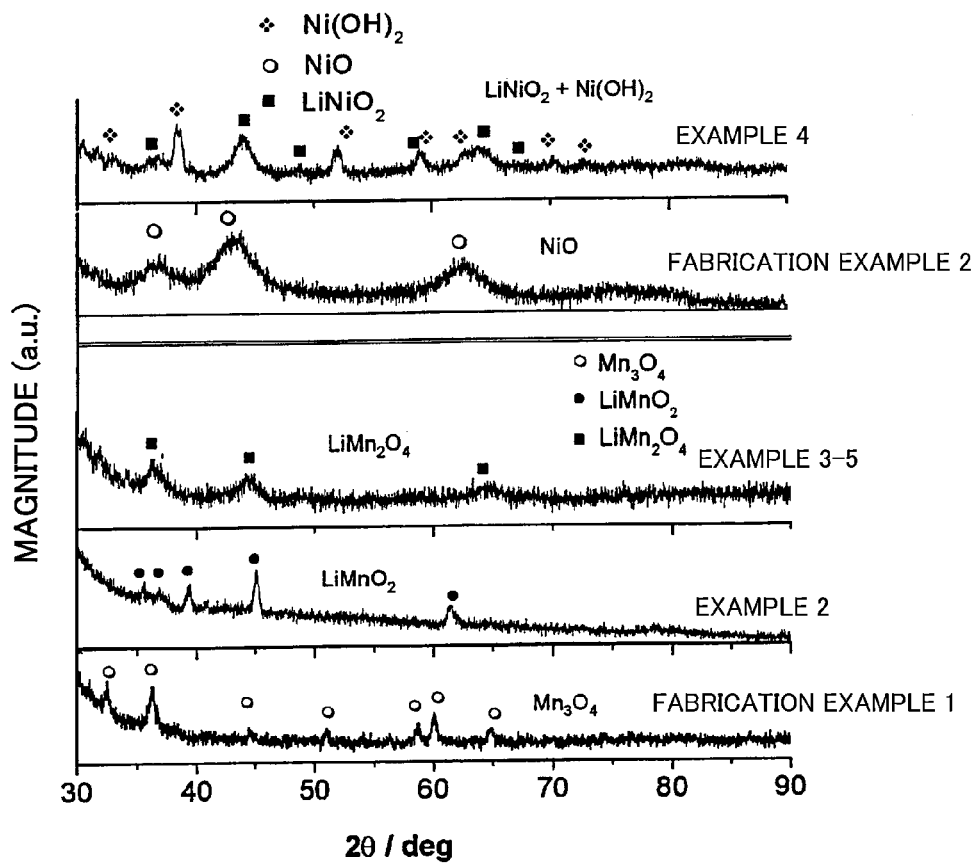
FIG. 3 shows X-ray diffraction patterns in Examples 2, 3-5, 4, and Fabrication Examples 1 and 2.

FIG. 3 shows X-ray diffraction patterns in Examples 2, 3-5, and 4. For reference, FIG. 3 also shows X-ray diffraction patterns in Fabrication Examples 1 and 2 in which heat treatment was not performed.

Fabrication Example 1 in which heat treatment was not performed showed diffraction peaks of $Mn_3O_4$. In contrast, Example 2, in which hydrothermal synthesis was performed in the lithium ion solution to which one oxidation equivalent of sodium hypochlorite was added per equivalent of $Mn_3O_4$, showed diffraction peaks clearly different from the diffraction peaks in Fabrication Example 1. It was determined by searching the JCPDS database that the diffraction peaks shown in Example 2 were diffraction peaks of $LiMnO_2$.

Example 3-5, in which hydrothermal synthesis was performed in the lithium ion solution to which 3.5 oxidation equivalents of sodium hypochlorite were added per equivalent of $Mn_3O_4$, showed diffraction peaks different from the diffraction peaks in Fabrication Example 1 and Example 2. It was determined by searching the JCPDS database that the diffraction peaks shown in Example 3-5 were diffraction peaks of $LiMn_2O_4$. It was found from the above facts that either $LiMnO_2$ or $LiMn_2O_4$ can be selectively obtained as an active material by adjusting the oxidation equivalents of an oxidant to be added.

Fabrication Example 2 in which heat treatment was not performed showed diffraction peaks of NiO. Example 4, in which hydrothermal synthesis was performed in the lithium ion solution to which one oxidation equivalent of hydrogen peroxide solution was added per equivalent of NiO, showed diffraction peaks different from the diffraction peaks in Fabrication Example 2. The diffraction peaks shown in Example 4 were determined to be diffraction peaks of $LiNiO_2$ and $Ni(OH)_2$. Example 5, in which hydrothermal synthesis was performed in the lithium ion solution to which two oxidation equivalents of sodium hypochlorite were added per equivalent of NiO, did not show diffraction peaks of $Ni(OH)_2$. It was confirmed that the diffraction peaks shown in Example 5 were only diffraction peaks of $LiNiO_2$.

Figure 4:
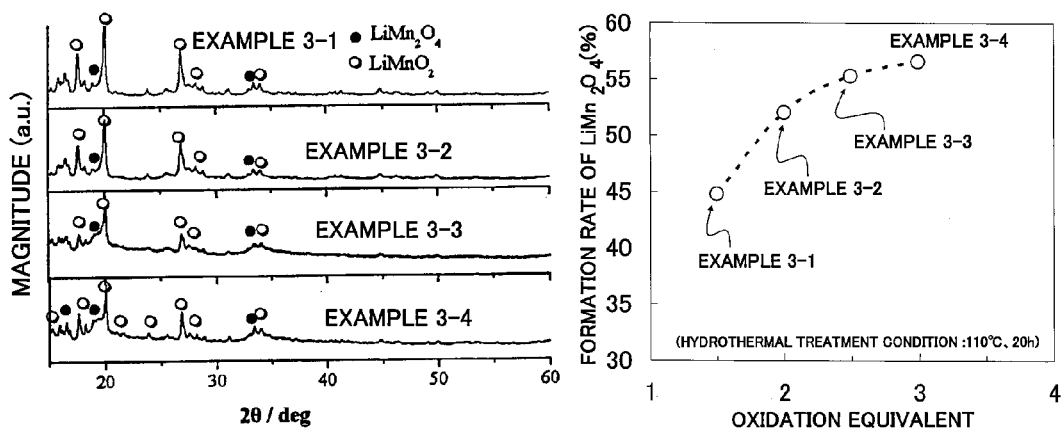
FIG. 4 shows, on the left, synchrotron X-ray diffraction patterns in Examples 3-1 to 3-4, and shows, on the right, a formation rate of $LiMn_2O_4$ in Examples 3-1 to 3-4.

Next, FIG. 4 shows synchrotron X-ray diffraction patterns in Examples 3-1 to 3-4 (SPring-8, beamline: BL19B2, $\lambda=0.7$ A). It was determined for each of Examples 3-1 to 3-4 that $LiMnO_2$ was contained. The more the amount of the added oxidant, the greater the amount of contained $LiMn_2O_4$.

Figure 5:
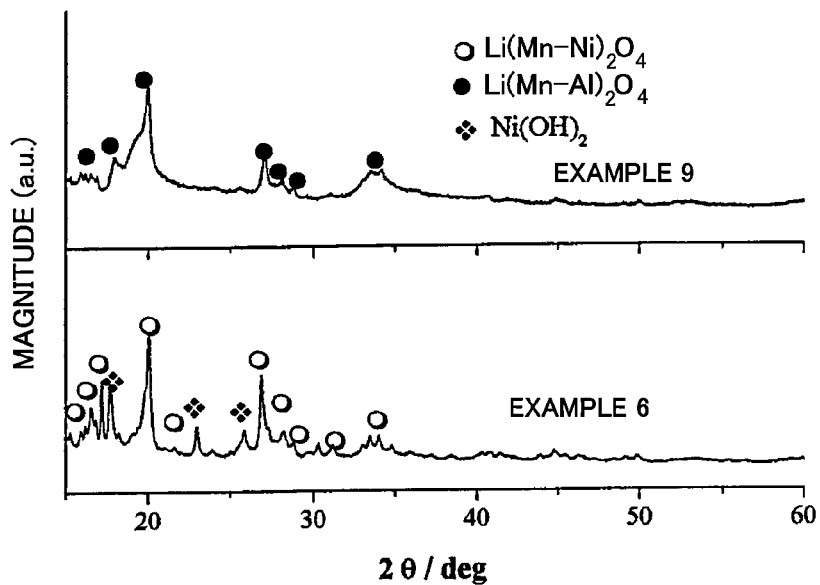
FIG. 5 shows synchrotron X-ray diffraction patterns in Examples 6 and 9.

FIG. 5 shows synchrotron X-ray diffraction patterns in Examples 6 and 9 (SPring-8, beamline: BL19B2, $\lambda=0.7$ A). Diffraction peaks of $Li(Mn-Ni)_2O_4$ were observed in Example 6, and diffraction peaks of $Li(Mn-Al)_2O_4$ were observed in Example 9.

Figure 6:
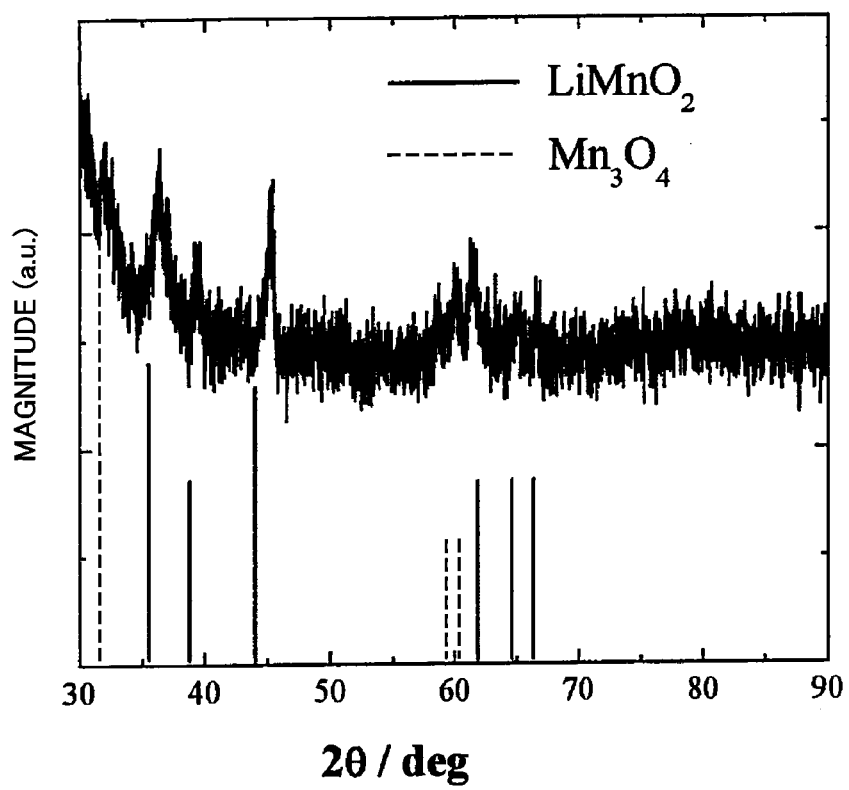
FIG. 6 shows an X-ray diffraction pattern in Example 11.

FIG. 6 shows an X-ray diffraction pattern in Example 11 where a fiber positive electrode was fabricated in a solvothermal method. Example 11 showed diffraction peaks of $LiMnO_2$. Accordingly, it was found that the synthesis was possible even in a reaction field different from water, and that lithium doping was performable without addition of any oxidants if performed in the air. It can be considered that oxygen in the air acted as an oxidant. However, unreacted $Mn_3O_4$ remained since the amount of oxidation with the air was insufficient.

[Scanning Electron Microscope]

Figure 7:
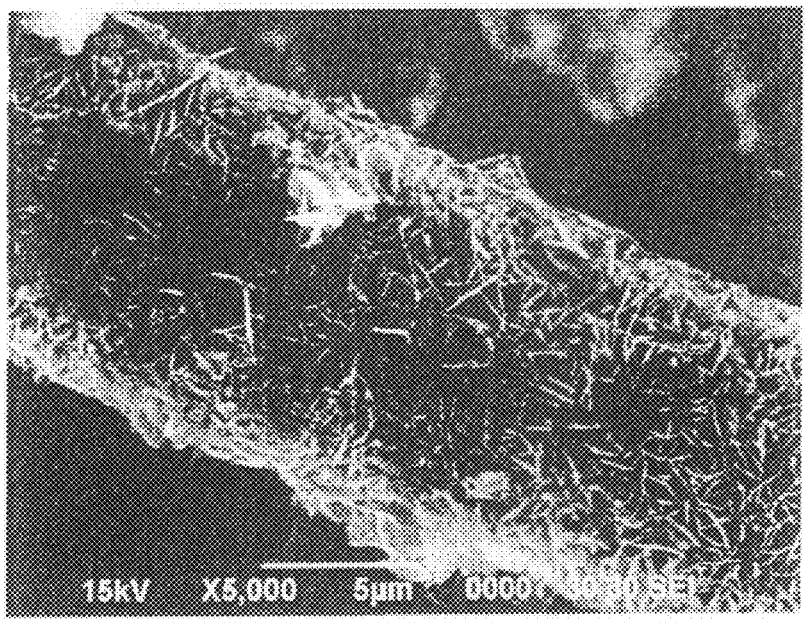
FIG. 7 is an SEM photograph (5000 magnifications) of the surface of a fiber positive electrode in Example 2.

FIG. 7 shows an SEM (scanning electron microscope) photograph of the fiber positive electrode in Example 2. It is clear from FIG. 7 that a porous material adhered to the carbon fiber current collector forms a layer. The layer is a result of flake-shaped active material particles being formed perpendicularly to the current collector. These flaky particles are piled upon one another, and over that piles, flaky particles are further formed. Accordingly, it appears that the porous active material layer is formed as a result of the flaky particles agglomerating into a mass. The flaky particles were magnified and examined. From the examination, it was found that the agglomerate of the flaky particles, having a thickness of approximately 100 nm, a width of approximately 1.5 µm, and a length of approximately 2 µm, covered the electrode. As is clear from the foregoing measurement results of the X-ray diffraction patterns, the active material layer in Example 2 contains a lithium manganese oxide as a main component. That is, the porous layer shown in FIG. 7 is $LiMnO_2$.

Figure 8:
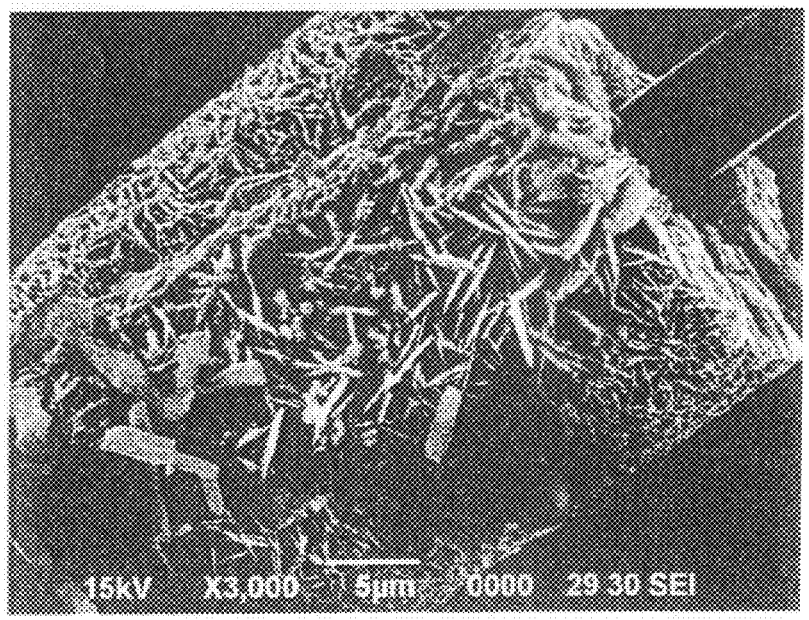
FIG. 8 is an SEM photograph (3000 magnifications) of the surface of a fiber positive electrode in Example 3-5.

FIG. 8 shows an SEM photograph of the fiber positive electrode in Example 3-5. It is clear from FIG. 8 that a porous material adhered to the carbon fiber current collector forms a layer. As is clear from the foregoing measurement results of the X-ray diffraction patterns, an active material layer in Example 3-5 is formed of spinel-type lithium manganese oxide. Accordingly, the porous layer shown in FIG. 8 can be considered to be $LiMn_2O_4$. Similar to Example 2, it can be observed that the particles of the porous material are formed perpendicularly to the surface of the current collector, and are flake-shaped. These flaky particles are piled upon one another, and over that piles, flaky particles are further formed. Accordingly, the porous active material layer is formed as a result of the flaky particles agglomerating into a mass. The flaky particles were magnified and examined. From the examination, it was found that the agglomerate of the flaky particles, having a thickness of approximately 100 nm, a width of approximately 2 µm, and a length of approximately 2 µm, covered the entire electrode.

Figure 9:
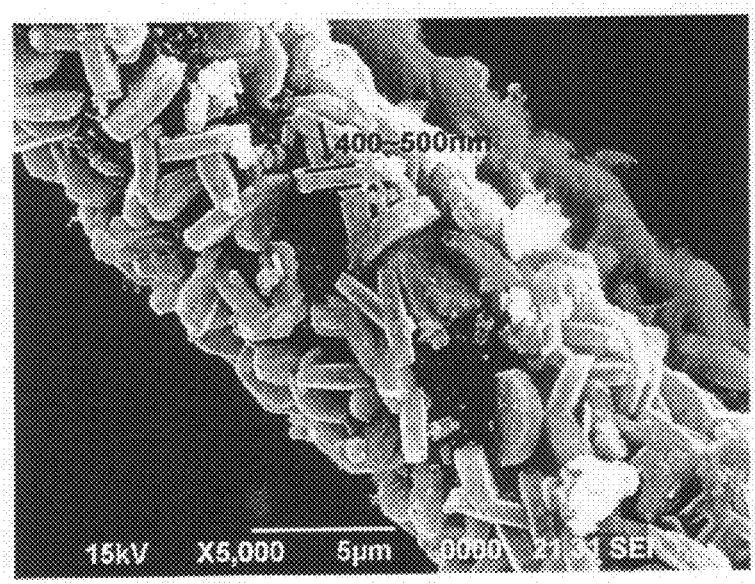
FIG. 9 is an SEM photograph (5000 magnifications) of the surface of a fiber positive electrode in Example 6.

FIG. 9 shows an SEM photograph of the fiber positive electrode in Example 6. It is clear from FIG. 9 that a porous material adhered to the current collector forms a layer. As is clear from the foregoing measurement results of the X-ray diffraction patterns, an active material layer in Example 6 is formed of $LiMn_{1.9}Ni_{0.1}O_4$. Accordingly, the porous layer shown in FIG. 9 can be considered to be $LiMn_{1.9}Ni_{0.1}O_4$. Similar to Example 2, it can be observed that the particles of the porous material are formed perpendicularly to the surface of the current collector, and are flake-shaped. These flaky particles, which are piled upon one another, agglomerate into a mass to form the porous active material layer. The flaky particles were magnified and examined. From the examination, it was found that the agglomerate of the flaky particles, having a thickness of approximately 400 to 500 nm, a width of approximately 1 µm, and a length of approximately 1 µm, covered the entire electrode.

Test Example 2

Battery Test

The respective samples in Examples 1 to 11 were used as test electrodes. A metallic lithium foil was used for their counter electrodes. A solution that is obtained by dissolving $LiPF_6$ at a concentration of 1 mol/liter into a solvent in which ethylene carbonate (EC) and dimethyl carbonate (DMC) are mixed in a volume ratio of 1:1, was used as an electrolyte solution. A two-electrode evaluation cell was prepared, and a charge/discharge test was conducted. During the test, a cutoff voltage was used to perform control, and a charge/discharge current corresponding to 0.2 C was used.

Table 1 below shows battery test results regarding Examples 1 to 11 and Comparative Example 1.

TABLE 1

|  | At 1st Cycle | At 300th Cycle | Intermediate Discharge Voltage |
|---|---|---|---|
| Example 1 | 181 mAh/g | 153 mAh/g | Approx. 3 V |
| Example 2 | 209 mAh/g | 180 mAh/g | Approx. 3 V |
| Example 3-1 | 180 mAh/g | 157 mAh/g | Approx. 4 V |
| Example 3-2 | 180 mAh/g | 155 mAh/g | Approx. 4 V |
| Example 3-3 | 179 mAh/g | 154 mAh/g | Approx. 4 V |
| Example 3-4 | 178 mAh/g | 154 mAh/g | Approx. 4 V |
| Example 3-5 | 179 mAh/g | 157 mAh/g | Approx. 4 V |
| Example 4 | 225 mAh/g | 203 mAh/g | Approx. 3.5 V |
| Example 5 | 239 mAh/g | 220 mAh/g | Approx. 3.5 V |
| Example 6 | 133 mAh/g | 121 mAh/g | Approx. 4 V |
| Example 7 | 158 mAh/g | 135 mAh/g | Approx. 3 V |
| Example 8 | 135 mAh/g | 133 mAh/g | Approx. 4 V |
| Example 9 | 145 mAh/g | 138 mAh/g | Approx. 4 V |
| Example 10 | 149 mAh/g | 145 mAh/g | Approx. 3 V |
| Example 11 | 162 mAh/g | 148 mAh/g | Approx. 3 V |
| Comparative Example 1 | 188 mAh/g | 75 mAh/g | Approx. 3 V |

As is clear from the above Table 1, battery performances in Examples 1 to 11, in each of which a carbon fiber current collector was used, were excellent particularly at the 300th cycle in comparison with Comparative Example 1 in which an Al foil current collector was used. It should be noted that Comparative Example 1 is the same as Example 2 except that the carbon fiber current collector is replaced with the Al foil current collector.

It was found that Example 8 where an Al-coated carbon fiber current collector was used showed favorable charge/discharge cycle life characteristics even in comparison with Example 6 where a carbon fiber not coated with Al was used. It was also found that Example 10 where a carbon was co-deposited showed favorable charge/discharge cycle life characteristics even in comparison with Example 9 where a carbon was not co-deposited.

Figure 10:
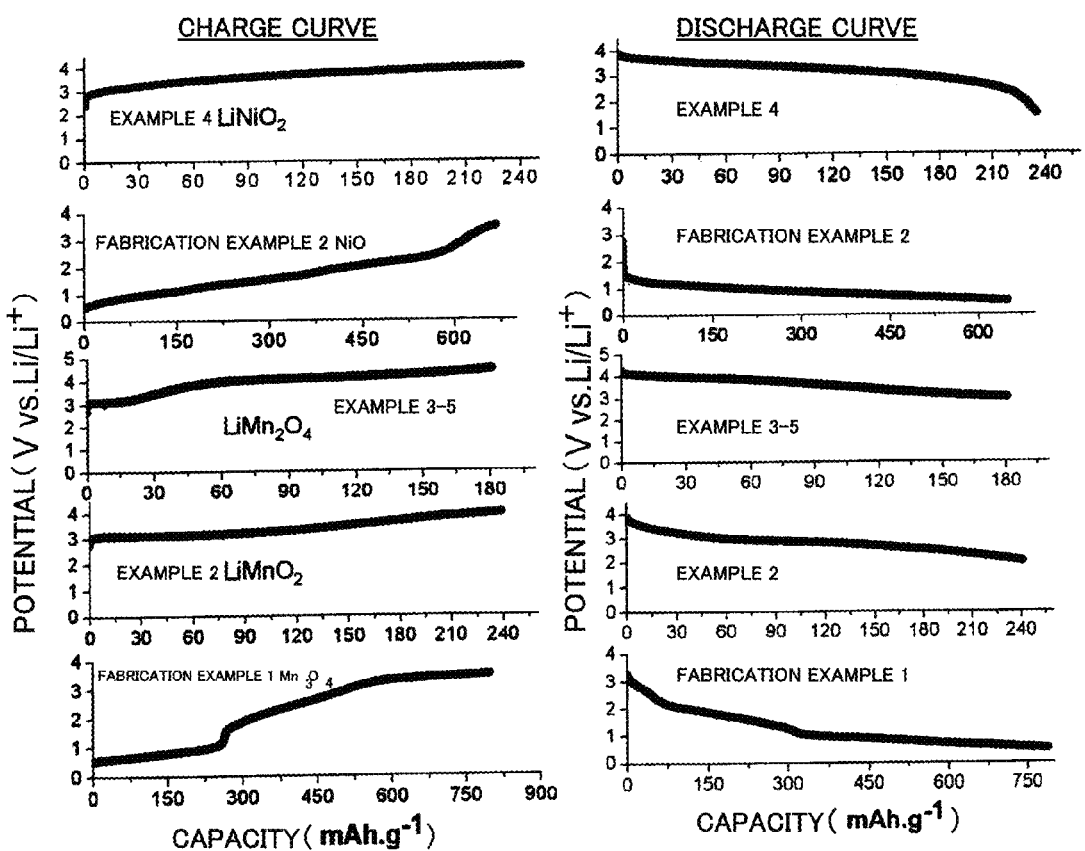
FIG. 10 shows initial charge/discharge curves in Examples 2, 3-5, 4, and Fabrication Examples 1 and 2.

In relation to the samples of which the positive-electrode active materials are Li-M-O materials, FIG. 10 shows initial charge/discharge curves of Examples 2, 3-5, and 4, which showed favorable positive electrode characteristics (charge/discharge cycle life characteristics). For reference, FIG. 10 also shows initial charge/discharge curves of Fabrication Example 1 and Fabrication Example 2.

Figure 11:
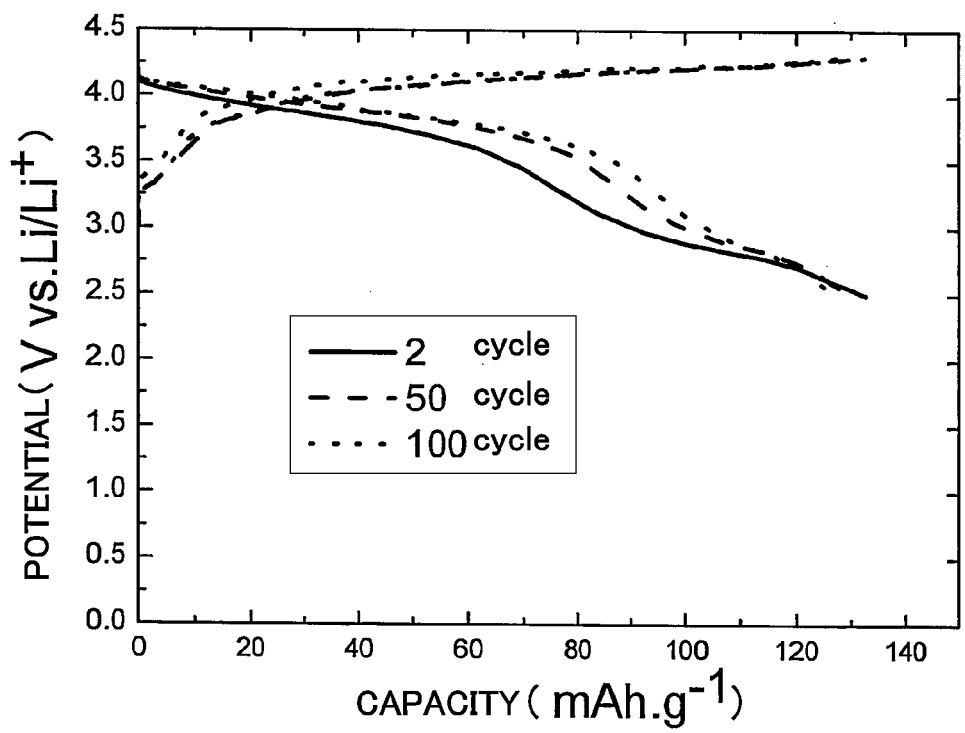
FIG. 11 shows initial charge/discharge curves for respective cycles in Example 6, in which upward-sloping curves are charge curves and downward-sloping curves are discharge curves.
Figure 12:
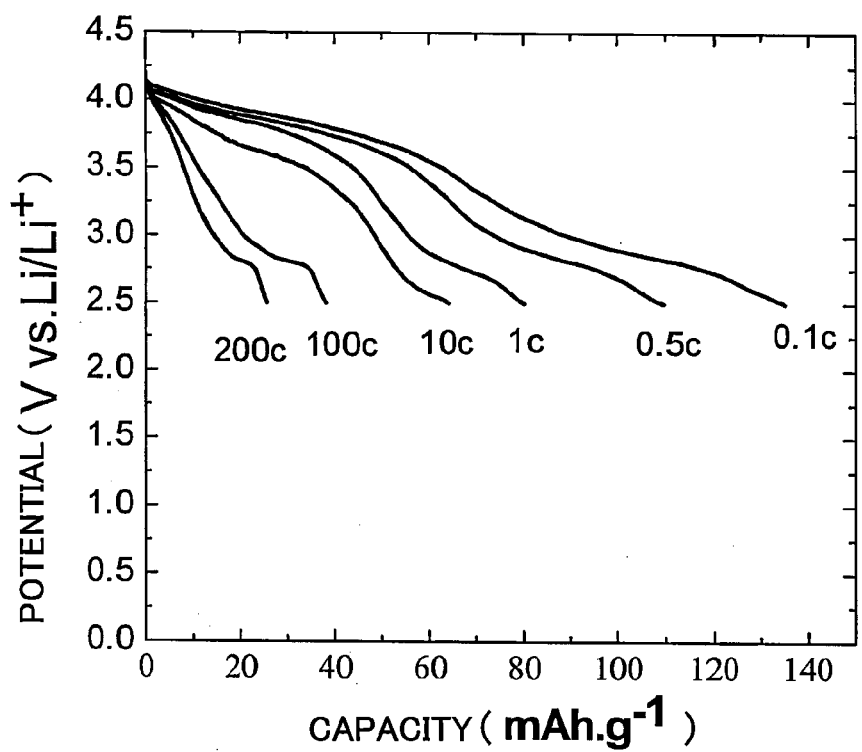
FIG. 12 shows discharge curves for respective discharge rates in Example 6
Figure 13:
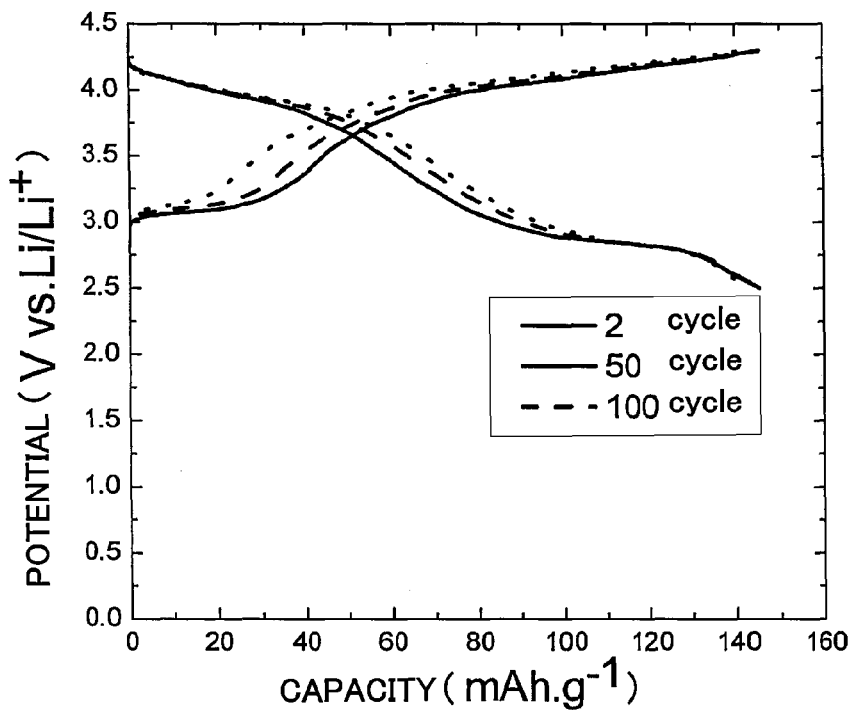
FIG. 13 shows initial charge/discharge curves for respective cycles in Example 9, in which upward-sloping curves are charge curves and downward-sloping curves are discharge curves.
Figure 14:
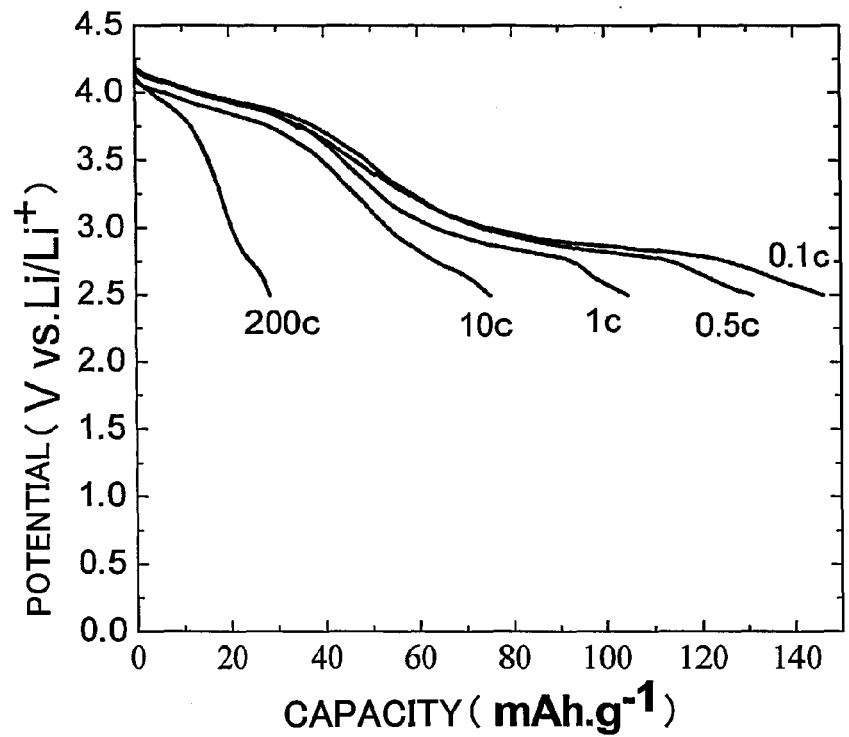
FIG. 14 shows discharge curves for respective discharge rates in Example 9.

FIG. 11 shows initial charge/discharge curves of Example 6 of which the positive-electrode active material is the $Li(Mn-Ni)_2O_4$ material, and FIG. 12 shows high-rate discharge curves of Example 6. FIG. 13 shows initial charge/discharge curves of Example 9 of which the positive-electrode active material is the $Li(Mn-Al)_2O_4$ material, and FIG. 14 shows high-rate discharge curves of Example 9.

2. Examples in Relation to Fiber Negative Electrode

Examples 12, 13, and Comparative Examples 2 to 7

Sn Plating After Cu Plating

A copper plated coating having a thickness of approximately 1 μm was formed by an electroplating method onto a carbon fiber of which the single fiber diameter is 8 μm, and then a Sn plated coating having a thickness of approximately 2 μm was further formed thereon.

Carbon fibers on each of which Cu and Sn plated coatings were formed in the above manner were subjected to heat treatment for two hours under respective sets of conditions as shown in Table 2 below. Accordingly, samples were obtained for the respective sets of conditions.

TABLE 2

|  | Treatment Temperature | Gas Concentration in Ar Atmosphere (vol %) |
|---|---|---|
| Example 12 | 400° C. | Oxygen 1% |
| Example 13 | 400° C. | Oxygen 5% |
| Comparative Example 2 | 25° C. | Oxygen 21% |
| Comparative Example 3 | 200° C. | Oxygen 1% |
| Comparative Example 4 | 300° C. | Oxygen 1% |
| Comparative Example 5 | 700° C. | Oxygen 1% |
| Comparative Example 6 | 400° C. | Oxygen 10% |
| Comparative Example 7 | 400° C. | Hydrogen 1% |

Figure 15:
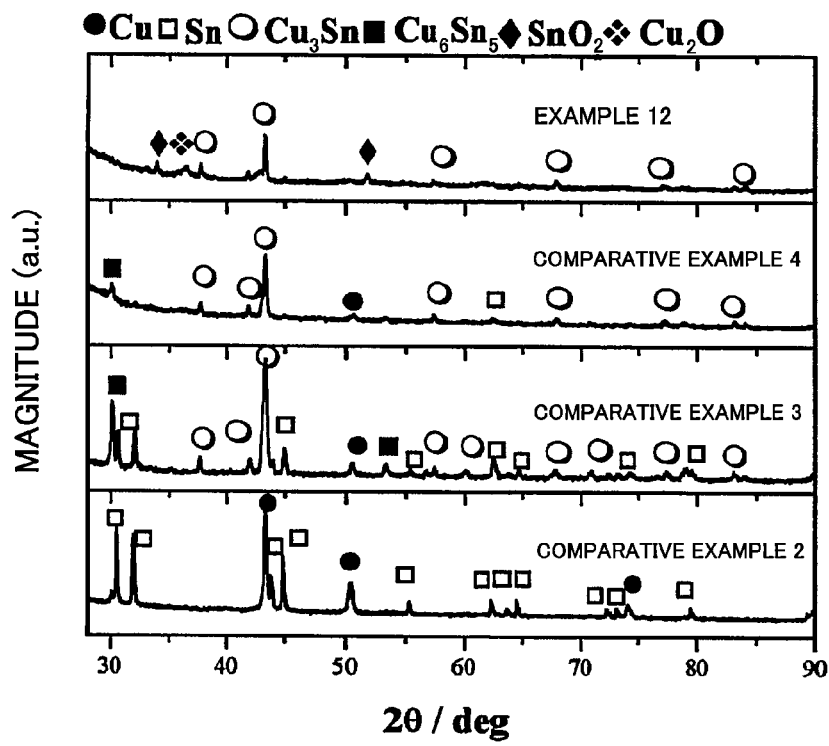
FIG. 15 shows X-ray diffraction patterns in Example 12 and Comparative Examples 2 to 4.
Figure 16:
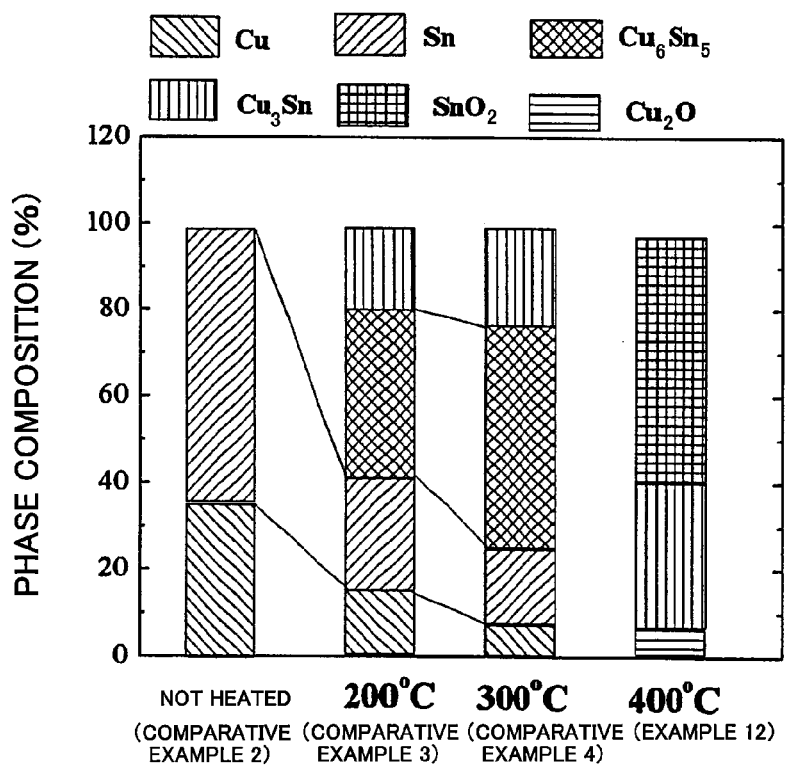
FIG. 16 shows the presence ratio of each phase in Example 12 and Comparative Examples 2 to 4.

Qualitative analysis was performed by the powder X-Ray Diffraction method (XRD) on samples obtained in the above manner (the samples in Example 12 and Comparative Examples 3 and 4) and on a sample not subjected to heat treatment (the sample in Comparative Example 2). FIG. 15 shows XRD measurement results. Rietveld analysis was conducted on the obtained XRD data and the presence ratio of each phase was obtained. FIG. 16 shows the presence ratio of each phase in Example 12 and Comparative Examples 2 to 4.

Figure 17:
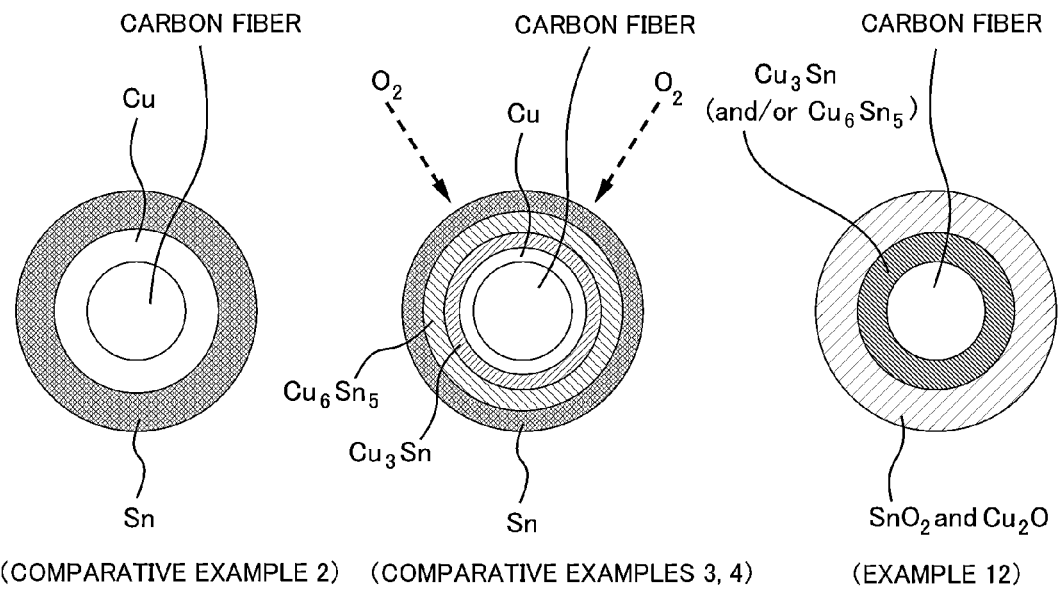
FIG. 17 schematically shows cross section structures in Example 12 and Comparative Examples 2 to 4.

Further, the energy dispersive X-ray analysis method (EDX) was used to perform coating cross-section structure analysis. FIG. 17 schematically shows EDX results. The sample in Comparative Example 2 where heat treatment was not performed had a structure in which a Sn coating was formed on a Cu coating. On the other hand, the sample in Comparative Example 3 where heat treatment was performed at 200° C. under a trace oxygen atmosphere had a structure in which layers including Cu, $Cu_3Sn$, $Cu_6Sn_5$, and Sn as main components, respectively, were sequentially laminated onto the carbon fiber. The results in Comparative Example 4 where heat treatment was performed at 300° C. were the same as the results in Comparative Example 3 except that the Cu layer and the Sn layer were reduced as compared to Comparative Example 3. The sample in Example 12, in which heat treatment was performed at 400° C. under an atmosphere where the oxygen concentration was 1 vol %, had a structure in which a $Cu_3Sn$ layer and a composite layer of $Cu_2O$ and $SnO_2$ were sequentially laminated onto the carbon fiber. In Comparative Example 5 where heat treatment was performed at 700° C., the carbon fiber current collector was lost upon oxidation. The results in Example 13, in which heat treatment was performed at 400° C. under an atmosphere where the oxygen concentration was 5 vol %, were no different than the results in Example 12 except that the $Cu_3Sn$ layer was reduced. However, in the sample in Comparative Example 6, which was subjected to the heat treatment under the oxygen concentration of 10 vol %, the $Cu_3Sn$ layer was lost and the sample was formed only of a composite of $Cu_2O$ and $SnO_2$.

The above samples were used as test electrodes. A metallic lithium foil was used for their counter electrodes. A solution that is obtained by dissolving $LiPF_6$ at a concentration of 1 mol/liter into a solvent in which ethylene carbonate (EC) and diethyl carbonate (DEC) are mixed in a volume ratio of 1:1, was used as an electrolyte solution. A two-electrode evaluation cell was prepared, and a charge/discharge test was conducted. During the test, a cutoff voltage was used to perform control, and a charge/discharge current corresponding to 0.2 C was used. It is assumed here that a reaction where Li is inserted into a Sn electrode is charging, and a reaction where Li is released from the Sn electrode is discharging. Table 3 below shows charge/discharge test results of Examples 12, 13 and Comparative Examples 2 to 7.

TABLE 3

| | After 10 Cycles | After 50 Cycles | After 100 Cycles |
|---|---|---|---|
| Example 12 | 410 mAh/g | 391 mAh/g | 390 mAh/g |
| Example 13 | 410 mAh/g | 390 mAh/g | 389 mAh/g |
| Comparative Example 2 | 302 mAh/g | 43 mAh/g | 28 mAh/g |
| Comparative Example 3 | 581 mAh/g | 382 mAh/g | 230 mAh/g |
| Comparative Example 4 | 574 mAh/g | 385 mAh/g | 242 mAh/g |
| Comparative Example 5 | — | — | — |
| Comparative Example 6 | 349 mAh/g | 327 mAh/g | 309 mAh/g |
| Comparative Example 7 | 563 mAh/g | 380 mAh/g | 220 mAh/g |

In a case where the sample in Comparative Example 2, in which heat treatment was not performed, was used as a test electrode, the charge/discharge capacity was 302 mAh/g after 10 cycles.

Figure 18:
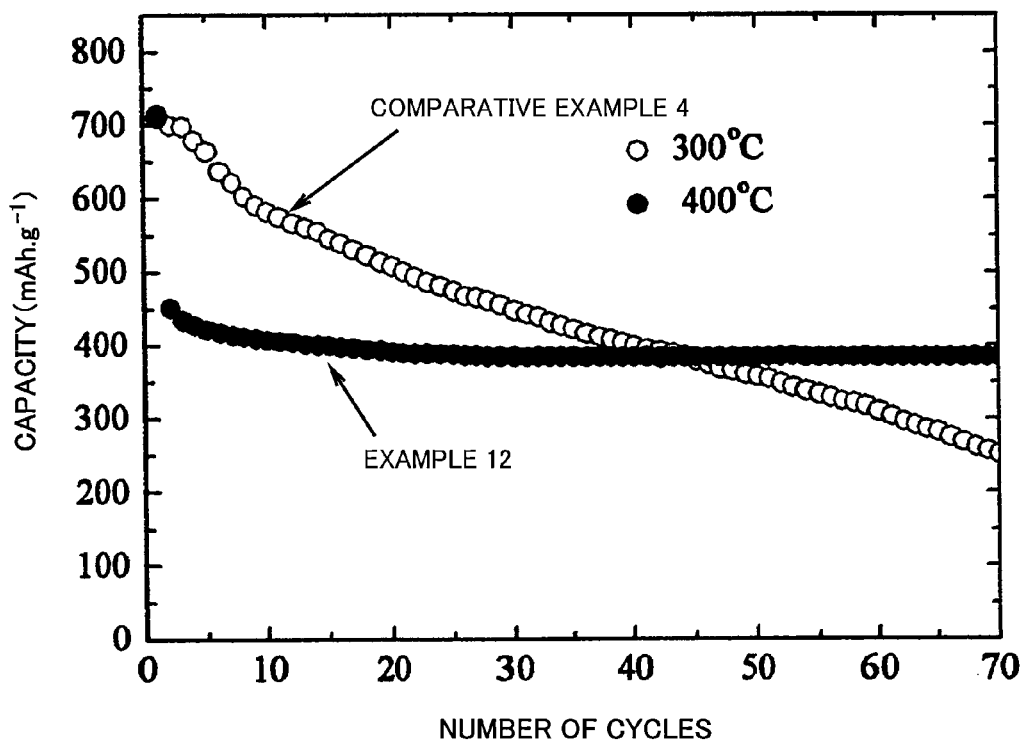
FIG. 18 shows charge/discharge cycle life test results in Example 12 and Comparative Example 4.
Figure 19:
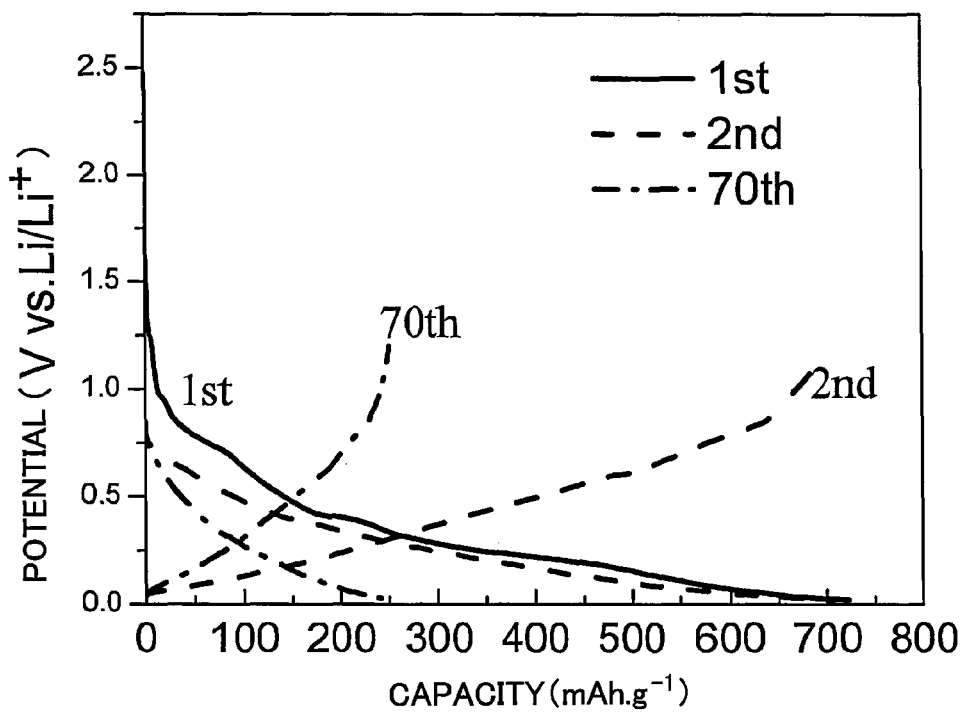
FIG. 19 shows charge/discharge curves in Comparative Example 4, in which upward-sloping curves are charge curves and downward-sloping curves are discharge curves.
Figure 20:
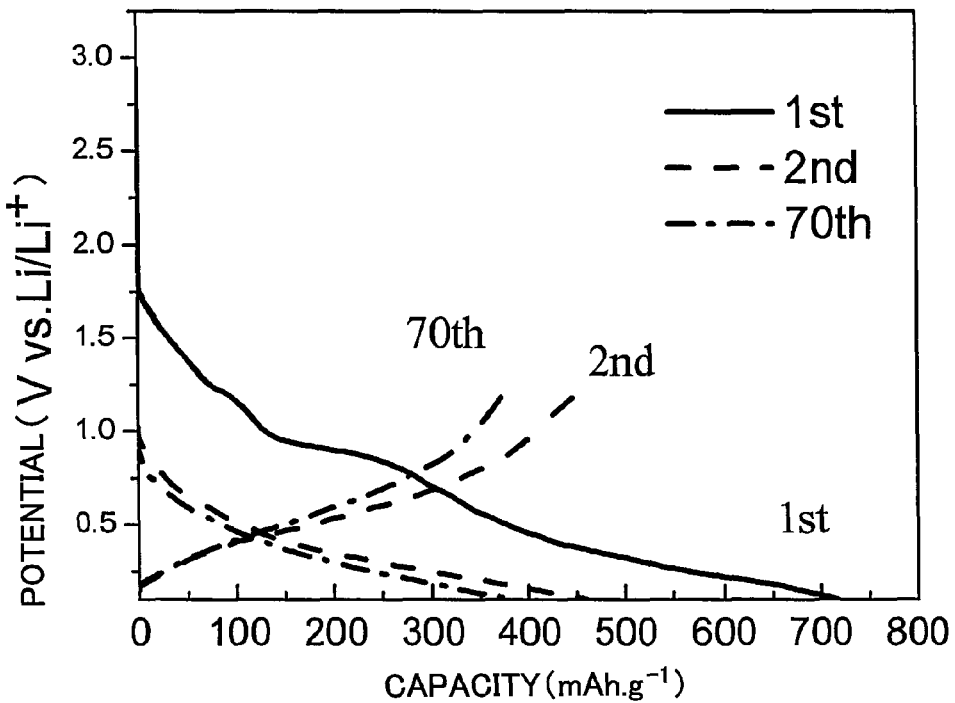
FIG. 20 shows charge/discharge curves in Example 12, in which upward-sloping curves are charge curves and downward-sloping curves are discharge curves.

FIG. 18 shows charge/discharge cycle life test results of Comparative Example 4 and Example 12. FIG. 19 shows charge/discharge curves in Comparative Example 4. FIG. 20 shows charge/discharge curves in Example 12. As shown in FIG. 19, Comparative Example 4 indicated approximately 250 mAh/g when 70 cycles were completed. As shown in FIG. 20, Example 12 indicated approximately 400 mAh/g when 70 cycles were completed. The above results show that performing heat treatment at 400° C. under an atmosphere where the oxygen concentration is 1 vol % as in Example 12 allowed the discharge capacity to be maintained at a favorable level as compared to the initial capacity even after repeating the charge/discharge cycles. It should be noted that the battery characteristics in Comparative Example 3 where heat treatment was performed at 200° C. did not show any noticeable difference from the battery characteristics in Comparative Example 4. Comparative Example 3 indicated approximately 230 mAh/g after 100 cycles.

It was found that both samples on which heat treatment was performed at 400° C. under an atmosphere where the oxygen concentration was in the range of 1 to 5 vol % (i.e., the samples in Examples 12 and 13) had a structure in which a $Cu_3Sn$ layer and a layer of which a main component is a composite of $Cu_2O$ and $SnO_2$ were sequentially laminated, and that these samples in particular showed excellent battery characteristics. On the other hand, a sample that was subjected to heat treatment at 400° C. under an atmosphere where the oxygen concentration was 10 vol % (i.e., the sample in Comparative Example 6) had a structure formed solely of a composite of $Cu_2O$ and $SnO_2$, and therefore, showed poor electrical conductivity. However, a sample that was subjected to heat treatment under an atmosphere where the hydrogen concentration was 1 vol % (i.e., the sample in Comparative Example 7) had a structure formed solely of a $Cu_3Sn$ layer, including no oxide layer. The sample indicated 220 mAh/g after 100 cycles.

Example 14 and Comparative Examples 8 to 10

CuSn Alloy Plating

A CuSn alloy plated coating having a thickness of approximately 3 μm was formed by an electroplating method onto a carbon fiber having a single fiber diameter of 8 μm.

Carbon fibers coated with a CuSn alloy plating in the above manner were subjected to heat treatment for two hours under respective sets of conditions as shown in Table 4 below. Accordingly, samples were obtained for the respective sets of conditions.

TABLE 4

| | Treatment Temperature | Oxygen Concentration in Ar Atmosphere (vol %) |
|---|---|---|
| Example 14 | 400° C. | 2% |
| Comparative Example 8 | 200° C. | 2% |
| Comparative Example 9 | 300° C. | 2% |
| Comparative Example 10 | 25° C. | 2% |

Figure 21:
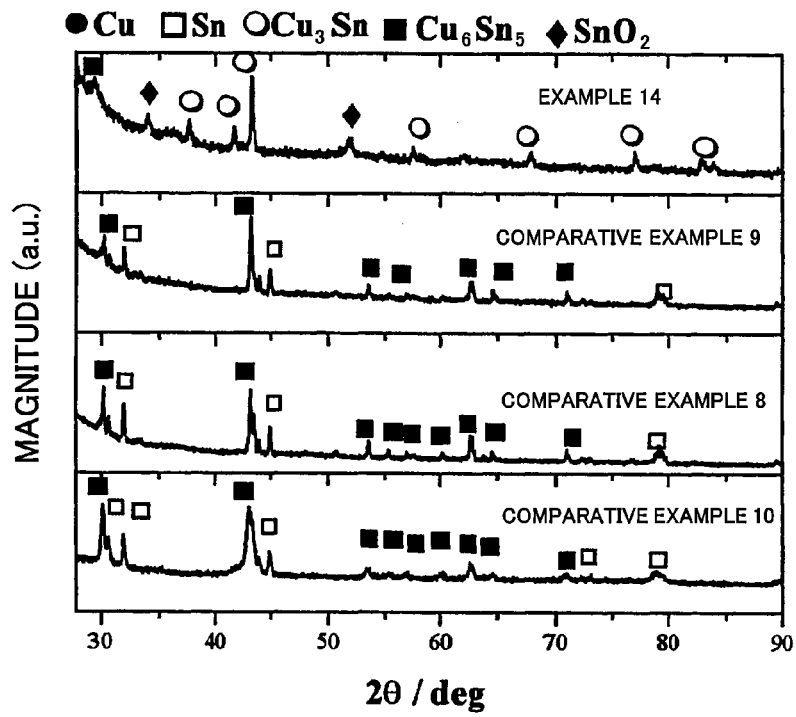
FIG. 21 shows X-ray diffraction patterns in Example 14 and Comparative Examples 8 to 10.
Figure 22:
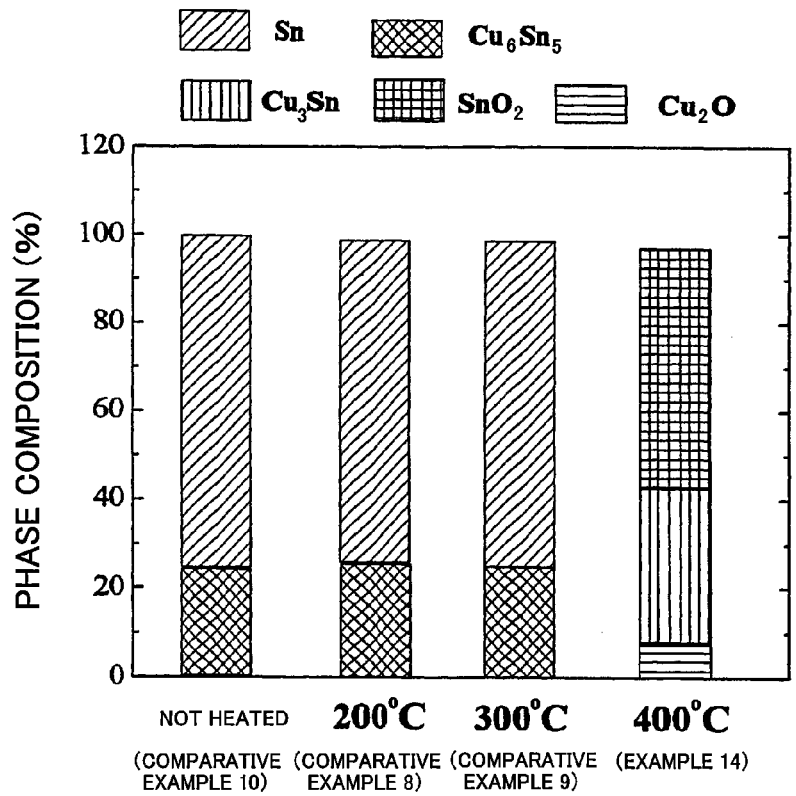
FIG. 22 shows the presence ratio of each phase in Example 14 and Comparative Examples 8 to 10.
Figure 23:
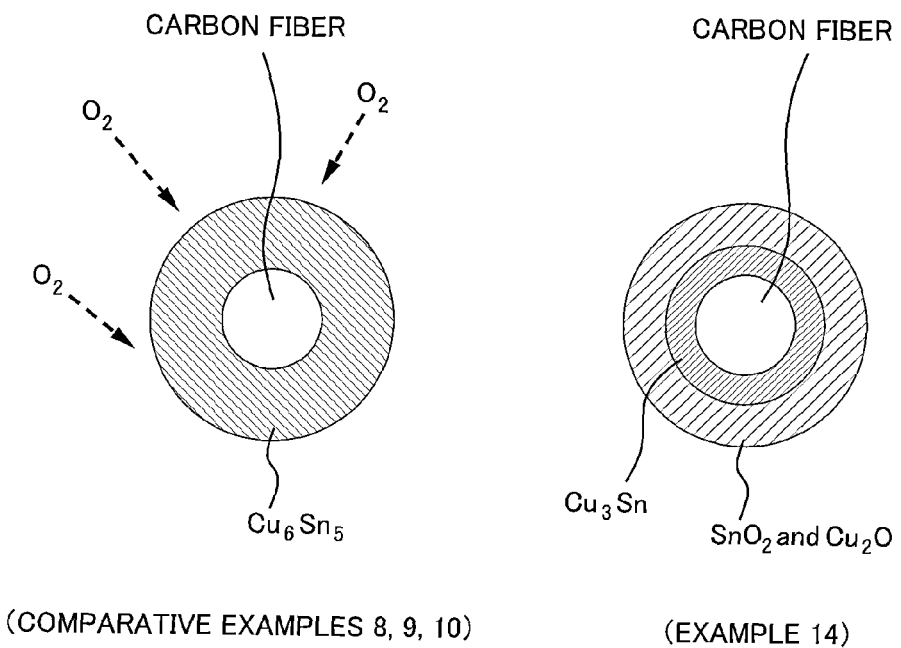
FIG. 23 schematically shows cross section structures in Example 14 and Comparative Examples 8 to 10.

Qualitative analysis was performed by the powder X-Ray Diffraction method (XRD) on samples subjected to heat treatment (the samples in Example 14 and Comparative Examples 8 and 9) and on a sample not subjected to heat treatment (the sample in Comparative Example 10). FIG. 21 shows XRD measurement results. Rietveld analysis was conducted on the obtained XRD data and the presence ratio of each phase was obtained. FIG. 22 shows the presence ratio of each phase in Example 14 and Comparative Examples 8 to 10. Further, the energy dispersive X-ray analysis method (EDX) was used to perform coating cross-section structure analysis. FIG. 23 schematically shows EDX results. The sample in Comparative Example 10 where heat treatment was not performed had a structure in which only a CuSn alloy coating was formed. On the other hand, the sample in Comparative Example 8 where heat treatment was performed at 200° C. under a trace oxygen atmosphere, and the sample in Comparative Example 9 where heat treatment was performed at 300° C. under a trace oxygen atmosphere, both had a structure in which layers including a CuSn alloy and Sn as main components, respectively, were sequentially laminated onto the carbon fiber. The sample in Example 14 where heat treatment was performed at 400° C. under a trace oxygen atmosphere had a structure in which a $Cu_3Sn$ layer and a composite layer of $Cu_2O$ and $SnO_2$ were sequentially laminated onto the carbon fiber.

The above samples were used as test electrodes. A metallic lithium foil was used for their counter electrodes. A solution that is obtained by dissolving $LiPF_6$ at a concentration of 1 mol/liter into a solvent in which ethylene carbonate (EC) and diethyl carbonate (DEC) are mixed in a volume ratio of 1:1, was used as an electrolyte solution. A two-electrode evaluation cell was prepared, and a charge/discharge test was conducted. During the test, a cutoff voltage was used to perform control, and a charge/discharge current corresponding to 0.2 C was used. It is assumed here that a reaction where Li is inserted into a Sn electrode is charging, and a reaction where Li is released from the Sn electrode is discharging. Table 5 below shows charge/discharge test results of Example 14 and Comparative Examples 8 to 10.

TABLE 5

|  | After 10 Cycles | After 50 Cycles | After 100 Cycles |
| --- | --- | --- | --- |
| Example 14 | 475 mAh/g | 451 mAh/g | 440 mAh/g |
| Comparative Example 8 | 298 mAh/g | 225 mAh/g | 181 mAh/g |
| Comparative Example 9 | 360 mAh/g | 259 mAh/g | 180 mAh/g |
| Comparative Example 10 | 284 mAh/g | 215 mAh/g | 177 mAh/g |

Figure 24:
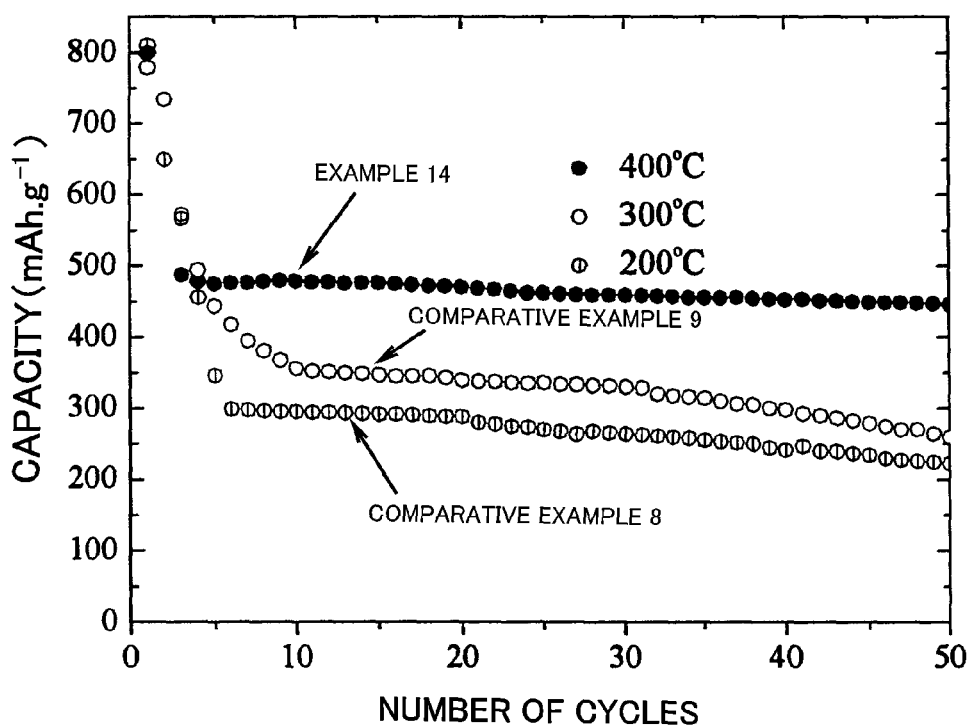
FIG. 24 shows charge/discharge cycle life test results in Example 14 and Comparative Examples 8 and 9.
Figure 25:
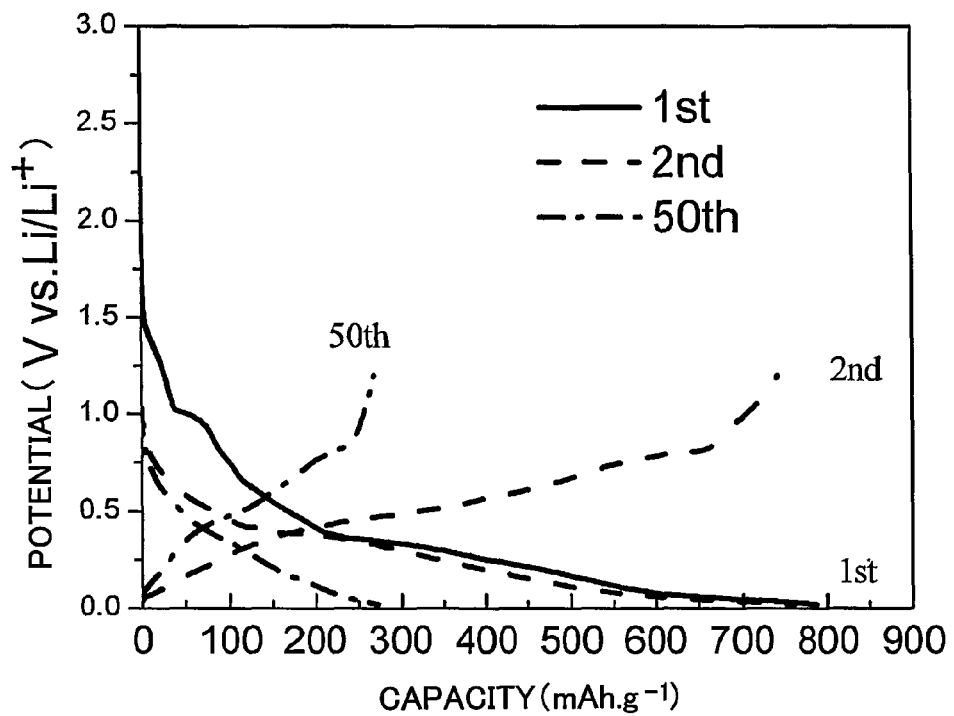
FIG. 25 shows charge/discharge curves in Comparative Example 9, in which upward-sloping curves are charge curves and downward-sloping curves are discharge curves.
Figure 26:
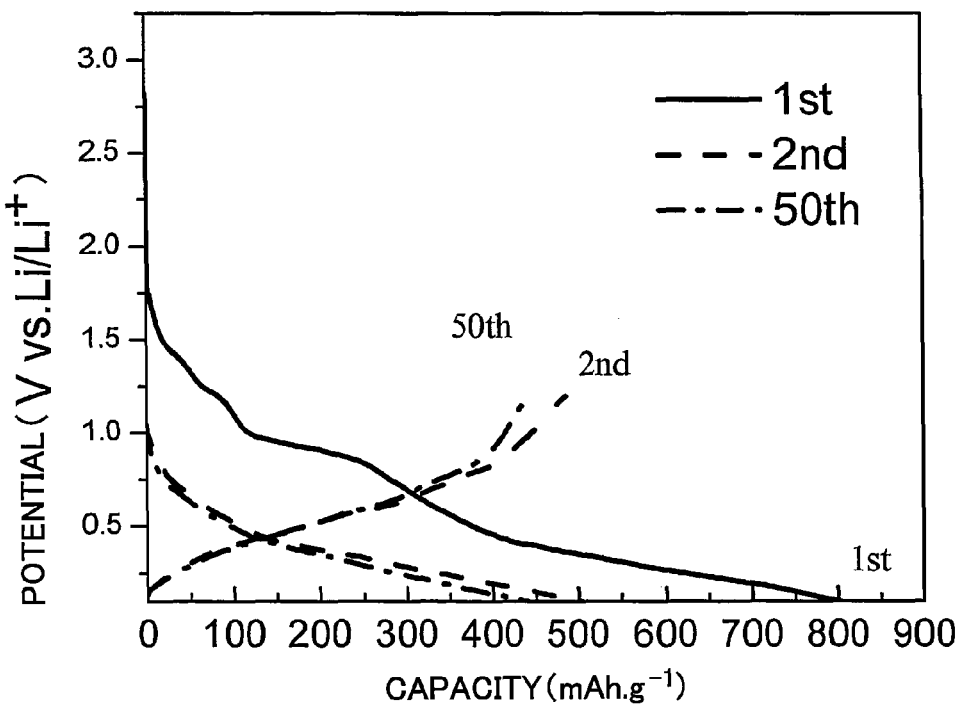
FIG. 26 shows charge/discharge curves in Example 14, in which upward-sloping curves are charge curves and downward-sloping curves are discharge curves.

FIG. 24 shows charge/discharge cycle life test results of Example 14 and Comparative Examples 8 and 9. FIG. 25 shows charge/discharge curves of Comparative Example 9. FIG. 26 shows charge/discharge curves of Example 14. As in FIG. 24, Comparative Examples 8 and 9, of which the samples used as test electrodes were subjected to the same heat treatment as that of the present invention, showed a sudden decrease in discharge capacity in a few cycles. In contrast, Example 14 showed excellent battery characteristics. It should be noted that Comparative Example 10, of which the sample used as a test electrode was not subjected to any heat treatment, showed similar results to those of Comparative Example 8.

From the above results, it was found that both samples on which heat treatment was performed at 300° C. or lower (i.e., the samples in Comparative Examples 8 and 9) had a structure where a layer of which a main component is a CuSn alloy was only laminated, and showed a low capacity of approximately 180 mAh/g at the 100th cycle. On the other hand, it was found that a sample on which heat treatment was performed at 400° C. (i.e., the sample in Example 14) had a structure where a $Cu_3Sn$ layer and a layer of which a main component is a composite of $Cu_2O$ and $SnO_2$ were sequentially laminated, and showed a capacity of 440 mAh/g at the 100th cycle, that is, excellent battery characteristics.

[Structure of Electrode after Charging/Discharging (Examples 12 and 14)]

The batteries of Examples 12 and 14 were disassembled after charging them, and the electrode structures of the batteries were examined. As a result of the examination, Cu, $Li_{44}Sn$, and $Li_2O$ were newly observed.

To be specific, the structures both include: (1) a carbon fiber current collector; (2) a tubular layer which is formed on the carbon fiber current collector and in which Cu and $Li_{44}Sn$ are dispersed within an $Li_2O$ matrix; and (3) an intermediate layer having a lithium release capacity, which is present at the interface between the carbon fiber current collector and the tubular layer in which Cu and $Li_{44}Sn$ are dispersed within the $Li_2O$ matrix. This can be considered that at the time of lithium occlusion (i.e., charging), $Cu_2O$ and $SnO_2$ were subjected to lithium reduction.

On the other hand, when the batteries of Examples 12 and 14 were disassembled after their discharging, and the electrode structures of the batteries were examined, Cu, Sn, and $Li_2O$ were newly observed.

To be specific, the structures both include: (1) a carbon fiber current collector; (2) a tubular layer which is formed on the carbon fiber current collector and in which Cu and Sn or Sn alloy are dispersed within an $Li_2O$ matrix; and (3) an intermediate layer having a lithium occlusion capacity, which is present at the interface between the carbon fiber current collector and the tubular layer in which Cu and Sn or Sn alloy are dispersed within the $Li_2O$ matrix.

Figure 27:
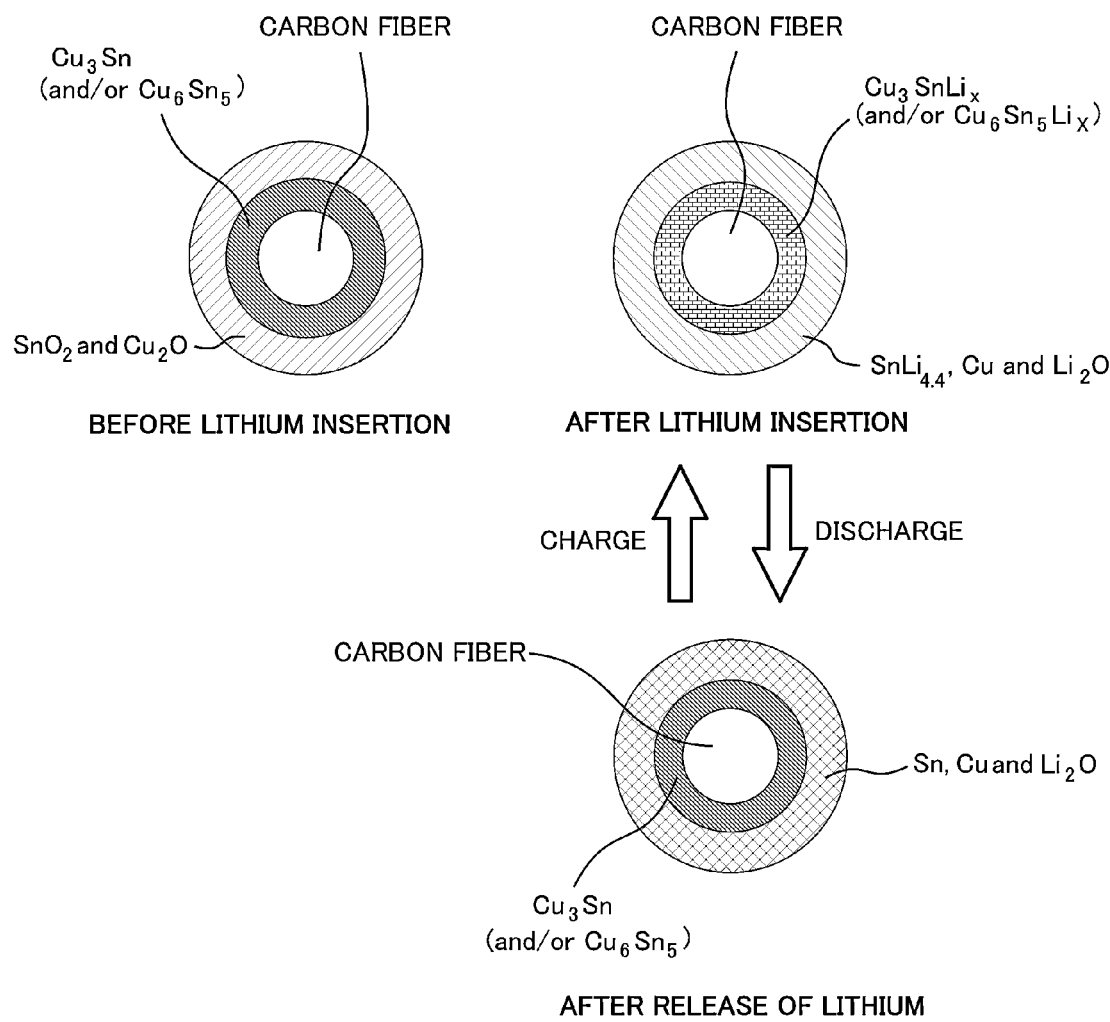
FIG. 27 schematically shows cross section structures after charging and cross section structures after discharging in relation to Examples 12 and 14.

FIG. 27 schematically shows a cross section of each electrode in Examples 12 and 14 after their charging and discharging.

Examples 15 to 22

CuSn Alloy Co-Deposition

A conductant agent and/or a binder were dispersed in a CuSn plating liquid, and a CuSn alloy coating with a thickness of approximately 3 μm, containing the conductant agent and/or the binder, was formed by an electroplating method onto a carbon fiber having a single fiber diameter of 8 μm (i.e., co-deposition). The composition of the formed alloy coating is as shown in Table 6 below.

Carbon fibers, on each of which the CuSn alloy coating containing the conductant agent and/or the binder was formed in the above manner, were subjected to heat treatment at 400° C. for two hours under an Ar atmosphere where the oxygen concentration was 0.5 vol %. Accordingly, respective samples were obtained.

TABLE 6

|  | Conductant Agent (wt %) | Binder (wt %) |
| --- | --- | --- |
| Example 15 | KB 2% | — |
| Example 16 | — | PTFE 2% |
| Example 17 | KB 2% | PTFE 2% |
| Example 18 | AB 2% | PTFE 2% |
| Example 19 | — | PTFE 10% |
| Example 20 | KB 1% | PE 1% |
| Example 21 | KB 1% | PVA 1% |
| Example 22 | KB 1% | SBR 1% |

The above samples were used as test electrodes. A metallic lithium foil was used for their counter electrodes. A solution that is obtained by dissolving $LiPF_6$ at a concentration of 1 mol/liter into a solvent in which ethylene carbonate (EC) and diethyl carbonate (DEC) are mixed in a volume ratio of 1:1, was used as an electrolyte solution. A two-electrode evaluation cell was prepared, and a charge/discharge test was conducted. During the test, a cutoff voltage was used to perform control, and a charge/discharge current corresponding to 0.2 C was used. It is assumed here that a reaction where Li is inserted into a Sn electrode is charging, and a reaction where Li is released from the Sn electrode is discharging. Table 7 below shows charge/discharge test results of Examples 15 to 22.

TABLE 7

|  | After 10 Cycles | After 50 Cycles | After 100 Cycles |
| --- | --- | --- | --- |
| Example 15 | 495 mAh/g | 471 mAh/g | 459 mAh/g |
| Example 16 | 488 mAh/g | 470 mAh/g | 461 mAh/g |
| Example 17 | 510 mAh/g | 598 mAh/g | 591 mAh/g |
| Example 18 | 509 mAh/g | 594 mAh/g | 583 mAh/g |
| Example 19 | 399 mAh/g | 394 mAh/g | 391 mAh/g |
| Example 20 | 505 mAh/g | 490 mAh/g | 478 mAh/g |
| Example 21 | 504 mAh/g | 488 mAh/g | 478 mAh/g |
| Example 22 | 505 mAh/g | 489 mAh/g | 480 mAh/g |

As shown in Table 7, it was found from the charge/discharge cycle life test results that samples on which co-deposition of the conductant agent and/or the binder was performed (i.e., the samples in Examples 15 to 18 and 20 to 22) showed a greater discharge capacity than the sample in Example 14 shown in Table 5. Thus, these samples were found to be excellent negative electrodes.

A sample containing 2 wt % of KB (KetjenBlack) (i.e., the sample in Example 15) showed improved charge/discharge cycle life characteristics as compared to Example 14 in which the sample contained no conductant agent. This can be considered that there was a decrease in the internal resistance of the electrode. A sample containing 2 wt % of PTFE (polytetrafluoroethylene) (i.e., the sample in Example 16) also showed improved charge/discharge cycle life characteristics. This can be considered that containing the binder in the sample prevented dropping of the active material from the sample. Moreover, a sample containing 2 wt % of KB and 2 wt % of PTFE (i.e., the sample in Example 17) showed a further improvement in the charge/discharge cycle life.

From the above results, it was found that containing KB or PTFE in the CuSn alloy coating brought an improvement in the charge/discharge cycle life. In Example 18, the sample containing AB (acetylene black) in place of KB showed similar charge/discharge cycle life characteristics to those of Example 17. In Example 19, a change was made to the amount of contained PTFE from 2 wt % to 10 wt %. As a result, similar to Example 16, Example 19 showed an improvement in the charge/discharge cycle life. However, Example 19 showed a decrease in the discharge capacity due to its high internal resistance.

It was found that the charge/discharge cycle life was improved even in Examples 20, 21, and 22 where binders different from PTFE (PE, PVA, and SBR) were used.

As compared to the sample on which co-deposition was not performed (i.e., the sample in Example 14), the samples obtained in the above-described manner (i.e., the samples in Examples 15 to 22) showed an improved electrode capacity and improved charge/discharge cycle life characteristics.

The sample obtained in Example 17 was analyzed by using X-ray photoelectron spectroscopy. As a result, it was confirmed that KB and PTFE were contained in the sample.

3. Examples Relating to Secondary Battery Obtained from Combination of Fiber Positive Electrode and Fiber Negative Electrode Example 23

Figure 32:
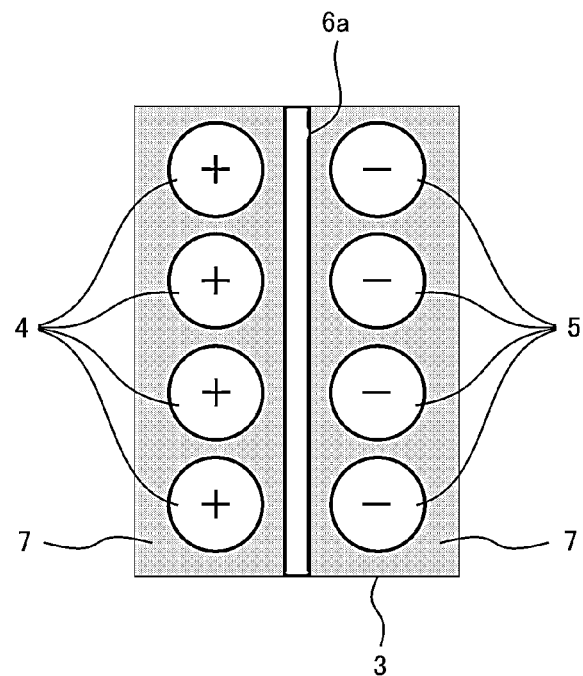
FIG. 32 is a plan view showing a schematic structure of a two-electrode evaluation cell in Example 23.

A polyethylene microporous membrane separator was interposed between fiber positive electrodes obtained in Example 9 and fiber negative electrodes obtained in Example 12. A solution that is obtained by dissolving $LiPF_6$ at a concentration of 1 mol/liter into a solvent in which ethylene carbonate (EC) and diethyl carbonate (DEC) are mixed in a volume ratio of 1:1, was used as an electrolyte solution. A two-electrode evaluation cell was prepared, and a charge/discharge test was conducted. The fiber negative electrodes used here were predoped with Li by an amount corresponding to irreversible capacity. FIG. 32 is a plan view showing a schematic structure of the two-electrode evaluation cell in Example 23. In FIG. 32, the reference numeral 3 denotes cell outer walls, the reference numeral 4 denotes the fiber positive electrodes, the reference numeral 5 denotes the fiber negative electrodes, the reference numeral 6a denotes the microporous membrane separator, and the reference numeral 7 denotes the electrolyte solution. Each fiber positive electrode 4 is connected to a positive electrode terminal (not shown), and each fiber negative electrode 5 is connected to a negative electrode terminal (not shown).

Example 24

Figure 33:
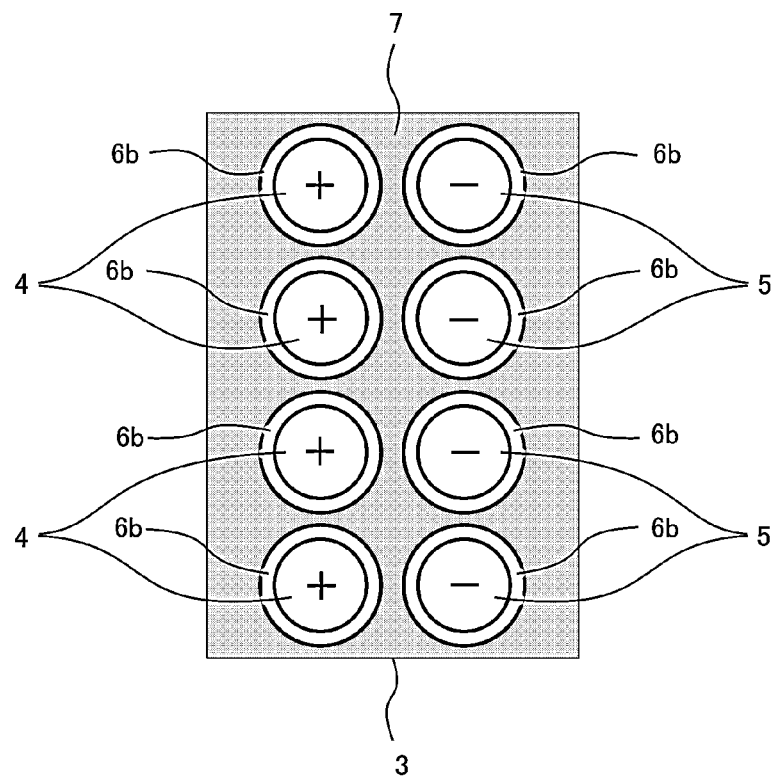
FIG. 33 is a plan view showing a schematic structure of a two-electrode evaluation cell in Example 24.

Fiber positive electrodes obtained in Example 9 and Fiber negative electrodes obtained in Example 12 were each impregnated with a polyethylene solution in which $SiO_2$ fine powder (having a diameter of 30 nm or less) was dispersed, and then the electrodes were dried. Thereafter, the fiber positive electrodes and the fiber negative electrodes were immersed for 3 hours in an LiOH solution of 90° C. containing 30 wt % of LiOH. A polyethylene porous membrane separator was formed on each fiber positive electrodes and on each fiber negative electrode. Subsequently, the fiber negative electrodes were predoped with Li by an amount corresponding to irreversible capacity. A laminated body including the fiber positive electrodes and the separators and a laminated body including the fiber negative electrodes and the separators, which were obtained in the above manner, were combined. Then, a two-electrode evaluation cell was prepared by using, as an electrolyte solution, a solution that is obtained by dissolving $LiPF_6$ at a concentration of 1 mol/liter into a solvent in which ethylene carbonate (EC) and diethyl carbonate (DEC) are mixed in a volume ratio of 1:1. Then, a charge/discharge test was conducted. FIG. 33 shows a schematic structure of the two-electrode evaluation cell in Example 24. The reference numeral 3 denotes cell outer walls, the reference numeral 4 denotes the fiber positive electrodes, the reference numeral 5 denotes the fiber negative electrodes, the reference numeral 6b denotes the separators, and the reference numeral 7 denotes the electrolyte solution. Each fiber positive electrode 4 is connected to a positive electrode terminal (not shown), and each fiber negative electrode 5 is connected to a negative electrode terminal (not shown).

[Charge/Discharge Test Results (Examples 23 and 24)]

Based on the results of the charge/discharge test conducted for Examples 23 and 24, Table 8 below shows discharge capacities and intermediate discharge voltages at high rate discharges. During the test, a cutoff voltage was used to perform control, a current corresponding to 0.2 C was used for charging, and a current corresponding to 0.5 C to 300 C was used for discharging. It is assumed here that a reaction where Li is inserted into a Sn electrode is charging, and a reaction where Li is released from the Sn electrode is discharging.

TABLE 8

| Discharge Rate (C) | Example 23 Discharge Capacity (mAh/g) | Example 23 Intermediate Voltage (V) | Example 24 Discharge Capacity (mAh/g) | Example 24 Intermediate Voltage (V) |
| --- | --- | --- | --- | --- |
| 0.5 C | 145 | Approx. 3.6 | 145 | Approx. 3.6 |
| 1 C | 126 | Approx. 3.2 | 139 | Approx. 3.25 |
| 2 C | 112 | Approx. 3.1 | 130 | Approx. 3.2 |
| 5 C | 105 | Approx. 3.0 | 121 | Approx. 3.15 |
| 10 C | 91 | Approx. 2.8 | 110 | Approx. 3.1 |
| 20 C | 80 | Approx. 2.6 | 104 | Approx. 3.0 |
| 50 C | 75 | Approx. 2.1 | 98 | Approx. 2.95 |
| 100 C | 55 | Approx. 1.6 | 78 | Approx. 2.6 |
| 200 C | 42 | Approx. 1.3 | 65 | Approx. 1.9 |
| 300 C | 27 | Approx. 1.0 | 41 | Approx. 1.3 |

It was found from Table 8 that the high rate discharge characteristics were significantly improved by combining the fiber positive electrodes and the fiber negative electrodes. Even in comparison with a half-cell test where metal Li was used for a counter electrode (e.g., Example 6 in Test Example 2 shown in FIG. 12), the discharge capacities in the range of 0.5 C to 200 C indicate increases. In particular, in Example 24, super-fast discharge characteristics such as 100 C to 300 C indicate improvement as compared to Example 23. Example 23 realized improved discharge characteristics owing to an increase in the contact area between the electrolyte solution and the electrodes. However, in Example 24, the contact area between the electrolyte solution and the separators was also increased since the separators were formed at the outer periphery of the electrodes. Furthermore, the internal resistance was reduced owing to a reduction in the distance between the electrodes. It can be considered that these factors contributed to the improvement in the high rate discharge characteristics.

In the above charge/discharge cycle life test results, at early cycles, Examples 23 and 24 indicate discharge capacities similar to those in Example 9. These discharge capacities showed almost no decrease even after 500 cycles. Thus, it was found that combining the fiber positive electrodes and fiber negative electrodes significantly improve the cycle life characteristics.

Reference Invention Examples

Described next is a reference invention example which the inventors of the present invention have arrived at as a result of conducting intensive research aiming at providing: a positive electrode of which a main active material is a lithium-doped transition metal oxide and which is suitable to be a positive electrode for a lithium secondary battery; and a method for fabricating the positive electrode, particularly aiming at providing a method for mass-manufacturing, at low cost, of a lithium-doped transition metal oxide positive electrode having an excellent long-term durability, which is capable of suppressing a reduction in the active area of catalyst particles and which is chargeable/dischargeable with high current density. As a result of the intensive research, the inventors succeeded in obtaining a positive electrode for a lithium secondary battery, of which a main active material is a lithium-doped transition metal oxide, by forming a transition metal oxide coating on a current collector and then subjecting the current collector, on which the transition metal oxide coating is formed, to hydrothermal treatment in a lithium ion containing solution at 100° C. to 400° C. under the presence of an oxidant or a reductant. The reference invention example is described below.

Specifically, the reference invention example provides a positive electrode described below, a method for fabricating the positive electrode, and a nonaqueous secondary battery.

The method for fabricating the positive electrode for a lithium secondary battery includes the steps of:

(X) forming a transition metal oxide coating on a current collector; and (Y) subjecting the current collector, on which the transition metal oxide coating is formed, to hydrothermal treatment in a lithium ion containing solution at 100° C. to 400° C. under the presence of an oxidant or a reductant to obtain a lithium-doped transition metal oxide coating on the current collector.

Preferably, the step (X) is a step of forming the transition metal oxide coating on the current collector by an electrodeposition method.

Preferably, the step (X) is a step of applying onto the current collector a paste in which transition metal oxide powder and a thickener or a binder are dispersed, and thereafter, subjecting the current collector, onto which the paste has been applied, to high-temperature treatment at 500° C. to 1000° C. under an inert atmosphere to remove or carbonize the thickener or the binder.

Preferably, the step (X) is a step of applying onto the current collector a paste in which transition metal powder and a thickener or a binder are dispersed, and thereafter, subjecting the current collector, onto which the paste has been applied, to high-temperature treatment at 500° C. to 1000° C. under an oxidizing atmosphere to remove or carbonize the thickener or the binder.

Preferably, the step (X) is a step of forming a transition metal coating on the current collector by a physical thin film formation method, and thereafter, subjecting the current collector, on which the transition metal coating is formed, to high-temperature oxidation treatment at 500° C. to 1000° C. under an oxidizing atmosphere.

Preferably, the step (X) is a step of forming a transition metal coating on the current collector by an aerosol deposition method, and thereafter, subjecting the current collector, on which the transition metal coating is formed, to high-temperature oxidation treatment at 500° C. to 1000° C. under an oxidizing atmosphere.

Preferably, the step (X) is a step of forming a transition metal coating on the current collector by an electroplating method, and thereafter, subjecting the current collector, on which the transition metal coating is formed, to high-temperature oxidation treatment at 500° C. to 1000° C. under an oxidizing atmosphere.

Preferably, the current collector is a metal porous body.

Preferably, the transition metal oxide is represented by the following formula (3): $M_aO_b$ (wherein: M is at least one kind of transition metal selected from the group consisting of Ti, V, Cr, Mn, Fe, Co, and Ni; $1 \le a \le 3$; and $1 \le b \le 5$), and the lithium-doped transition metal oxide is represented by the following formula (4): $Li_dM_eO_c$ (wherein: $2 \le c \le 5$; $0 < d \le 2$; $1 \le e \le 5$; and M is the same as in formula (3)).

Preferably, the transition metal oxide is $Mn_3O_4$, and the lithium-doped transition metal oxide is represented by the following formula (4-1): $Li_{d1}Mn_{e1}O_{c1}$ (wherein: the valence of Mn is in the range of 3 to 4; $2 \le c1 \le 4$; $0 < d1 \le 2$; and $1 \le e1 \le 2$).

Preferably, the transition metal oxide is represented by the following formula (3-2): $(Mn_{1-x}A_x)_3O_4$ (wherein: A is at least one element selected from the group consisting of Al, Ti, Cr, Fe, Co, Ni, Cu, Sr, Y, Zr, In, Sn, and a rare earth element; and $0.05 \le x \le 0.25$), and the lithium-doped transition metal oxide is represented by the following formula (4-2): $Li_{d2}(Mn_{1-y}A_y)_{e2}O_{c2}$ (wherein: the valence of Mn is in the range of 3 to 4; $2 \le c2 \le 4$; $0 < d2 \le 2$; $1 \le e2 \le 2$; $0.05 \le y \le 0.25$; and A is the same as in formula (3-2)).

Preferably, the positive electrode is fabricated in any one of the above methods.

Preferably, the positive electrode for a lithium secondary battery is a porous electrode of which the lithium-doped transition metal oxide is flake-shaped and formed perpendicularly to the surface of the current collector.

Preferably, the lithium-doped transition metal oxide, which is flake-shaped, has a thickness of 5 to 500 nm, a width of 0.1 to 10 μm, and a length of 0.1 to 10 μm.

Preferably, the lithium secondary battery includes: any of the above positive electrodes for a lithium secondary battery; an electrolyte; and a negative electrode.

The method for fabricating the positive electrode of the reference invention example includes the steps of:

(X) forming a transition metal oxide coating on a current collector; and (Y) subjecting the current collector, on which the transition metal oxide coating is formed, to hydrothermal treatment in a lithium ion containing solution at 100° C. to 400° C. under the presence of an oxidant or a reductant to obtain a lithium-doped transition metal oxide coating on the current collector.

In the step (X), the transition metal oxide coating is formed on the current collector.

The current collector may have a two-dimensional structure, for example, plate-shaped or foil-shaped. However, it is preferred that the current collector has a three-dimensional structure. For example, the current collector may be mesh-shaped, or a foam metal, or an expanded metal.

For example, the current collector may be a metal selected from the group consisting of Al, Ti, Cr, Zr, Hf, Ta, and W, or may be an alloy formed of these metals, or may be stainless steel. However, in terms of cost, it is preferred that the current collector is Al or stainless steel.

The transition metal oxide is not particularly limited, so long as a coating thereof can be formed on the current collector. Examples of the transition metal oxide include TiO, $Ti_2O_3$, $TiO_2$, $V_2O_3$, $V_2O_5$, CrO, $Cr_2O_3$, $CrO_2$, MnO, $Mn_3O_4$, $Mn_2O_3$, $MnO_2$, $MnO_3$, FeO, $Fe_3O_4$, $Fe_2O_3$, COO, $CO_2O_3$, $CO_3O_4$, $CoO_2$, NiO, $Ni_3O_4$, $Ni_2O_3$, $NiO_2$, $Cu_2O$, CuO, and ZnO.

Examples of a method for forming a transition metal oxide coating on the current collector include, but not limited to, a slurry method, a physical thin film formation method, an aerosol deposition method, an electroplating method, and an electrodeposition method. Hereinafter, these formation methods are described.

The slurry method is, for example, a method where a slurry that is obtained by dispersing transition metal oxide particles and organic matter in a solvent is applied onto the current collector, and then the solvent is evaporated, thereby forming an electrode.

The organic matter is not particularly limited, so long as it allows the current collector and the transition metal oxide particles to be bound to each other and dissolves in the solvent to provide viscosity. For example, a conventional thickener or binder is suitably used as the organic matter. To be specific, examples of the organic matter include: styrene-butadiene rubber (SBR), styrene ethylene butylene styrene block copolymer (SEBS), carboxymethylcellulose (CMC), polyvinylidene fluoride (PVdF), an imide, polyethylene (PE), polypropylene (PP), polyvinyl alcohol (PVA), polytetrafluoroethylene (PTFE), citric acid, sucrose, and phenol resin.

The amount of the organic matter to be added is preferably in the range of 5 to 15% by mass relative to the transition metal oxide which acts as an active material. Keeping the amount of the added organic matter within this range suppresses dropping of the transition metal oxide particles from the current collector at the time of hydrothermal synthesis, suppresses an increase in electrode resistance, and improves the electrode capacity.

The solvent is not particularly limited, so long as it allows the above organic matter (e.g., a thickener or a binder) to be dissolved or dispersed. Examples of the solvent include water, an alcohol, acetone, and N-methyl-2-pyrrolidone (NMP).

Examples of the method for evaporating the solvent include, but not limited to, heat treatment and decompression treatment.

It should be noted that adding a conductive assistant is optional. However, in the case of forming an active material layer having a great thickness, it is preferable to add a conductive assistant by approximately 2 to 10 mass % relative to the active material since such addition of the conductive assistant prevents deterioration in electrical conductivity.

However, after evaporating the solvent, there still remains the thickener, binder, or the like in the electrode, causing poor electrical conductivity. For this reason, after the slurry is applied, high-temperature treatment is performed under an inert atmosphere. This causes the thickener, binder, or the like in the electrode to be removed or carbonated. Accordingly, the electrical conductivity is improved significantly.

Here, it is preferred that the high-temperature treatment is performed at 500 to 1000° C. since this temperature range causes the thickener, binder, or the like to be sufficiently removed or carbonated, allows the high-temperature treatment to be performed at low cost with a small-scale device, and prevents deterioration of the current collector. Also, it is preferred that the high-temperature treatment is performed for a period of approximately 5 to 50 hours since this period range causes the thickener, binder, or the like to be sufficiently removed or carbonated, and allows the high-temperature treatment to be performed at low cost.

Evaporation of the solvent and the removal/carbonization of the thickener, binder, or the like may be performed at the same time, or may be performed at different times. It should be noted that if the above high-temperature treatment is performed after the slurry is applied, then the thickener, binder, or the like can be removed or carbonized, and at the same time, the solvent can be evaporated.

It should be noted that a transition metal oxide coating can be formed on the current collector by applying onto the current collector a slurry that is obtained by dispersing a transition metal and organic matter in a solvent, and then subjecting the current collector, on which the slurry has been applied, to high-temperature oxidation treatment. Examples of the high-temperature oxidation treatment herein include increasing the temperature to 500 to 1000° C. under an oxidizing atmosphere. The oxidizing atmosphere herein is, for example, an atmosphere where air, oxygen, or the like, is present.

Examples of the physical thin film formation method include a vapor deposition method and a sputtering method. If a sputtering method is used, a high dense transition metal oxide film can be formed. However, transition metal oxides have poor electrical conductivity. Therefore, using a sputtering method to laminate a transition metal oxide onto the current collector is inefficient. Even with a vapor deposition method, vapor deposition of an oxide is time consuming, and therefore, not suitable for mass manufacturing. For this reason, in the case of using the physical thin film formation method, first, a transition metal is laminated and then high-temperature oxidation treatment is performed thereon. In this manner, a transition metal oxide film is formed.

The high-temperature oxidation treatment performed here may be the same as the high-temperature oxidation treatment performed in the slurry method. Specifically, the high-temperature oxidation treatment may be, for example, to increase the temperature to 500 to 1000° C. under an oxidizing atmosphere.

On the other hand, the aerosol deposition method is a method for jetting, at once, transition metal oxide powder that exists in a positive pressure atmosphere to the current collector that exists in a negative pressure atmosphere, thereby forming a thin film. However, transition metal oxides have almost no ductility. Accordingly, even if a transition metal oxide is jetted to the current collector with a high pressure, it is difficult for a layer of the transition metal oxide to form. Therefore, first, a transition metal is laminated onto the current collector, and then high-temperature oxidation treatment is performed thereon. This allows the formation of a layer of a transition metal oxide. It should be noted that the positive pressure atmosphere herein refers to, for example, a state where the pressure in the atmosphere is higher than that of the surroundings, and the negative pressure atmosphere herein refers to, for example, a state where the pressure in the atmosphere is lower than that of the surroundings. Here, a pressure difference between a film forming chamber and an aerosol chamber is required to be 20 kPa or greater. The high-temperature oxidation treatment performed here may be the same as the high-temperature oxidation treatment performed in the slurry method. Specifically, the high-temperature oxidation treatment may be, for example, to increase the temperature to 500 to 1000° C. under an oxidizing atmosphere.

Here, particle diameters of the transition metal used in the aerosol deposition method are preferably as follows: the diameter of primary particles is 50 nm to 500 nm; and the average particle diameter of a secondary agglomerate (i.e., the average diameter of secondary particles) is 5 μm to 30 μm (more preferably, 5 μm to 10 μm). Setting the average diameter of secondary particles within this range makes particle agglomeration less likely to occur, and thereby improves the degree of adhesion to the current collector. Such powder may be produced by a mechanical alloying method, for example.

The electroplating method herein refers to a method for electrochemically forming a metal coating on the current collector. However, with the electroplating method, a transition metal oxide cannot be directly laminated onto the current collector. Therefore, it is necessary that the current collector is first plated with a transition metal, and then the transition metal is oxidized by means of high-temperature oxidation treatment such as heat treatment. The high-temperature oxidation treatment performed here may be the same as the high-temperature oxidation treatment performed in the slurry method. Specifically, the high-temperature oxidation treatment may be, for example, to increase the temperature to 500 to 1000° C. under an oxidizing atmosphere.

Conditions for performing the electroplating method are not limited to particular conditions. Although depending on a metal to be plated, the concentration of a transition metal salt to be plated is adjusted to be within the range of 0.05 to 1 mol/liter, and the electroplating is performed with a current density of 1 mA/cm$^2$ to 0.1 A/cm$^2$. In this manner, the current collector is plated with the transition metal.

The electrodeposition method herein refers to a method for causing an electrochemical reaction at the interface between a metal electrode and an electrolyte, thereby depositing a metal or a metallic compound. In the electrodeposition method, a transition metal oxide can be directly formed on the current collector.

Conditions for performing the electrodeposition method are not limited to particular conditions. Although depending on a metal to be deposited, the concentration of a metal salt to be deposited may be adjusted to be within the range of 0.05 to 1 mol/liter, and the electrodeposition may be performed with a current density of 1 mA/cm$^2$ to 0.1 A/cm$^2$.

In a case where a metal porous body (e.g., a mesh metal, foam metal, or three-dimensional expanded metal) is used as the current collector, it is difficult to uniformly cover the current collector with a transition metal oxide if the slurry method, the physical thin film formation method, or the aerosol deposition method among the above-described coating formation methods is used. Therefore, the electroplating method, the electrodeposition method, or the like is suitable in such a case. According to the electroplating method, the electrodeposition method, or the like, a transition metal oxide coating can be formed on the surface of the current collector, so long as the current collector is in contact with a plating bath or an electrodeposition bath. Moreover, these methods realize favorable adhesion and improved smoothness of the coating surface, and allow uniform lamination to be readily performed on a large area at low cost. In particular, the electrodeposition method is the most preferable method since it allows a transition metal oxide to be directly formed on the current collector.

Preferably, the amount of lamination of the transition metal oxide layer is 1 to 30 mg/cm$^2$. By setting the amount of lamination within this range, a necessary capacity for the battery can be obtained, and also, delamination between the transition metal layer and the current collector becomes less likely to occur.

Although the average thickness of the transition metal oxide layer is not limited to a particular thickness, the average thickness is usually in the range of approximately 0.5 μm to 30 μm, and preferably in the range of approximately 1 μm to 10 μm.

Next, in the step (Y), the current collector, on which the transition metal oxide coating is formed, is subjected to hydrothermal treatment in a lithium ion containing solution at 100° C. to 400° C. under the presence of an oxidant or a reductant to obtain a lithium-doped transition metal oxide coating on the current collector.

For example, a transition metal oxide coating is formed on the current collector, which transition metal oxide coating is represented by the following formula (3): $M_aO_b$ (wherein: M is at least one kind of transition metal selected from the group consisting of Ti, V, Cr, Mn, Fe, Co, and Ni; $1 \le a \le 3$; and $1 \le b \le 5$). Then, the current collector, on which the transition metal oxide coating is formed, is subjected to hydrothermal treatment in a lithium ion containing solution under the presence of an oxidant or a reductant. As a result, lithium modification occurs to the transition metal oxide formed on the current collector, and the transition metal oxide becomes a lithium-doped transition metal oxide represented by the following formula (4): $Li_dM_eO_c$ (wherein: $2 \le c \le 5$; $0 < d \le 2$; $1 \le e \le 5$; and M is the same as in formula (3)).

Specifically, if $Mn_3O_4$ is used as the transition metal oxide, the resultant lithium-doped transition metal oxide is represented by the following formula (4-1): $Li_{d1}Mn_{e1}O_{c1}$ (wherein: the valence of Mn is in the range of 3 to 4; $2 \le c1 \le 4$; $0 < d1 \le 2$; and $1 \le e1 \le 2$).

In relation to the formula (3), $a \times \alpha = b \times 2$ represents a relationship among the number of atoms "a" of the transition metal M, the number of atoms "b" of oxygen O, and the valence α of the transition metal M. In relation to the formula (4), $d \times 1 + e \times \beta = c \times 2$ represents a relationship among the number of atoms d of lithium Li, the number of atoms e of the transition metal M, the number of atoms c of oxygen O, and the valence β of the transition metal M. Similarly, in relation to the formula (4-1), $d1 \times 1 + e1 \times \beta1 = c1 \times 2$ represents a relationship among the number of atoms d1 of lithium Li, the number of atoms e1 of manganese Mn, the number of atoms c1 of oxygen O, and the valence β1 of manganese Mn. Thus, the number of atoms of each element is specified in accordance with its valence.

However, if a lithium manganese oxide such as $Li_{1+x}Mn_2O_4$ or $Li_xMn_2O_4$ is used as a positive-electrode active material in a lithium secondary battery, Mn is eluted at high temperatures. This results in significant capacity deterioration.

In order to suppress such elution of manganese, it is preferred to use a material in which a part of manganese is replaced with, for example, Al, Ti, Cr, Fe, Co, Ni, Cu, Sr, Y, Zr, In, Sn, or a rare earth element. It is more preferred to use a material in which a part of manganese is replaced with, for example, Cr, Co, Ni, or Al.

To be specific, a transition metal oxide coating is formed on the current collector, which transition metal oxide coating is represented by the following formula (3-2): $(Mn_{1-x}A_x)_3O_4$ (wherein: A is at least one element selected from the group consisting of Al, Ti, Cr, Fe, Co, Ni, Cu, Sr, Y, Zr, In, Sn, and a rare earth element; and $0.05 \le x \le 0.25$).

Thereafter, the transition metal oxide coating is doped with lithium. In this manner, a lithium-doped transition metal oxide coating is formed, which is represented by the following formula (4-2): $Li_{d2}(Mn_{1-y}A_y)_{e2}O_{c2}$ (wherein: the valence of Mn is in the range of 3 to 4, $2 \leq c2 \leq 4$; $0 < d2 \leq 2$; $1 \leq e2 \leq 2$; $0.05 \leq y \leq 0.25$; and A is the same as in the formula (3-2)).

Also in this case, similar to the above, in relation to the formula (4-2), $d2 \times 1 + e2 \times \beta 2 = c2 \times 2$ represents a relationship among the number of atoms d2 of lithium Li, the number of atoms e2 of $(Mn_{1-y}A_y)$, the number of atoms c2 of oxygen O, and the valence β2 of the transition metal M.

It should be noted that in the case of forming a transition metal oxide coating, a coating of two or more types of metal oxides, for example, a nickel oxide and a manganese oxide, may be formed, and then hydrothermal treatment may be performed thereon in a lithium ion containing solution under the presence of an oxidant or a reductant. In this manner, a positive electrode of which an active material is a lithium nickel manganese oxide can be obtained.

The oxidant may be of any type, so long as it is oxidative. Examples of the oxidant include oxygen, chlorine, bromine, a chlorate, a hypochlorite, and hydrogen peroxide solution. Preferably, the oxidant is sodium hypochlorite or hydrogen peroxide solution.

The reductant may be of any type, so long as it has reduction ability. Examples of the reductant include hydrogen, formaldehyde, and sodium ascorbate. Preferably, the reductant is sodium isoascorbate.

Further, the oxidant or the reductant may be a suitable gas. That is, the presence of an oxidant or a reductant can be realized by a method utilizing gaseous contact. The gaseous contact can be realized by injecting a gas into a lithium ion solution. Examples of the gas injected here include air, dilution air mixed with an inert gas, an oxidation gas (e.g., $O_2$, $O_3$, or $N_2O$), and a reducing gas (e.g., $H_2$, $H_2S$, $SO_2$, or HCHO). It should be noted that if the present invention is implemented in the atmosphere, oxygen in the air acts as an oxidant. For this reason, it is preferred to implement the present invention in an inert gas.

In the step (Y), a lithium ion amount and an oxidant amount or a reductant amount vary depending on the amount, the form of oxidation, etc., of the transition metal oxide. That is, a lithium ion amount and an oxidation equivalent or a reducing equivalent necessary for a starting material to be a target product, may be estimated.

In the case of producing $Li_dM_eO_c$ from the above $M_aO_b$, (β−α) or more oxidation equivalents of an oxidant may be used per equivalent of the transition metal oxide $M_aO_b$. However, if the value of β−α is a negative real number, then (α−β) reducing equivalents of a reductant are used.

Described below is a specific example of the amount of usage of the oxidant or the reductant in the case of assuming that an ideal reaction occurs.

If the usage amount is 0.4 oxidation equivalent or more per equivalent of a starting material $Mn_3O_4$ (the valence a of Mn is 2.6+), then a target product $LiMnO_2$ (the valence (3 of Mn is 3+) is obtained. If the usage amount is 0.9 oxidation equivalent or more per equivalent of the starting material $Mn_3O_4$ (the valence a of Mn is 2.6+), then a target product $LiMn_2O_4$ (the valence of Mn is 3.5+) is obtained.

If the usage amount is one oxidation equivalent or more per equivalent of a starting material MnO (the valence of Mn is 2+), then a target product $LiMnO_2$ (the valence of Mn is 3+) is obtained. If the usage amount is 1.5 oxidation equivalents or more per equivalent of the starting material MnO (the valence of Mn is 2+), then a target product $LiMn_2O_4$ (the valence of Mn is 3.5+) is obtained.

If the usage amount is 0.5 reducing equivalent or more per equivalent of a starting material $MnO_2$ (the valence of Mn is 4+), then a target product $LiMn_2O_4$ (the valence of Mn is 3.5+) is obtained. If the usage amount is one reducing equivalent or more per equivalent of the starting material $MnO_2$ (the valence of Mn is 4+), then a target product $LiMnO_2$ (the valence of Mn is 3+) is obtained.

If the usage amount is one oxidation equivalent or more per equivalent of a starting material NiO (the valence of Ni is 2+), then a target product $LiNiO_2$ (the valence of Ni is 3+) is obtained.

If the usage amount is 0.5 reducing equivalent or more per equivalent of a starting material $V_2O_5$ (the valence of V is 5+), then a target product $LiV_2O_5$ (the valence of V is 4.5+) is obtained. If the usage amount is one reducing equivalent or more per equivalent of the starting material $V_2O_5$ (the valence of V is 5+), then a target product $Li_2V_2O_5$ (the valence of V is 4+) is obtained. If the usage amount is two reducing equivalents or more per equivalent of the starting material $V_2O_5$ (the valence of V is 5+), then a target product $Li_4V_2O_5$ (the valence of V is 3+) is obtained.

If the usage amount is one oxidation equivalent or more per equivalent of a starting material $V_2O_3$ (the valence of V is 3+), then a target product $Li_2V_2O_5$ (the valence of V is 4+) is obtained.

In reality, however, it is difficult to cause an ideal reaction. Therefore, it is preferable to add the oxidant or the reductant by an amount that is one to six times more than the theoretical equivalent. It is more preferable to add the oxidant or the reductant by an amount that is one to three times more than the theoretical equivalent.

At the time of performing hydrothermal treatment in the step (Y), if the lithium ion containing solution that contains an oxidant or a reductant is under alkaline conditions, then the solution may be heated as it is. However, if the lithium ion containing solution is under acidic conditions, in particular, if the pH value (hydrogen ion concentration index) is small, then the solution may be heated with a substance for increasing the pH value added thereto. Examples of the added substance include: an alkali hydroxide such as sodium hydroxide, potassium hydroxide, or lithium hydroxide; an ammonia compound such as ammonia gas or ammonia water; and an alkaline carbonate compound such as sodium carbonate, potassium carbonate, lithium carbonate, or ammonium carbonate.

The lithium ion containing solution used in the hydrothermal treatment may be prepared by dissolving a water-soluble lithium compound in water. Specifically, a lithium chloride solution, lithium nitrate solution, lithium hydroxide solution, or the like may be suitably used as the lithium ion containing solution. A single or a mixture of two or more types of water-soluble lithium compounds may be used to prepare the lithium ion containing solution. The water-soluble lithium compounds used here may be either anhydrous compounds or hydrated compounds.

The usage amount of the water-soluble lithium compounds may be determined such that lithium is added to the solution by a theoretical amount for obtaining a target product, or more, in terms of the elemental molar ratio of lithium to the number of moles of the transition metal in the target transition metal oxide. It is preferable to add lithium by an amount that is one to five times more than the theoretical amount. It is more preferable to add lithium by an amount within the range of one to three times more than the theoretical amount. Preferably, the concentration of the water-soluble lithium compound is in the range of 0.05 to 10 mol/liter. More preferably, the concentration of the water-soluble lithium compound is in the range of 1 to 6 mol/liter.

The temperature at which to perform the hydrothermal treatment is set to 100 to 400° C. Preferably, the temperature of the hydrothermal treatment is set to 100 to 200° C. Even if the temperature of the hydrothermal treatment is less than 100° C., the reaction still occurs. In this case, however, the reaction rate is slow. Therefore, it is preferred that the temperature of the hydrothermal treatment is 100° C. or higher. Moreover, if the hydrothermal treatment is to be performed at a temperature higher than 400° C., then a large-scale device is necessary for the hydrothermal treatment, resulting in a high cost.

It is preferred that the hydrothermal treatment is performed under the presence of an oxidant or a reductant in the following manner: the current collector on which a transition metal oxide coating is formed is placed in the lithium ion containing solution; the solution in which the current collector is placed is contained in a pressure-resistant and corrosion-resistant container and the container is sealed; and the hydrothermal treatment is performed under pressure or under saturated vapor pressure.

Examples of a material preferably used for the pressure-resistant and corrosion-resistant container include alloy materials such as Hastelloy alloys, Inconel alloys, and stainless steel. Among these, Hastelloy alloys and Inconel alloys are more preferred.

The hydrothermal treatment may be performed under a pressure of 0.05 to 40 MPa. Setting the pressure within this range allows the transition metal to be sufficiently lithium-doped, and eliminates the necessity of using a large-scale pressure-resistant and corrosion-resistant container. Accordingly, setting the pressure within this range is preferable from the economic point of view. In view of the above, it is preferred that the hydrothermal treatment is performed under a pressure of 0.1 to 10 MPa.

Although depending on the temperature at which to perform the hydrothermal treatment, the hydrothermal treatment time may be five hours or longer if the temperature is in the range of 100 to 200° C., or may be three hours or longer if the temperature is in the range of 200 to 400° C. Preferably, the hydrothermal treatment time is suitably set so as not to cause the active material adhered to the current collector to drop therefrom. To be specific, it is suitable if the hydrothermal treatment time is within the range of 5 to 50 hours. Preferably, the hydrothermal treatment time is within the range of 10 to 30 hours.

In the manner as described above, a positive electrode of which the current collector is coated with the lithium-doped transition metal oxide can be obtained. It should be noted that if moisture is removed from the positive electrode by drying the positive electrode under a reduced pressure at a temperature of approximately 80 to 150° C., then the positive electrode can be used as a more favorable electrode.

On the positive electrode of the present invention obtained in the above-described manner, an active material layer is directly formed on the current collector. Accordingly, a step where an active material is made into an electrode, which is necessary in the conventional art, is no longer necessary. That is, the production of the active material and the fabrication of the positive electrode can be performed at the same time.

In the present invention, the lithium-doped transition metal oxide is flake-shaped and is formed perpendicularly to the surface of the current collector. The lithium-doped transition metal oxide has a thickness of 5 to 500 nm, a width of 0.1 to 10 μm, and a length of 0.1 to 10 μm. The term flake-shaped in the present invention refers to shapes of thin pieces, the thickness of which is less than its length.

Among shapes of such thin pieces, the term flake-shaped refers to even a roundish shape and a shape of which the corners, apexes, or sides are partially chipped. It should be noted that it is not necessary for all of the individual particles of the active material to have the same shape. The particles may include those which have irregular shapes as indicated in a conceptual diagram shown in FIG. 1.

Figure 1:
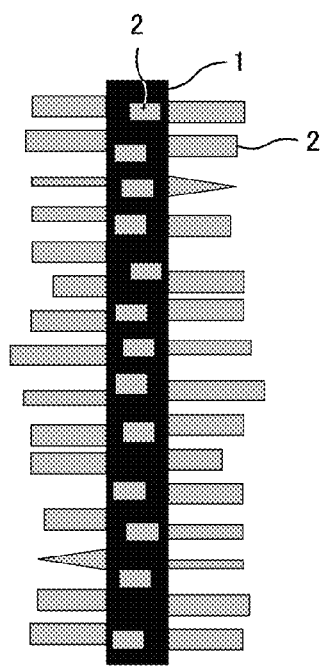
FIG. 1 is a conceptual diagram showing a fiber positive electrode of the present invention, on which a flaky lithium-doped transition metal oxide is formed perpendicularly to the surface of a carbon fiber current collector.

A description regarding the formation of the lithium-doped transition metal oxide perpendicularly to the surface of the current collector has previously been given with reference to FIG. 1.

As described above, in the positive electrode of the present invention, an agglomerate of the flake-shaped positive-electrode active material is formed into a mass, and the mass is perpendicularly adhered to the surface of the current collector. In this manner, a porous positive-electrode active material layer is formed. Accordingly, the electrode has a significantly large surface area and a structure that allows an electrolyte solution to easily permeate, and has a super three-dimensional structure capable of mitigating a stress that occurs due to expansion/contraction in the volume of the active material. Thus, the positive electrode of the present invention is long-lived and has excellent electrode characteristics.

A negative electrode to be used in the lithium secondary battery that uses the positive electrode of the present invention is not particularly limited. A publicly known negative electrode may be used in the lithium secondary battery. Examples of such a publicly known negative electrode include a carbon electrode using graphite or the like, an alloy electrode using $Cu_3Sn$ or the like, an oxide electrode using SnO, SiO, or the like, and a nitride electrode using LiN or the like.

Since the lithium secondary battery that uses the positive electrode of the present invention is required to contain lithium ions, a lithium salt is suitably used as an electrolytic salt. To be specific, the lithium salt may be, but not limited to, lithium hexafluorophosphate, lithium perchlorate, lithium tetrafluoroborate, lithium trifluoromethanesulfonate, or lithium trifluoromethanesulfonimide. One of, or two or more of, these lithium salts may be used. Since the above lithium salts have a high electronegativity and are easily ionizable, the use of these lithium salts makes it possible to realize excellent charge/discharge cycle characteristics and improve the charge/discharge capacity of the secondary battery.

Examples of the solvent for the electrolyte include propylene carbonate, ethylene carbonate, dimethyl carbonate, diethyl carbonate, and γ-butyrolactone. One of, or two or more of, these solvents may be used. In particular, propylene carbonate alone, a mixture of ethylene carbonate and diethyl carbonate, or γ-butyrolactone alone is suitably used as a solvent. Here, in the mixture of ethylene carbonate and diethyl carbonate, the mixture ratio between ethylene carbonate and diethyl carbonate may be adjusted to any ratio, so long as the proportion of ethylene carbonate in the mixture and the proportion of diethyl carbonate in the mixture are both in the range of 10% to 90%. The lithium secondary battery having the above-described structure is a high-capacity secondary battery having a favorable cycle life.

Accordingly to the reference invention example, advantageous effects as described below are obtained.

Specifically, the reference invention example makes it possible to fabricate a positive electrode on which an active material layer is directly formed on a current collector. Therefore, a step where an active material is produced and made into an electrode, which is necessary in the conventional art, is no longer necessary. That is, the production of the active material and the fabrication of the positive electrode can be performed at the same time.

Accordingly, basically, the positive electrode obtained in the reference invention example does not require the addition of a conductive assistant or a binder, a process of slurrying an active material, a rolling process, etc.

Therefore, according to the reference invention example, mass manufacturing is readily achievable at low cost. In addition, since the lithium element is contained in the positive-electrode active material of the present invention, it is not necessary to perform lithium doping in advance. This improves the safety in the fabrication steps as well as the safety of the battery.

Further, according to the reference invention example, the lithium-doped transition metal oxide is flake-shaped and formed perpendicularly to the current collector. Accordingly, a porous positive-electrode active material layer is formed on the current collector, and the positive electrode is long-lived and has excellent electrode characteristics.

A lithium secondary battery using the positive electrode as described above has high current density, high energy density, and excellent charge/discharge cycle characteristics.

Hereinafter, the reference invention example will be described in detail.

Reference Fabrication Example 1

Electrodeposition Method $Mn_3O_4$/Aluminum Foil

Here, an $Mn(NO_3)_2$ solution (0.25 mol/liter) was used for an electrodeposition bath; an aluminum foil was used for an electrode acting as a working electrode; and a platinum foil was used for its counter electrode. Electrodeposition was performed under the condition of a constant current density of 50 mA/cm$^2$ for 30 minutes. Thereafter, the electrode was washed with water and dried under an air atmosphere at 100° C. for 24 hours or longer. In this manner, the electrode of which the aluminum foil is coated with $Mn_3O_4$ was obtained. It should be noted that only being coated with $Mn_3O_4$ does not allow the electrode to function as a positive electrode.

Reference Fabrication Example 2

Slurry Method $Mn_3O_4$/Aluminum Foil $Mn_3O_4$ powder and carboxymethylcellulose (CMC) were weighed and their amounts were adjusted such that a mixture of them contains 90 wt % of the $Mn_3O_4$ powder and 10 wt % of carboxymethylcellulose (CMC). Then, water was added to the mixture of the $Mn_3O_4$ powder and carboxymethylcellulose (CMC), and thus the slurry was prepared. The prepared slurry was applied onto an aluminum foil, and then CMC was carbonized at 600° C. for 24 hours. In this manner, an electrode of which the aluminum foil is coated with $Mn_3O_4$ was obtained. It should be noted that only being coated with $Mn_3O_4$ does not allow the electrode to function as a positive electrode.

Reference Fabrication Example 3

Aerosol Method $Mn_3O_4$/Aluminum Foil

Mn powder (having an average particle diameter of 10 µm) was used as a target for aerosol deposition. A Mn thin film was formed on an aluminum foil, and high-temperature oxidation treatment was performed thereon under an air atmosphere at 700° C. for 24 hours. In this manner, an electrode of which the aluminum foil is coated with $Mn_3O_4$ was obtained. It should be noted that only being coated with $Mn_3O_4$ does not allow the electrode to function as a positive electrode.

Reference Fabrication Example 4

Electrodeposition Method $Mn_3O_4$+NiO/Aluminum Foil

In order to perform coating with $Mn_3O_4$ and NiO in an electrodeposition method, a mixture of $Mn(NO_3)_2$ solution (0.25 mol/liter) and $Ni(NO_3)_2$ solution (0.01 mol/liter) was used for an electrodeposition bath; an aluminum foil was used for an electrode acting as a working electrode; and a platinum foil was used for its counter electrode. Electrodeposition was performed for 30 minutes with a constant current density of 50 mA/cm$^2$. Thereafter, the electrode was washed with water and dried under an air atmosphere at 100° C. for 24 hours or longer. In this manner, the electrode of which the aluminum foil is coated with $Mn_3O_4$ and NiO was obtained. It should be noted that only being coated with $Mn_3O_4$ and NiO does not allow the electrode to function as a positive electrode.

Reference Fabrication Example 5

Electrodeposition Method

NiO/Aluminum Foil

Here, an $Ni(NO_3)_2$ solution (0.25 mol/liter) was used for an electrodeposition bath; an aluminum foil was used for an electrode acting as a working electrode; and a platinum foil was used for its counter electrode. Electrodeposition was performed under the condition of a constant current density of 50 mA/cm$^2$ for 30 minutes. Thereafter, the electrode was washed with water and dried under an air atmosphere at 120° C. for 24 hours or longer. In this manner, the electrode of which the aluminum foil is coated with NiO was obtained. It should be noted that only being coated with NiO does not allow the electrode to function as a positive electrode.

Reference Fabrication Example 6

Aerosol Method $MnO_2$/Aluminum Foil

An electrode was obtained by coating an aluminum foil with $MnO_2$ under the following conditions: the average particle diameter of $MnO_2$ powder is 100 µm; the average diameter of secondary particles is 5 µm; and a pressure difference between a film forming chamber and an aerosol chamber is 40 kPa. It should be noted that only being coated with $MnO_2$ does not allow the electrode to function as a positive electrode.

Reference Fabrication Example 7

Electroplating Method

NiO/Aluminum Foil

Here, a nickel sulfate solution (0.25 mol/liter) was used for an electrodeposition bath; an aluminum foil was used for an electrode acting as a working electrode; and a platinum foil was used for its counter electrode. Electrodeposition was performed under an electroplating condition of a constant current density of 50 mA/cm² for 30 minutes. Thereafter, the electrode was washed with water and oxidized under an oxygen atmosphere at 650° C. for 24 hours or longer. In this manner, the electrode of which the aluminum foil is coated with NiO was obtained. It should be noted that only coated with NiO does not allow the electrode to function as a positive electrode.

Reference Example 1

Electrodeposition Method $LiMnO_2+Mn(OH)_2$/Aluminum Foil

The electrode obtained in Reference Fabrication Example 1 was immersed in a lithium hydroxide solution (3 mol/liter), to which one oxidation equivalent of hydrogen peroxide solution was added per equivalent of $Mn_3O_4$ previously formed on the current collector in Reference Fabrication Example 1. Then, hydrothermal treatment was performed at 120° C. for 20 hours. Thereafter, the electrode was washed with water and dried under a reduced pressure at 100° C. for 24 hours or longer. In this manner, a positive electrode of Reference Example 1 was obtained.

Reference Example 2

Electrodeposition Method $LiMnO_2+Mn(OH)_2$/Chrome-Plated Nickel Foam

A positive electrode of Reference Example 2 was fabricated in the same manner as in Reference Example 1 except that in Reference Example 2, not an aluminum foil but chrome-plated nickel foam was used as a current collector.

Reference Example 3

Electrodeposition Method $LiMn_2O_4$/Aluminum Foil

The electrode obtained in Reference Fabrication Example 1 was immersed in a lithium hydroxide solution (3 mol/liter), to which 2.5 oxidation equivalents of sodium hypochlorite were added per equivalent of $Mn_3O_4$ previously formed on the current collector in Reference Fabrication Example 1. Then, hydrothermal treatment was performed under the condition of 120° C. for 20 hours. Thereafter, the electrode was washed with water and dried under a reduced pressure at 100° C. for 24 hours or longer. In this manner, a positive electrode of Reference Example 3 was obtained.

Reference Example 4

Electrodeposition Method $LiMn_2O_4$/Aluminum Mesh

A positive electrode of Reference Example 4 was fabricated in the same manner as in Reference Example 3 except that in Reference Example 4, not an aluminum foil but an aluminum mesh was used as a current collector.

Reference Example 5

Electrodeposition Method $LiMn_2O_4$/Chrome-Plated Nickel Foam

A positive electrode of Reference Example 5 was fabricated in the same manner as in Reference Example 3 except that in Reference Example 5, not an aluminum foil but chrome-plated nickel foam was used as a current collector.

Reference Example 6

Electrodeposition Method $Li_2Mn_2O_4$/Chrome-Plated Nickel Foam

In Reference Example 5, the positive-electrode active material was $Li_xMn_2O_4$. Here, charging and discharging were performed in the 4V region in the range of $0<x\leq1$ (theoretical capacity, 148 mAh/g) such that the active material became $LiMn_2O_4$. Similarly, in Reference Example 6, charging and discharging were performed in the 3V region in the range of $0<x\leq2$ (theoretical capacity, 285 mAh/g) such that the active material became $Li_2Mn_2O_4$. In this manner, a positive electrode of Reference Example 6 was fabricated.

Reference Example 7

Slurry Method $LiMn_2O_4$/Aluminum Foil

A positive electrode of Reference Example 7 was fabricated in the same manner as in Reference Example 3 except that in Reference Example 7, not the electrode obtained in Reference Fabrication Example 1 but the electrode obtained in Reference Fabrication Example 2 was used.

Reference Example 8

Aerosol Method $LiMn_2O_4$/Aluminum Foil

A positive electrode of Reference Example 8 was fabricated in the same manner as in Reference Example 3 except that in Reference Example 8, not the electrode obtained in Reference Fabrication Example 1 but the electrode obtained in Reference Fabrication Example 3 was used.

Reference Example 9

Electrodeposition Method $LiMn_{1.85}Ni_{0.15}O_4$/Aluminum Foil

The electrode obtained in Reference Fabrication Example 4 was immersed in a lithium hydroxide solution (3 mol/liter), to which two oxidation equivalents of sodium hypochlorite were added per equivalent of combined $Mn_3O_4$ and NiO previously formed on the current collector in Reference Fabrication Example 4. Then, hydrothermal treatment was performed at 120° C. for 20 hours. Thereafter, the electrode was washed with water and dried under a reduced pressure at 100°

C. for 24 hours or longer. In this manner, a positive electrode of Reference Example 9 was obtained.

Reference Example 10

Electrodeposition Method $LiNiO_2+Ni(OH)_2$/Aluminum Foil

The electrode obtained in Reference Fabrication Example 5 was immersed in a lithium hydroxide solution (3 mol/liter), to which one oxidation equivalent of hydrogen peroxide solution was added per equivalent of NiO previously formed on the current collector in Reference Fabrication Example 5. Then, hydrothermal treatment was performed under the condition of 120° C. for 20 hours. Thereafter, the electrode was washed with water and dried under a reduced pressure at 100° C. for 24 hours or longer. In this manner, a positive electrode of Reference Example 10 was obtained.

Reference Example 11

Electrodeposition Method $LiNiO_2$/Aluminum Foil

The electrode obtained in Reference Fabrication Example 5 was immersed in a lithium hydroxide solution (3 mol/liter), to which two oxidation equivalents of sodium hypochlorite were added per equivalent of NiO previously formed on the current collector in Reference Fabrication Example 5. Then, hydrothermal treatment was performed under the condition of 120° C. for 20 hours. Thereafter, the electrode was washed with water and dried under a reduced pressure at 100° C. for 24 hours or longer. In this manner, a positive electrode of Reference Example 11 was obtained.

Reference Example 12

Electrodeposition Method $LiNiO_2$/Aluminum Mesh

A positive electrode of Reference Example 12 was fabricated in the same manner as in Reference Example 11 except that in Reference Example 12, not an aluminum foil but an aluminum mesh was used as a current collector.

Reference Example 13

Electrodeposition Method $LiNiO_2$/Chrome-Plated Nickel Foam

A positive electrode of Reference Example 13 was fabricated in the same manner as in Reference Example 10 except that in Reference Example 13, not an aluminum foil but chrome-plated nickel foam was used as a current collector.

Reference Example 14

Aerosol Method $LiMn_4O_2$/Aluminum Foil Obtained by Means of a Reductant

The electrode obtained in Reference Fabrication Example 6 was immersed in a lithium hydroxide solution (3 mol/liter), to which 0.6 reducing equivalent of sodium isoascorbate was added per equivalent of $MnO_2$ previously formed on the current collector in Reference Fabrication Example 6. Then, hydrothermal treatment was performed under the condition of 120° C. for 20 hours. Thereafter, the electrode was washed with water and dried under a reduced pressure at 100° C. for 24 hours or longer. In this manner, a positive electrode of Reference Example 14 was obtained.

Reference Example 15

Aerosol Method $LiMnO_2$/Aluminum Foil Obtained by Means of a Reductant

A positive electrode of Reference Example 15 was obtained in the same manner as in Reference Example 14 except that not 0.6 reducing equivalent of sodium isoascorbate but four reducing equivalents of sodium isoascorbate were added to the lithium hydroxide solution.

Reference Example 16

Electroplating Method $LiNiO_2+Ni(OH)_2$/Aluminum Foil

The electrode obtained in Reference Fabrication Example 7 was immersed in a lithium hydroxide solution (3 mol/liter), to which one oxidation equivalent of sodium hypochlorite was added per equivalent of NiO previously formed on the current collector in Reference Fabrication Example 7. Then, hydrothermal treatment was performed under the condition of 120° C. for 20 hours. Thereafter, the electrode was washed with water, and dried under a reduced pressure at 100° C. for 24 hours or longer. In this manner, a positive electrode of Reference Example 16 was obtained.

It should be noted that each water-soluble lithium compound in Reference Examples 1 to 16 is adjusted such that the elemental molar ratio of lithium to the number of moles of a transition metal is 2.5 or higher.

Reference Test Example 1

Observation of Positive Electrode

[X-Ray Diffraction]

Figure 28:
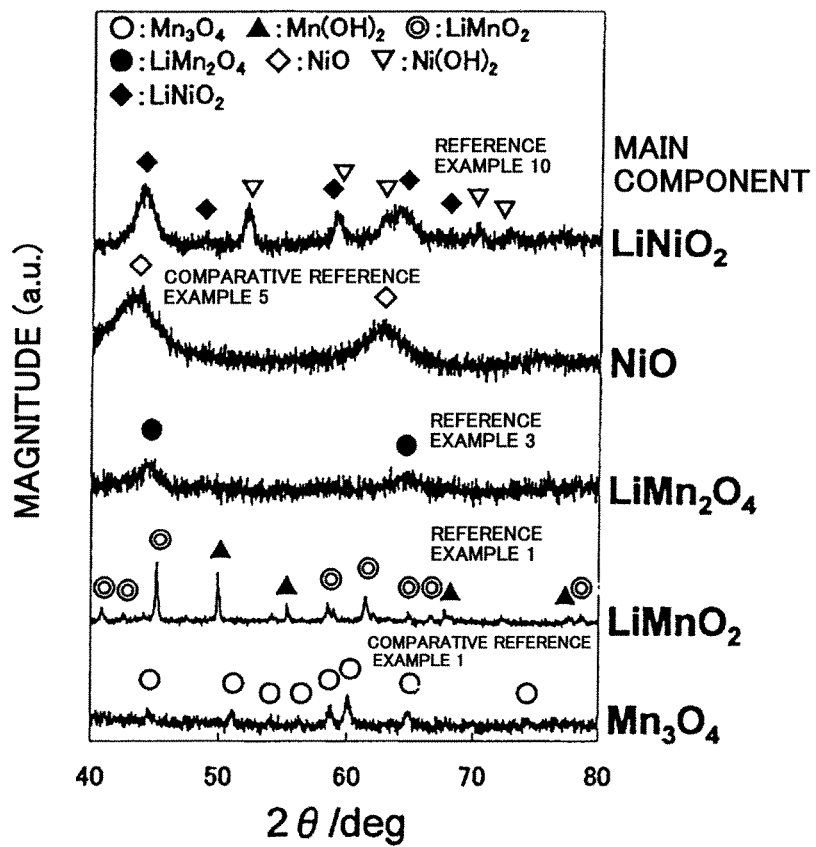
FIG. 28 shows X-ray diffraction patterns in Reference Examples 1, 3, 10, and Comparative Reference Examples 1 and 5.

FIG. 28 shows X-ray diffraction patterns in Reference Examples 1, 3, and 10. FIG. 28 also shows an X-ray diffraction pattern in Comparative Reference Example 1 where the same positive electrode as that in Reference Example 1 was not subjected to hydrothermal treatment, and further shows an X-ray diffraction pattern in Comparative Reference Example 5 where the same positive electrode as that in Reference Example 5 was not subjected to hydrothermal treatment.

Comparative Reference Example 1, in which hydrothermal treatment was not performed, showed diffraction peaks of $Mn_3O_4$. In contrast, Reference Example 1, in which hydrothermal treatment was performed in the lithium ion solution to which one oxidation equivalent of hydrogen peroxide solution was added per equivalent of $Mn_3O_4$, showed diffraction peaks clearly different from the diffraction peaks in Comparative Reference Example 1. It was determined by searching the JCPDS database that the diffraction peaks shown in Reference Example 1 were diffraction peaks of $LiMnO_2$ and $Mn(OH)_2$.

Reference Example 3, in which hydrothermal treatment was performed in the lithium ion solution to which 2.5 oxidation equivalents of sodium hypochlorite were added per equivalent of $Mn_3O_4$, showed diffraction peaks different from the diffraction peaks in Comparative Reference Example 1 and Reference Example 1. It was determined by searching the JCPDS database that the diffraction peaks shown in Reference Example 3 were diffraction peaks of $LiMn_2O_4$. It was found from the above facts that either $LiMnO_2$ or $LiMn_2O_4$ can be selectively obtained as an active material by adjusting the oxidation equivalents of an oxidant to be added.

Comparative Reference Example 5 in which hydrothermal treatment was not performed showed diffraction peaks of NiO. Reference Example 10, in which hydrothermal treatment was performed in the lithium ion solution to which one oxidation equivalent of hydrogen peroxide solution was added per equivalent of NiO, showed diffraction peaks different from the diffraction peaks in Comparative Reference Example 5. The diffraction peaks shown in Reference Example 10 were determined to be diffraction peaks of $LiNiO_2$ and $Ni(OH)_2$. Reference Example 11, in which hydrothermal treatment was performed in the lithium ion solution to which two oxidation equivalents of sodium hypochlorite were added per equivalent of NiO, did not show diffraction peaks of $Ni(OH)_2$ which were shown in Reference Example 10. It was confirmed that the diffraction peaks shown in Reference Example 11 were only diffraction peaks of $LiNiO_2$.

[Scanning Electron Microscope (SEM)]

Figure 29:
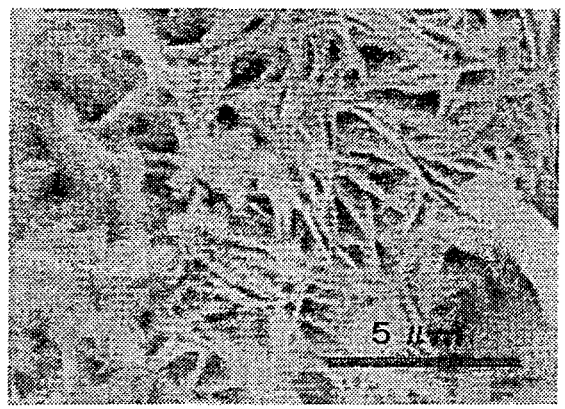
FIG. 29 is an SEM photograph (6000 magnifications) of the surface of an oxide coating on a positive electrode in Reference Example 1.

FIG. 29 shows an SEM photograph of the surface of an oxide coating on the positive electrode obtained in Reference Example 1. It is clear from FIG. 29 that a porous material adhered to the current collector forms a layer. The layer is a result of flake-shaped active material particles being formed perpendicularly to the surface of the current collector. These flaky particles are piled upon one another, and over that piles, flaky particles are further formed. Accordingly, it appears that the porous active material layer is formed as a result of the flaky particles agglomerating into a mass. The flaky particles were magnified and examined. From the examination, it was found that the agglomerate of the flaky particles, having a thickness of approximately 100 nm, a width of approximately 1.5 μm, and a length of approximately 2 μm, covered the electrode. As is clear from the foregoing measurement results of the X-ray diffraction patterns shown in FIG. 28, the active material layer in Reference Example 1 contains a lithium manganese oxide as a main component. That is, the porous layer shown in FIG. 29 is $LiMnO_2$.

Figure 30:
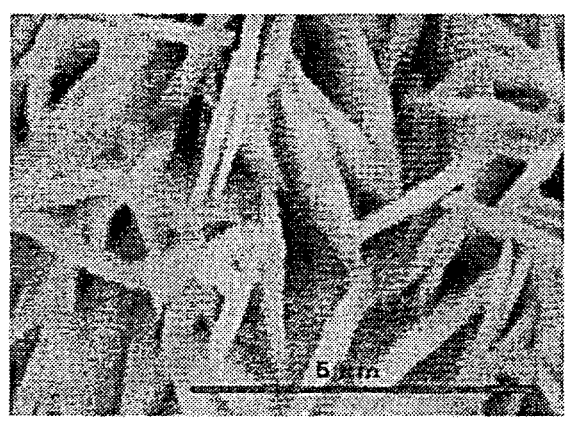
FIG. 30 is an SEM photograph (10000 magnifications) of the surface of an oxide coating on a positive electrode in Reference Example 3.

FIG. 30 shows an SEM photograph of Reference Example 3. It is clear from FIG. 30 that a porous material adhered to the current collector forms a layer. As is clear from the foregoing measurement results of the X-ray diffraction patterns shown in FIG. 28, an active material layer in Reference Example 3 is formed of spinel-type lithium manganese oxide. Accordingly, the porous layer shown in FIG. 30 can be considered to be $LiMn_2O_4$. Similar to Reference Example 1, it can be observed that the particles of the porous material are formed perpendicularly to the surface of the current collector, and are flake-shaped. The flaky particles are piled upon one another, and over that piles, other flaky particles are further formed. Accordingly, the porous active material layer is formed as a result of the flaky particles agglomerating into a mass. The flaky particles were magnified and examined. From the examination, it was found that the agglomerate of the flaky particles, having a thickness of approximately 100 nm, a width of approximately 2 μm, and a length of approximately 2 μm, covered the entire electrode.

Reference Test Example 2

Battery Test

The respective samples in Reference Examples 1 to 16 were used as test electrodes. A metallic lithium foil was used for their counter electrodes. A solution that is obtained by dissolving $LiPF_6$ at a concentration of 1 mol/liter into a solvent in which ethylene carbonate (EC) and dimethyl carbonate (DMC) are mixed in a volume ratio of 1:1, was used as an electrolyte solution. A two-electrode evaluation cell was prepared, and a charge/discharge test was conducted. During the test, a cutoff voltage was used to perform control, and a charge/discharge current corresponding to 0.3 C was used.

Table 9 below shows battery test results regarding Reference Examples 1 to 16.

TABLE 9

| | At 1st Cycle | At 20th Cycle | Average Discharge Voltage |
|---|---|---|---|
| Reference Example 1 | 180 mAh/g | 166 mAh/g | 3 V |
| Reference Example 2 | 209 mAh/g | 199 mAh/g | 3 V |
| Reference Example 3 | 104 mAh/g | 89 mAh/g | 4 V |
| Reference Example 4 | 104 mAh/g | 93 mAh/g | 4 V |
| Reference Example 5 | 104 mAh/g | 99 mAh/g | 4 V |
| Reference Example 6 | 181 mAh/g | 178 mAh/g | 3.5 V |
| Reference Example 7 | 98 mAh/g | 88 mAh/g | 4 V |
| Reference Example 8 | 103 mAh/g | 93 mAh/g | 4 V |
| Reference Example 9 | 103 mAh/g | 98 mAh/g | 3.5 V |
| Reference Example 10 | 189 mAh/g | 186 mAh/g | 3.5 V |
| Reference Example 11 | 198 mAh/g | 195 mAh/g | 3.5 V |
| Reference Example 12 | 201 mAh/g | 198 mAh/g | 3.5 V |
| Reference Example 13 | 204 mAh/g | 199 mAh/g | 3.5 V |
| Reference Example 14 | 98 mAh/g | 85 mAh/g | 4 V |
| Reference Example 15 | 150 mAh/g | 134 mAh/g | 3 V |
| Reference Example 16 | 158 mAh/g | 154 mAh/g | 3.5 V |

As is clear from the above Table 9, it was found that favorable charge/discharge cycle life characteristics of the respective types of current collectors, each of which brings efficiency, can be graded in the following order: aluminum foil<aluminum mesh<chrome-plated nickel foam.

Figure 31:
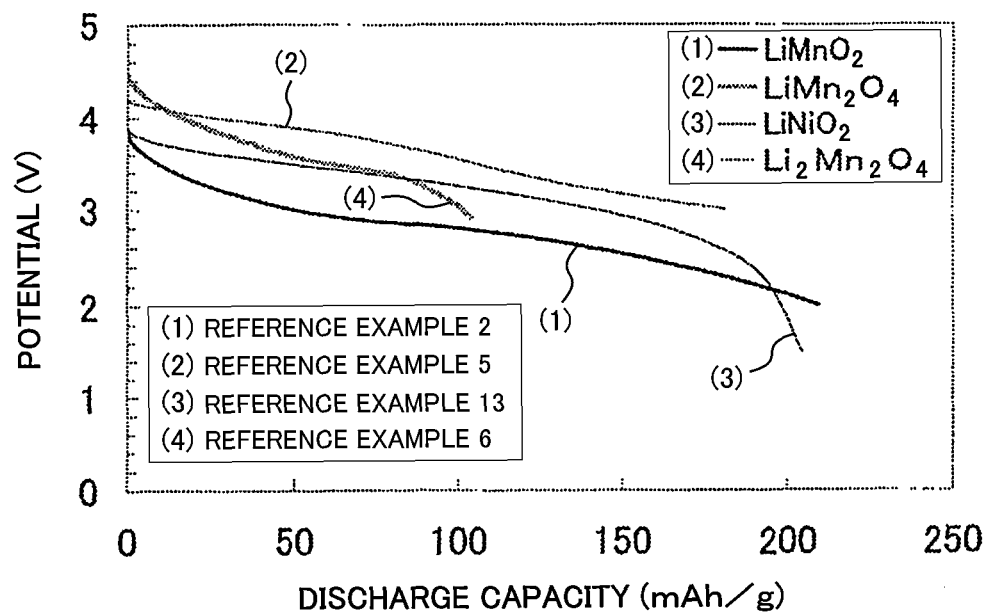
FIG. 31 shows initial discharge curves in Reference Examples 2, 5, 6, and 13.

In relation to the samples that contain $LiMn_2O_4$ as a positive-electrode active material, FIG. 31 shows initial discharge curves of Reference Examples 2, 5, 6, and 13, which showed favorable positive electrode characteristics (charge/discharge cycle life characteristics).

INDUSTRIAL APPLICABILITY

The lithium secondary battery that includes the present invention's fiber electrodes for a lithium secondary battery described above in detail, is employed for mobile use, portable use, backup use, etc. In particular, the lithium secondary battery is excellent as a power source that is required to have high output characteristics and a high capacity in addition to a long life duration. Furthermore, the present invention makes it possible to design a battery that enables rapid charging of, for example, 300 C, which is inconceivable in light of generally used secondary batteries. Also, the lithium secondary battery of the present invention may serve as a high-capacity capacitor. Thus, the present invention brings extremely significant industrial advantages.

REFERENCE SIGNS LIST 1 carbon fiber current collector
2 transition metal oxide
3 cell outer wall
4 fiber positive electrode
5 fiber negative electrode
6a microporous membrane separator
6b separator
7 electrolyte solution

The invention claimed is:

1. A fiber negative electrode for a lithium secondary battery, comprising:
   a carbon fiber current collector;
   an outer layer which is a tubular composite layer of a Sn oxide and $M_xO_y$ formed on the carbon fiber current collector; and
   an intermediate layer formed of a Sn alloy, which has a lithium occlusion capacity and which is present at an interface between the carbon fiber current collector and the outer layer (M of $M_xO_y$ is at least one kind of metal atom selected from the group consisting of Fe, Mo, Co, Ni, Cr, Cu, In, Sb, and Bi; x is 0<x<3; and the number y of oxygen atoms O is 0≤y≤w if the number of oxygen atoms O in a chemical bond with metal atoms M is w based on the stoichiometry).

2. The fiber negative electrode for a lithium secondary battery according to claim 1, wherein the intermediate layer formed of the Sn alloy is a Sn alloy plating layer which contains, as an alloy component other than Sn, at least one kind of metal component selected from the group consisting of Fe, Mo, Co, Ni, Cr, Cu, In, Sb, and Bi.

3. The fiber negative electrode for a lithium secondary battery according to claim 1, wherein the intermediate layer is a CuSn alloy layer and the outer layer is a composite layer of a Sn oxide and a Cu oxide.

4. The fiber negative electrode for a lithium secondary battery according to claim 1, wherein the intermediate layer is a $Cu_3Sn$ layer and the outer layer is a composite layer of $SnO_2$ and $Cu_2O$.

5. The fiber negative electrode for a lithium secondary battery according to claim 1, wherein the total thickness of the intermediate layer and the outer layer is 1 to 10 μm.

6. The fiber negative electrode for a lithium secondary battery according to claim 1, wherein the carbon fiber has a single fiber diameter of 1 to 100 μm.

7. The fiber negative electrode for a lithium secondary battery according to claim 1, wherein the carbon fiber is formed of a bundle of 100 to 5000 single fibers.

8. The fiber negative electrode for a lithium secondary battery according to claim 1, wherein the carbon fiber is formed of 50 to 1000 twisted single fibers.

9. The fiber negative electrode for a lithium secondary battery according to claim 1, wherein each of the intermediate layer and the outer layer contains a conductant agent and/or a binder.

10. The fiber negative electrode for a lithium secondary battery according to claim 9, wherein the conductant agent is a carbon black.

11. The fiber negative electrode for a lithium secondary battery according to claim 9, wherein the binder is polytetrafluoroethylene.

12. A laminated body comprising a fiber negative electrode and a separator, which is obtained by forming a separator layer on the outer layer according to claim 1.

13. A lithium secondary battery comprising: the fiber negative electrode for a lithium secondary battery according to claim 1, and further including an electrolyte; and a positive electrode.

14. A fiber negative electrode for a lithium secondary battery, after charging of the lithium secondary battery, comprising:
   a carbon fiber current collector;
   an outer layer which is a tubular layer formed on the carbon fiber current collector and in which $Li_{4.4}Sn$ and at least one kind of metal selected from the group consisting of Fe, Mo, Co, Ni, Cr, Cu, In, Sb, and Bi are dispersed within an $Li_2O$ matrix; and
   an intermediate layer having a lithium release capacity, which is present at an interface between the carbon fiber current collector and the outer layer.

15. A fiber negative electrode for a lithium secondary battery, after discharging of the lithium secondary battery, comprising:
   a carbon fiber current collector;
   an outer layer which is a tubular layer formed on the carbon fiber current collector and in which one of Sn and a Sn alloy, and at least one kind of metal selected from the group consisting of Fe, Mo, Co, Ni, Cr, Cu, In, Sb, and Bi, are dispersed within an $Li_2O$ matrix; and
   an intermediate layer having a lithium occlusion capacity, which is present at an interface between the carbon fiber current collector and the outer layer.

16. A lithium secondary battery comprising:
   the fiber negative electrode for a lithium secondary battery according to claim 15;
   an electrolyte; and
   a positive electrode.

* * * * *